(12) United States Patent
Papaloukopoulos et al.

(10) Patent No.: US 11,171,838 B2
(45) Date of Patent: *Nov. 9, 2021

(54) INFERRING RADIO TYPE FROM CLUSTERING ALGORITHMS

(71) Applicant: Citrix Systems, Inc., Fort Lauderdale, FL (US)

(72) Inventors: Georgios Papaloukopoulos, Patras (GR); Georgios Tsolis, Patras (GR); Athanasios Kordelas, Patras (GR); Aikaterini Kalou, Patras (GR); Nicholas Stavrakos, Los Altos, CA (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/933,640

(22) Filed: Jul. 20, 2020

(65) Prior Publication Data
US 2020/0351169 A1 Nov. 5, 2020

Related U.S. Application Data

(63) Continuation of application No. 15/938,769, filed on Mar. 28, 2018, now Pat. No. 10,721,134.
(Continued)

(51) Int. Cl.
*H04L 12/24* (2006.01)
*H04L 12/26* (2006.01)
(Continued)

(52) U.S. Cl.
CPC .......... *H04L 41/142* (2013.01); *H04L 41/145* (2013.01); *H04L 43/08* (2013.01);
(Continued)

(58) Field of Classification Search
CPC . H04L 41/00; H04L 41/12–147; H04L 43/00; H04L 43/04; H04L 43/06;
(Continued)

(56) References Cited

U.S. PATENT DOCUMENTS 5,640,595 A 6/1997 Baugher et al.
6,125,397 A 9/2000 Yoshimura et al.
(Continued)

FOREIGN PATENT DOCUMENTS

EP 1 453 269 A1 9/2004

OTHER PUBLICATIONS

"A brief history of WiFi: Then and now", The Download, Sep. 27, 2016, retrieved Oct. 4, 2019 from URL: https://blog.eero.com/a-brief-history-of-wifi-then-and-now (3 pages).
(Continued)

*Primary Examiner* — Boris D Grijalva Lobos
(74) *Attorney, Agent, or Firm* — Foley & Lardner LLP

(57) ABSTRACT

Described embodiments provide systems and methods for inferring a network type and network conditions. The system includes a packet capturing engine configured to capture a plurality of network packets from a plurality of TCP network connections. The system includes a packet analyzer configured to analyze the plurality of network packets to generate a plurality of metrics. The system includes a network classifier configured to infer network types of the plurality of TCP connections based on the plurality of metrics and at least one classification model. The system also includes a conditions ranking engine configured to estimate a level of network congestion for each TCP connection based on the plurality of metrics and the network types.

20 Claims, 45 Drawing Sheets

Related U.S. Application Data

(60) Provisional application No. 62/552,207, filed on Aug. 30, 2017.

(51) Int. Cl.
*H04L 12/701* (2013.01)
*H04L 12/841* (2013.01)
*H04L 12/801* (2013.01)
*H04W 84/04* (2009.01)

(52) U.S. Cl.
CPC .............. *H04L 43/18* (2013.01); *H04L 45/00* (2013.01); *H04L 47/11* (2013.01); *H04L 47/283* (2013.01); *H04L 43/04* (2013.01); *H04L 43/0852* (2013.01); *H04L 43/0888* (2013.01); *H04W 84/042* (2013.01)

(58) Field of Classification Search
CPC .................. H04L 43/067; H04L 43/08; H04L 43/0852–0864; H04L 43/0876–0894; H04L 43/12; H04L 43/18; H04L 47/00–11; H04L 47/28–283
See application file for complete search history.

(56) References Cited

U.S. PATENT DOCUMENTS

| | | | |
|---|---|---|---|
| 6,338,074 B1 | 1/2002 | Poindexter et al. | |
| 6,646,996 B1 | 11/2003 | Barillaud | |
| 6,766,309 B1 * | 7/2004 | Cheng ................. | H04L 12/1827 700/50 |
| 7,545,748 B1 | 6/2009 | Riddle | |
| 7,873,065 B1 | 1/2011 | Mukerji et al. | |
| 7,944,822 B1 | 5/2011 | Nucci et al. | |
| 8,019,886 B2 | 9/2011 | Harrang et al. | |
| 8,249,590 B2 | 8/2012 | Govindarajan et al. | |
| 8,418,249 B1 | 4/2013 | Nucci et al. | |
| 8,676,969 B2 | 3/2014 | Bahl et al. | |
| 8,910,241 B2 | 12/2014 | Pollutro et al. | |
| 9,112,948 B1 | 8/2015 | Wood et al. | |
| 9,277,472 B1 | 3/2016 | Price et al. | |
| 9,780,997 B2 | 10/2017 | Grinshpun et al. | |
| 9,824,374 B1 | 11/2017 | Bobe et al. | |
| 9,826,359 B2 | 11/2017 | Splaine et al. | |
| 10,305,757 B2 | 5/2019 | Yadav et al. | |
| 10,412,547 B2 | 9/2019 | Splaine et al. | |
| 2003/0083069 A1 | 5/2003 | Vadgama | |
| 2003/0191837 A1 | 10/2003 | Chen | |
| 2004/0064577 A1 | 4/2004 | Dahlin et al. | |
| 2005/0083849 A1 | 4/2005 | Rui et al. | |
| 2007/0147317 A1 | 6/2007 | Smith et al. | |
| 2007/0223492 A1 | 9/2007 | Lee et al. | |
| 2008/0004024 A1 | 1/2008 | Puri et al. | |
| 2008/0056131 A1 | 3/2008 | Balakrishnan et al. | |
| 2009/0052321 A1 | 2/2009 | Kamath | |
| 2009/0077430 A1 | 3/2009 | Cho et al. | |
| 2009/0210556 A1 | 8/2009 | Yamakami | |
| 2009/0323537 A1 | 12/2009 | Yamamoto et al. | |
| 2010/0061251 A1 | 3/2010 | Nassor et al. | |
| 2010/0195488 A1 | 8/2010 | Mehrotra et al. | |
| 2010/0197304 A1 | 8/2010 | Sawhney et al. | |
| 2010/0205535 A1 | 8/2010 | Mitamura et al. | |
| 2010/0262692 A1 | 10/2010 | Zhang et al. | |
| 2010/0329133 A1 | 12/2010 | Hao et al. | |
| 2011/0066714 A1 | 3/2011 | Topham et al. | |
| 2012/0076011 A1 | 3/2012 | Gobriel et al. | |
| 2012/0159595 A1 | 6/2012 | Barham | |
| 2012/0314599 A1 | 12/2012 | Vilke et al. | |
| 2013/0097205 A1 | 4/2013 | Kong et al. | |
| 2013/0100849 A1 | 4/2013 | Szabo et al. | |
| 2013/0151693 A1 | 6/2013 | Baker et al. | |
| 2013/0201851 A1 | 8/2013 | Chou et al. | |
| 2013/0235731 A1 | 9/2013 | Hadinata et al. | |
| 2013/0250796 A1 | 9/2013 | Frankkila et al. | |
| 2014/0112193 A1 | 4/2014 | Lee | |
| 2014/0294009 A1 | 10/2014 | Sahara et al. | |
| 2015/0106312 A1 | 4/2015 | Chen et al. | |
| 2015/0163104 A1 | 6/2015 | Coster et al. | |
| 2015/0220542 A1 | 8/2015 | Mizushima et al. | |
| 2016/0029146 A1 | 1/2016 | Tembey et al. | |
| 2016/0088499 A1 | 3/2016 | Logan et al. | |
| 2016/0112545 A1 | 4/2016 | He et al. | |
| 2016/0212031 A1 | 7/2016 | Jain et al. | |
| 2016/0261510 A1 | 9/2016 | Burnette et al. | |
| 2016/0286430 A1 | 9/2016 | Abiri et al. | |
| 2016/0381613 A1 | 12/2016 | Duan et al. | |
| 2017/0041242 A1 | 2/2017 | Isobe | |
| 2017/0064599 A1 | 3/2017 | Caine et al. | |
| 2017/0155517 A1 | 6/2017 | Cao | |
| 2017/0359272 A1 | 12/2017 | Srinivasan et al. | |
| 2018/0150635 A1 | 5/2018 | Melvin et al. | |
| 2018/0375780 A1 | 12/2018 | Sawabe | |
| 2019/0200243 A1 | 6/2019 | Anand et al. | |
| 2019/0222499 A1 | 7/2019 | Chen et al. | |

OTHER PUBLICATIONS

Citrix Systems, Inc., "NetScaler Management & Analytics System," www.citrix.com/products/netscaler-management-and-analytics-system, accessed online Jun. 11, 2018 (4 pages).

Crotti et al., "Traffic Classification through Simple Statistical Fingerprinting", ACM SIGCOMM Computer Communication Review, vol. 37, No. 1, Jan. 2007, pp. 7-16 (10 pages).

Deng, Shuo, "Intelligent Network Selection and Energy Reduction for Mobile Devices", Massachusetts Institute of Technology, 2015 (142 pages).

Ericsson, "Advanced Congestion Control, Technical Briefing—TCP RNA", Rev. A, Jul. 2014, accessed online Jun. 11, 2018 (7 pages).

Final Office Action on U.S. Appl. No. 15/938,753 dated Jun. 26, 2020 (12 pages).

Greer, Chris, "TCP Series #3: Network Packet Loss, Retransmissions, and Duplicate Acknowledgements", Accedian.com, Jun. 14, 2017 (9 pages).

International Preliminary Report on Patentability received in International Application No. PCT/US2018/048267, dated Mar. 12, 2020.

International Search Report and Written Opinion for Int. Appl. No. PCT/US2018/048267, dated Nov. 6, 2018.

Jaber et al., "Can we trust the inter-packet time for traffic classification?", IEEE International Conference on Communication (ICC), Jun. 5-9, 2011 (5 pages).

Kinlan, Paul, "Using Service Worker for server-side adaption based on network type", Modern Web Development: Tales of a Developer Advocate, Sep. 7, 2015 (3 pages).

Meraj Ud In Mir et al., "Evolution of Mobile Wireless Technology from 0G to 5G", International Journal of Computer Science and Information Technologies, vol. 6, No. 3, 2015, pp. 2545-2551 (7 pages).

Non-Final Office Action for U.S. Appl. No. 15/938,769 dated Oct. 10, 2019.

Non-Final Office Action for U.S. Appl. No. 15/938,753, dated Jun. 28, 2019.

Non-Final Office Action on U.S. Appl. No. 15/938,753, dated Mar. 5, 2020.

Notice of Allowance on U.S. Appl. No. 15/938,769, dated Mar. 16, 2020.

Notice of Allowance on U.S. Appl. No. 15/938,769 dated Jun. 18, 2020 (4 pages).

Rivenes, Logan, "What is Network Latency?" Datapath.io, Apr. 25, 2016, retrieved Oct. 2, 2019 from URL: https://datapath.io/resources/blog/what-is-network-latency/ (4 pages).

Rottondi et al., "Using packet interarrival times for Internet traffic classification", IEEE Third Latin-American Conference on Communications, Oct. 24-26, 2011 (13 pages).

Wei et al., "Classification of access network types: Ethernet wireless LAN, ADSL, cable modem or dialup?", Proceedings of the IEEE 24th Annual Joint Conference of the IEEE Computer and Communications Societies, pp. 1060-1071, Mar. 13-17, 2005 (13 pages).

(56) References Cited

OTHER PUBLICATIONS

Examination Report on AU Appl. No. 2018326369, dated Sep. 1, 2020.
Notice of Allowance on U.S. Appl. No. 15/938,753 dated Nov. 30, 2020.
Office Action on CA Appl. No. 3074452 dated Apr. 9, 2021.
Office Action on AU Appl. No. 2018326369, dated Aug. 24, 2021.

* cited by examiner

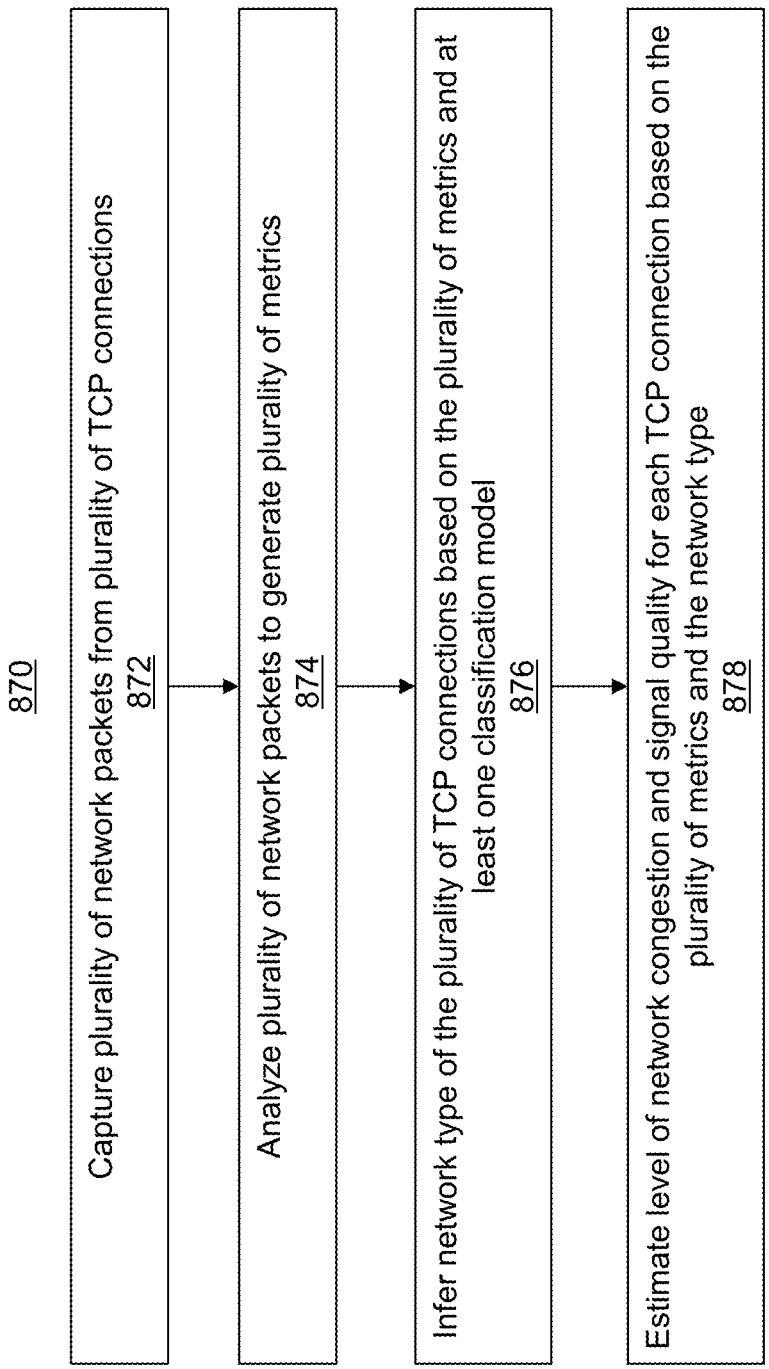

Fig. 12A

INFERRING RADIO TYPE FROM CLUSTERING ALGORITHMS

CROSS-REFERENCE TO RELATED APPLICATIONS

The present application is a continuation of, and claims priority to and the benefit of U.S. application Ser. No. 15/938,769, filed on Mar. 28, 2018, and titled "INFERRING RADIO TYPE FROM CLUSTERING ALGORITHMS", which claims priority to and the benefit of U.S. Provisional Application No. 62/552,207, filed on Aug. 30, 2017, and titled "ADVANCED NETWORK ANALYTICS", the entire contents of both of which are herein incorporated by reference.

BACKGROUND

A computing environment can be configured to facilitate connections between user equipment, such as mobile phones, and other computing devices. For example, cellular networks allow users to communicate via mobile phones using a variety of network protocols and technologies. Network performance in a cellular network can be influenced by factors including signal strength and network congestion. However, it can be difficult to gain insight into the specific underlying causes of poor network performance by analyzing packets sent over the network.

SUMMARY

The present disclosure is directed towards systems and methods for classifying TCP connections in terms of network type and estimating network conditions. The present solution examines network packets transmitted over TCP connections to generate various metrics relating to network performance. Based on these metrics, the network type of the TCP connection is inferred and then the signal quality and congestion level of the network can be determined in near-real time.

The network type and network conditions experienced by mobile users can be accurately inferred by inspecting the TCP packets anywhere in between the connection's endpoints. Particularly, in mobile wireless networks, the radio access technology (e.g. 2G, 3G & 4G) can be inferred and the perceived network congestion (e.g. None, Medium, High) and signal quality (e.g. Excellent, Good, Poor) can be estimated. This disclosure includes a novel design of a machine learning pipeline for inferring the radio access type of TCP connections with high accuracy. This disclosure also includes elegant modeling of congestion and signal quality in mobile wireless networks, as well as non-intrusive monitoring of TCP connections for producing advanced network analytics.

In the realm of mobile wireless networks, the degraded performance of TCP is a well-known problem, as are its causes. However, the complexity and dynamics of TCP, in conjunction with the various radio link technologies used in mobile wireless networks, hinder the establishment of a solid model that accounts for the perceived performance of a TCP connection. This disclosure models the complex interactions of TCP with the underlying radio access technologies and provides a comprehensive insight of the network in terms of performance and radio access types. As a result, the solutions provided in this disclosure allow the overall behavior of the network to be analyzed, in terms of the conditions experienced by mobile subscribers. In the context of this use case, entities (e.g., cellular network service providers, content providers who distribute content via a cellular network, etc.) can leverage this feature for network analysis, using the analytics for forward planning. Entities also can use the solutions provided in this disclosure for market analysis by tracking success in user adoption or churn for users with different devices and network types. In addition, this disclosure provides solutions that can adapt a TCP profile, independently for each subscriber and in near-real time, based on their current network conditions. In the context of this use case, an entity can use this feature to improve user experience by detecting wireless network type and radio characteristics for configuring the optimal TCP profile per user device. An entity also can use this feature for policy driven actions, which can allow service and content providers to make decisions based on user experience (e.g., smaller files for more constrained users).

Adaptive TCP as described in this disclosure is likely to become increasingly important in the future, mainly because of the increase of the average TCP connection size (in terms of bytes or duration) and the adoption of new network technologies. Given that, congestion control algorithms should maintain their efficiency for even more network technologies. Providing comprehensive network analytics in a centralized and non-intrusive fashion renders the solutions of this disclosure more appealing compared to distributed, probe-based solutions, which are traditionally more expensive and harder to administrate.

An aspect provides a method for identifying a type of network of a transport layer connection. The method can include establishing metrics of network traffic traversing one or more devices via a plurality of transport layer connections providing communications with a plurality of types of networks. The metrics can include at least inter-arrival intervals of packets of the network traffic. The method can include classifying, by a network classifier, the plurality of types of networks into a classification model using at least the metrics of the plurality of types of networks. The method can include identifying, by the network classifier responsive to a device receiving one or more packets for a transport layer connection, a type of network of the plurality of types of networks for the transport layer connection based at least on metrics of the one or more packets and the classification model.

In some embodiments, the method can include capturing packets from the network traffic of the plurality of transport layer connections traversing the one or more devices. In some embodiments, the plurality of types of networks can include one of a mobile network or a fixed network. In some embodiments, the mobile network can include one of a 2G, 3G, 4G or 5G network.

In some embodiments, the metrics can include one or more of the following: average throughput, average instantaneous throughput, average inter-arrival intervals, average inter-sending interval, maximum round trip time, minimum round trip time, average round trip time, average load delay and average noise delay. In some embodiments, the metrics can include one or more of the following: a percentage of packets of the network traffic within a predetermined inter-arrival interval and a probability of a packet having the inter-arrival interval within the predetermined inter-arrival interval.

In some embodiments, the transport layer connection can be established with a mobile device via the type of network comprising a mobile network. In some embodiments, the method can include inferring, by the network classifier, the type of network for the transport layer connection based at least on comparing the metrics of the one or more packets to the classification model established by the network classifier for the plurality of types of networks. In some embodiments, the method can include distinguishing, by the network classifier, between different types of networks based on the inter-arrival intervals of the metrics. In some embodiments, the method can include distinguishing, by the network classifier, between different types of networks based on the average minimum round trip times of the metrics.

Another aspect provides a system for identifying a type of network of a transport layer connection. The system can include a network classifier executable on one or more processors, coupled to memory, and configured to receive metrics of network traffic traversing the one or more devices via a plurality of transport layer connections providing communications with a plurality of types of networks. The metrics can include at least inter-arrival intervals of packets of the network traffic. The network classifier can be configured to classify the plurality of types of networks into a classification model using at least the metric of the plurality of types of networks. The network classifier can be configured to identify, responsive to a device receiving one or more packets being for a transport layer connection, a type of network of the plurality of types of networks for the transport layer connection based at least on metrics of the one or more packets and the classification model.

In some embodiments, packets are captured from the network traffic of the plurality of transport layer connections traversing the one or more devices. In some embodiments, the plurality of types of networks can include one of a mobile network or a fixed network. In some embodiments, the mobile network can include one of a 2G, 3G, 4G or 5G network.

In some embodiments, the metrics can include one or more of the following: average throughput, average instantaneous throughput, average inter-arrival intervals, average inter-sending interval, maximum round trip time, minimum round trip time, average round trip time, average load delay and average noise delay. In some embodiments, the metrics can include one or more of the following: a percentage of packets of the network traffic within a predetermined inter-arrival interval and a probability of a packet having the inter-arrival interval within the predetermined inter-arrival interval.

In some embodiments, the transport layer connection can be established with a mobile device via the type of network including a mobile network. In some embodiments, the network classifier can be further configured to infer the type of network for the transport layer connection based at least on comparing the metrics of the one or more packets to the classification model established by the network classifier for the plurality of types of networks. In some embodiments, the network classifier can be further configured to distinguish between different types of networks based on the inter-arrival intervals of the metrics. In some embodiments, the network classifier can be further configured to distinguish between different types of networks based on the average minimum round trip times of the metrics.

Another aspect provides a method for determining network congestion and signal quality for a transport layer connection. The method can include establishing, by a network classifier executing on one or more processors, a classification model for a plurality of types of networks based on metrics of network traffic traversing one or more devices for a plurality of transport layer connections providing communications with a plurality of types of networks. The method can include receiving, by the network classifier, metrics of a plurality of packets for a transport layer connection. The method can include classifying, by the network classifier, a type of network for the transport layer connection based at least on the metrics and the classification model. The method can include determining, by the one or more processors, a level of congestion and a signal quality for the transport layer connection based on the metrics and the classification of the type of network. The method can include providing, by the one or more processors for display via a user interface, the level of congestion and the signal quality for the transport layer connection.

In some embodiments, the plurality of types of networks can include one of a type of a mobile network or a type of a fixed network. In some embodiments, the type of the mobile network can include one of a 2G, 3G, 4G or 5G network.

In some embodiments, the method can include determining from the metrics a load and noise delay per packet of the plurality of packets. In some embodiments, the method can include determining an average load delay and average noise delay for the transport layer connection. In some embodiments, the method can include determining a relative average load delay and relative average noise delay with respect to an average connection delay for the transport layer connection.

In some embodiments, the method can include determining an ideal throughput metric based at least on a number of bytes transferred and excluding network congestion and noise. In some embodiments, the method can include determining a degradation percentage for the transport layer connection based on a function of the ideal throughput metric and an average throughput of the transport layer connection. In some embodiments, the method can include determining the level of congestion for the transport layer connection based on a function of the ideal throughput metric and the load delay. In some embodiments, the method can include determining the signal quality for the transport layer connection based on a function of the ideal throughput metric and the noise delay.

Another aspect provides a system for identifying network congestion and signal quality for a transport layer connection. The system can include a network classifier executable on one or more processors, coupled to memory and configured to establish a classification model for a plurality of types of networks based on metrics of network traffic traversing one or more devices for a plurality of transport layer connections providing communications with a plurality of types of networks. The network classifier can be configured to receive metrics of a plurality of packets for a transport layer connection. The network classifier can be configured to classify a type of network for the transport layer connection based at least on the metrics and the classification model. The one or more processors can be configured to determine a level of congestion and a signal quality for the transport layer connection based on the metrics and the classification of the type of network and provide for display via a user interface the level of congestion and the signal quality for the transport layer connection.

In some embodiments, the plurality of types of networks can include one of a type of a mobile network or a type of a fixed network. In some embodiments, the type of the mobile network can include one of a 2G, 3G, 4G or 5G network.

In some embodiments, the one or more processors can be further configured to determine from the metrics a load and noise delay per packet of the plurality of packets. In some embodiments, the one or more processors can be further configured to determine an average load delay and average noise delay for the transport layer connection. In some embodiments, the one or more processors can be further configured to determine a relative average load delay and relative average noise delay with respect to an average connection delay for the transport layer connection.

In some embodiments, the one or more processors can be further configured to determine an ideal throughput metric based at least on a number of bytes transferred and excluding network congestion and noise. In some embodiments, the one or more processors can be further configured to determine a degradation percentage for the transport layer connection based on a function of the ideal throughput metric and an average throughput of the transport layer connection. In some embodiments, the one or more processors can be further configured to determine the level of congestion for the transport layer connection based on a function of the ideal throughput metric and the load delay. In some embodiments, the one or more processors can be further configured to determine the signal quality for the transport layer connection based on a function of the ideal throughput metric and the noise delay.

Another aspect provides a method for generating classification models based on advanced network analytics to classify transport layer network connections. The method includes capturing a plurality of network packets from a plurality of TCP network connections. The method includes analyzing the plurality of network packets to generate a plurality of metrics. The method includes collecting and consolidating the generated metrics for all analyzed TCP network connections. The method includes clustering the generated metrics to assign labels to the plurality of TCP connections. The method also includes generating classification models for the TCP connections.

Another aspect provides a system for generating classification models based on advanced network analytics to classify transport layer network connections. The system includes a packet capturing engine configured to capture a plurality of network packets from a plurality of TCP network connections. The system includes a packet analyzer configured to analyze the plurality of network packets to generate a plurality of metrics. The system includes a data accumulator configured to collect and consolidate the generated metrics for all analyzed TCP network connections. The system includes a data labeler configured to cluster the generated metrics to assign labels to the plurality of TCP connections. The system also includes a model generator configured to generate classification models for the TCP connections.

Another aspect provides a method for inferring a network type and network conditions. The method includes capturing a plurality of network packets from a plurality of TCP network connections. The method includes analyzing the plurality of network packets to generate a plurality of metrics. The method includes inferring network types of the plurality of TCP connections based on the plurality of metrics and at least one classification model. The method also includes estimating a level of network congestion for each TCP connection based on the plurality of metrics and the network types.

Another aspect provides a system for inferring a network type and network conditions. The system includes a packet capturing engine configured to capture a plurality of network packets from a plurality of TCP network connections. The system includes a packet analyzer configured to analyze the plurality of network packets to generate a plurality of metrics. The system includes a network classifier configured to infer network types of the plurality of TCP connections based on the plurality of metrics and at least one classification model. The system also includes a conditions ranking engine configured to estimate a level of network congestion for each TCP connection based on the plurality of metrics and the network types.

This Summary is provided to introduce a selection of concepts in a simplified form that are further described below in the Detailed Description. This Summary is not intended to identify key features or essential features, nor is it intended to limit the scope of the claims included herewith.

BRIEF DESCRIPTION OF THE FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

FIG. 8E is a flowchart of an example method for inferring a network type, network conditions, and signal quality;

FIGS. 12A and 12B depict a sample collection of evaluation reports;

DETAILED DESCRIPTION

For purposes of reading the description of the various embodiments below, the following descriptions of the sections of the specification and their respective contents may be helpful:

Section A describes a computing environment which may be useful for practicing embodiments described herein; and Section B describes systems and methods for using advanced network analytics to classify transport layer connections.

A. Computing Environment

Prior to discussing the specifics of embodiments of the systems and methods of an appliance and/or client, it may be helpful to discuss the computing environments in which such embodiments may be deployed.

Figure 1A:
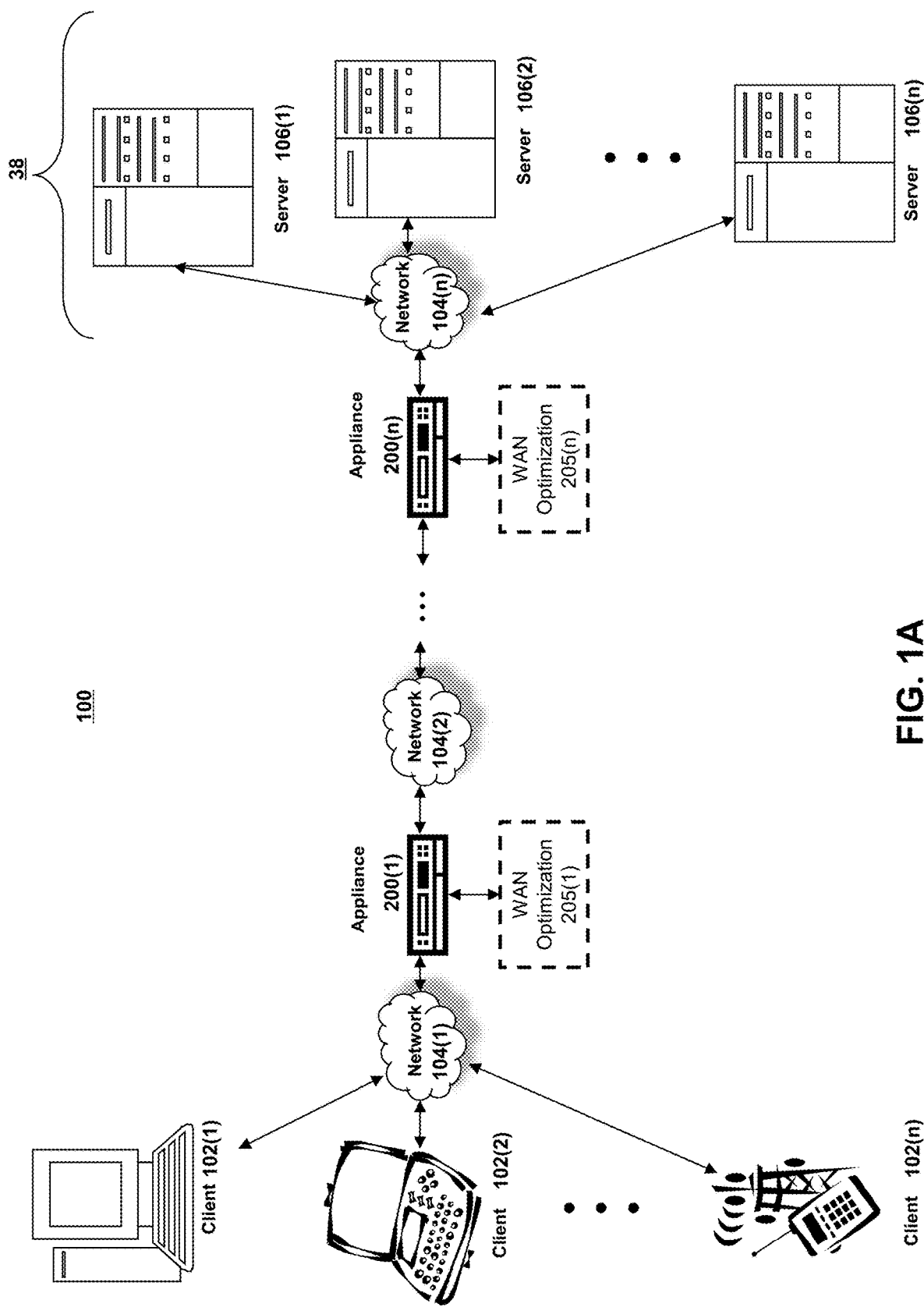
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as NetScaler® products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as CloudBridge® products sold by Citrix Systems, Inc. of Fort Lauderdale, Fla.

Figure 1B:
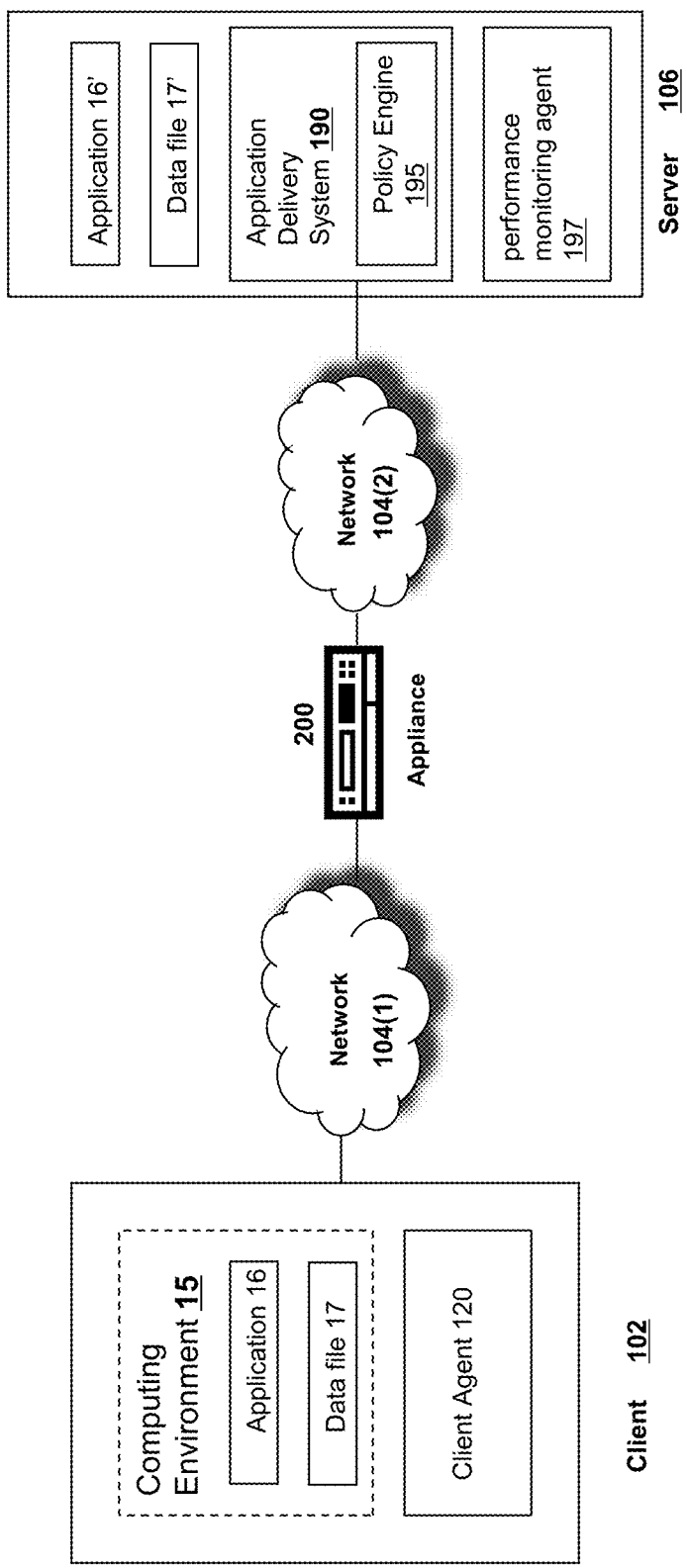
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as XenApp® or XenDesktop®.

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliances 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as EdgeSight by Citrix Systems, Inc. of Fort Lauderdale, Fla.

The monitoring agents may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
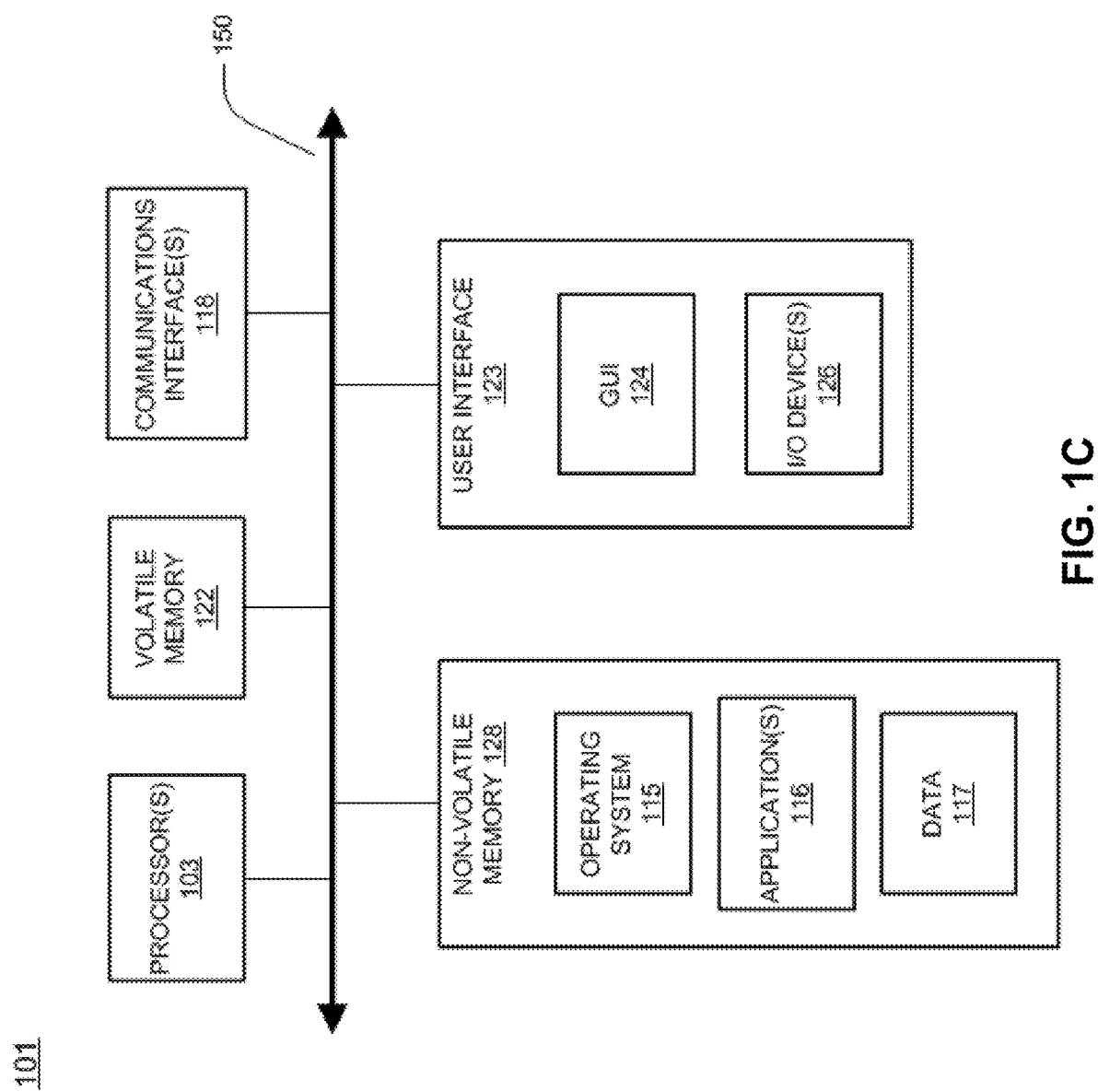
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the embodiment and operation of network environment 100, clients 102, servers 106, and appliances 200 and 205 may be as described in U.S. Pat. No. 9,538,345, issued Jan. 3, 2017 to Citrix Systems, Inc. of Fort Lauderdale, Fla., the teachings of which are hereby incorporated herein by reference.

Figure 2:
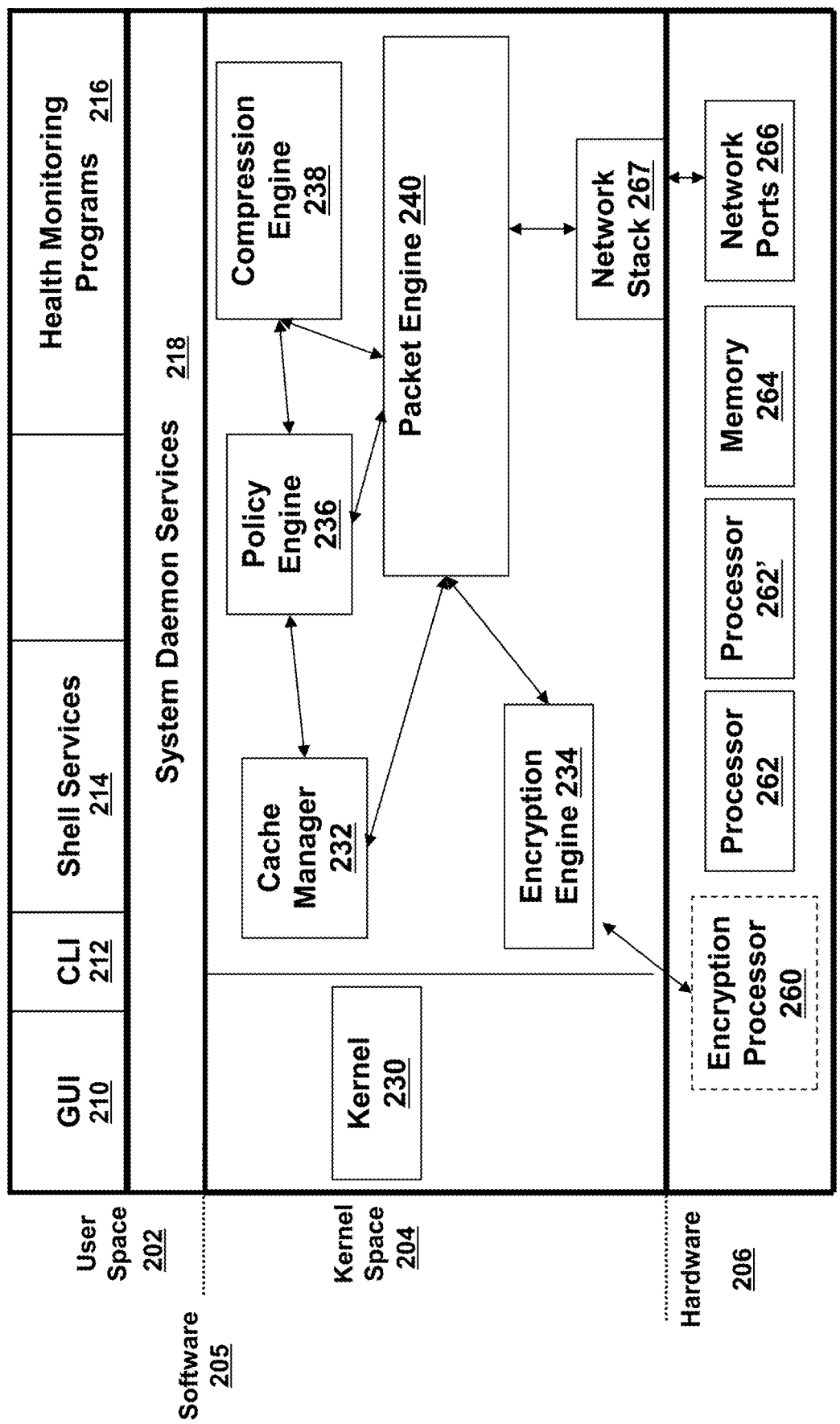
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layers connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the embodiment and operation of appliance 200 may be as described in U.S. Pat. No. 9,538,345, issued Jan. 3, 2017 to Citrix Systems, Inc. of Fort Lauderdale, Fla., the teachings of which are hereby incorporated herein by reference.

Figure 3:
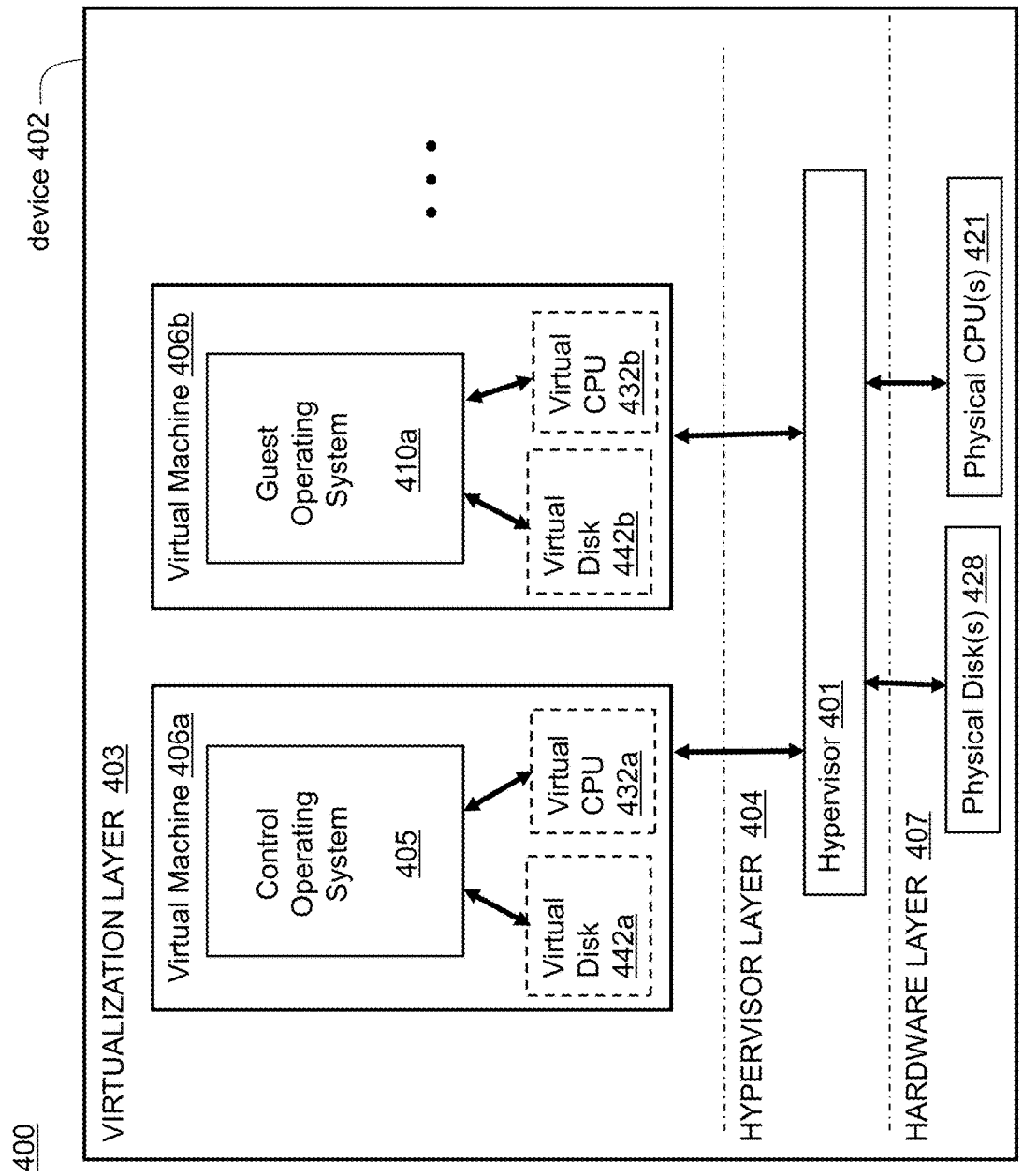
FIG. 3 is a block diagram of a virtualization environment, in accordance with an illustrative embodiment.

Referring now to FIG. 3, a block diagram of a virtualized environment 400 is shown. As shown, a computing device 402 in virtualized environment 400 includes a virtualization layer 403, a hypervisor layer 404, and a hardware layer 407. Hypervisor layer 404 includes one or more hypervisors (or virtualization managers) 401 that allocates and manages access to a number of physical resources in hardware layer 407 (e.g., physical processor(s) 421 and physical disk(s) 428) by at least one virtual machine (VM) (e.g., one of VMs 406) executing in virtualization layer 403. Each VM 406 may include allocated virtual resources such as virtual processors 432 and/or virtual disks 442, as well as virtual resources such as virtual memory and virtual network interfaces. In some embodiments, at least one of VMs 406 may include a control operating system (e.g., 405) in communication with hypervisor 401 and used to execute applications for managing and configuring other VMs (e.g., guest operating systems 410) on device 402.

In general, hypervisor(s) 401 may provide virtual resources to an operating system of VMs 406 in any manner that simulates the operating system having access to a physical device. Thus, hypervisor(s) 401 may be used to emulate virtual hardware, partition physical hardware, virtualize physical hardware, and execute virtual machines that provide access to computing environments. In an illustrative embodiment, hypervisor(s) 401 may be implemented as a XEN hypervisor, for example as provided by the open source Xen.org community. In an illustrative embodiment, device 402 executing a hypervisor that creates a virtual machine platform on which guest operating systems may execute is referred to as a host server. In such an embodiment, device 402 may be implemented as a XEN server as provided by Citrix Systems, Inc., of Fort Lauderdale, Fla.

Hypervisor 401 may create one or more VMs 406 in which an operating system (e.g., control operating system 405 and/or guest operating system 410) executes. For example, the hypervisor 401 loads a virtual machine image to create VMs 406 to execute an operating system. Hypervisor 401 may present VMs 406 with an abstraction of hardware layer 407, and/or may control how physical capabilities of hardware layer 407 are presented to VMs 406. For example, hypervisor(s) 401 may manage a pool of resources distributed across multiple physical computing devices.

In some embodiments, one of VMs 406 (e.g., the VM executing control operating system 405) may manage and configure other of VMs 406, for example by managing the execution and/or termination of a VM and/or managing allocation of virtual resources to a VM. In various embodiments, VMs may communicate with hypervisor(s) 401 and/or other VMs via, for example, one or more Application Programming Interfaces (APIs), shared memory, and/or other techniques.

In general, VMs 406 may provide a user of device 402 with access to resources within virtualized computing environment 400, for example, one or more programs, applications, documents, files, desktop and/or computing environments, or other resources. In some embodiments, VMs 406 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Although shown in FIG. 3 as including a single virtualized device 402, virtualized environment 400 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 400 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

Additional details of the embodiment and operation of virtualized computing environment 400 may be as described in U.S. Pat. No. 9,538,345, issued Jan. 3, 2017 to Citrix Systems, Inc. of Fort Lauderdale, Fla., the teachings of which are hereby incorporated herein by reference.

In some embodiments, a server may execute multiple virtual machines 406, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 400) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

Additional details of the embodiment and operation of a multi-processor and/or multi-core system may be as described in U.S. Pat. No. 9,538,345, issued Jan. 3, 2017 to Citrix Systems, Inc. of Fort Lauderdale, Fla., the teachings of which are hereby incorporated herein by reference.

Figure 4:
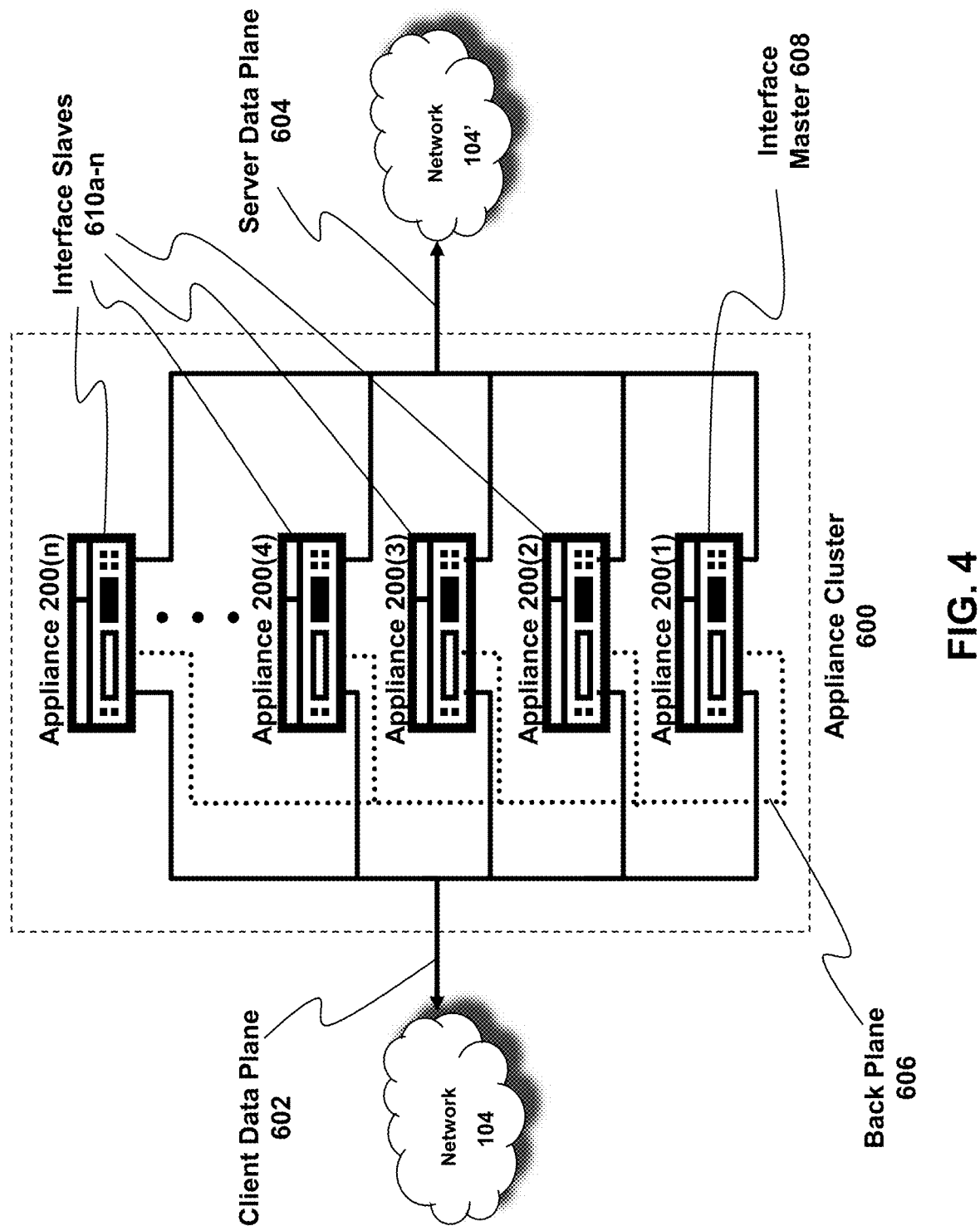
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 600. A plurality of appliances 200 or other computing devices (e.g., nodes) may be joined into a single cluster 600. Cluster 600 may operate as an application server, network storage server, backup service, or any other type of computing device to perform many of the functions of appliances 200 and/or 205.

In some embodiments, each appliance 200 of cluster 600 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 600 may be physically grouped or geographically proximate to one another, such as a group of blade servers or rack mount devices in a given chassis, rack, and/or data center. In some embodiments, one or more of appliances 200 of cluster 600 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 600 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 600 may be coupled to a first network 104(1) via client data plane 602, for example to transfer data between clients 102 and appliance cluster 600. Client data plane 602 may be implemented a switch, hub, router, or other similar network device internal or external to cluster 600 to distribute traffic across the nodes of cluster 600. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 600 may be coupled to a second network 104(2) via server data plane 604. Similarly to client data plane 602, server data plane 604 may be implemented as a switch, hub, router, or other network device that may be internal or external to cluster 600. In some embodiments, client data plane 602 and server data plane 604 may be merged or combined into a single device.

In some embodiments, each appliance 200 of cluster 600 may be connected via an internal communication network or back plane 606. Back plane 606 may enable inter-node or inter-appliance control and configuration messages, for inter-node forwarding of traffic, and/or for communicating configuration and control traffic from an administrator or user to cluster 600. In some embodiments, back plane 606 may be a physical network, a VPN or tunnel, or a combination thereof.

Additional details of cluster 600 may be as described in U.S. Pat. No. 9,538,345, issued Jan. 3, 2017 to Citrix Systems, Inc. of Fort Lauderdale, Fla., the teachings of which are hereby incorporated herein by reference.

B. Using Advanced Network Analytics To Classify Transport Layer Connections

The present disclosure is directed towards systems and methods for classifying transport layer connections, for instance, TCP connections, in terms of network type and estimating network conditions. The present solution examines network packets transmitted over TCP connections to generate various metrics relating to network performance. Based on these metrics, the network type of the TCP connection is inferred and then the signal quality and congestion level of the network can be determined in near-real time.

The network type and network conditions experienced by mobile users can be accurately inferred by inspecting the TCP packets anywhere in between the connection's endpoints. Particularly, in mobile wireless networks, the radio access technology (e.g. 2G, 3G & 4G) can be inferred and the perceived network congestion (e.g. None, Medium, High) and signal quality (e.g. Excellent, Good, Poor) can be perceived. This disclosure includes a novel design of a machine learning pipeline for inferring the radio access type of TCP connections with high accuracy. This disclosure also includes elegant modeling of congestion and signal quality in mobile wireless networks, as well as non-intrusive monitoring of TCP connections for producing advanced network analytics.

In the realm of mobile wireless networks, the degraded performance of TCP is a well-known problem, as are its causes. However, the complexity and dynamics of TCP, in conjunction with the various radio link technologies used in mobile wireless networks, hinder the establishment of a solid model that accounts for the perceived performance of a TCP connection. This disclosure models the complex interactions of TCP with the underlying radio access technologies and provides a comprehensive insight of the network in terms of performance and radio access types. As a result, the solutions provided in this disclosure allow the overall behavior of the network to be analyzed, in terms of the conditions experienced by mobile subscribers. In the context of this use case, entities (e.g., cellular network service providers, content providers who distribute content via a cellular network, etc.) can leverage this feature for network analysis, using the analytics for forward planning. Entities also can use the solutions provided in this disclosure for market analysis by tracking success in user adoption or churn for users with different devices and network types. In addition, this disclosure provides solutions that can adapt a TCP profile, independently for each subscriber and in near-real time, based on their current network conditions. In the context of this use case, an entity can use this feature to improve user experience by detecting wireless network type and radio characteristics for configuring the optimal TCP profile per user device. An entity also can use this feature for policy driven actions, which can allow service and content providers to make decisions based on user experience (e.g., smaller files for more constrained users).

Adaptive TCP as described in this disclosure is likely to become increasingly important in the future, mainly because of the increase of the average TCP connection size (in terms of bytes or duration) and the adoption of new network technologies. Given that, congestion control algorithms should maintain their efficiency for even more network technologies. Providing comprehensive network analytics in a centralized and non-intrusive fashion renders the solutions of this disclosure more appealing compared to distributed, probe-based solutions, which are traditionally more expensive and harder to administrate.

Figure 5:
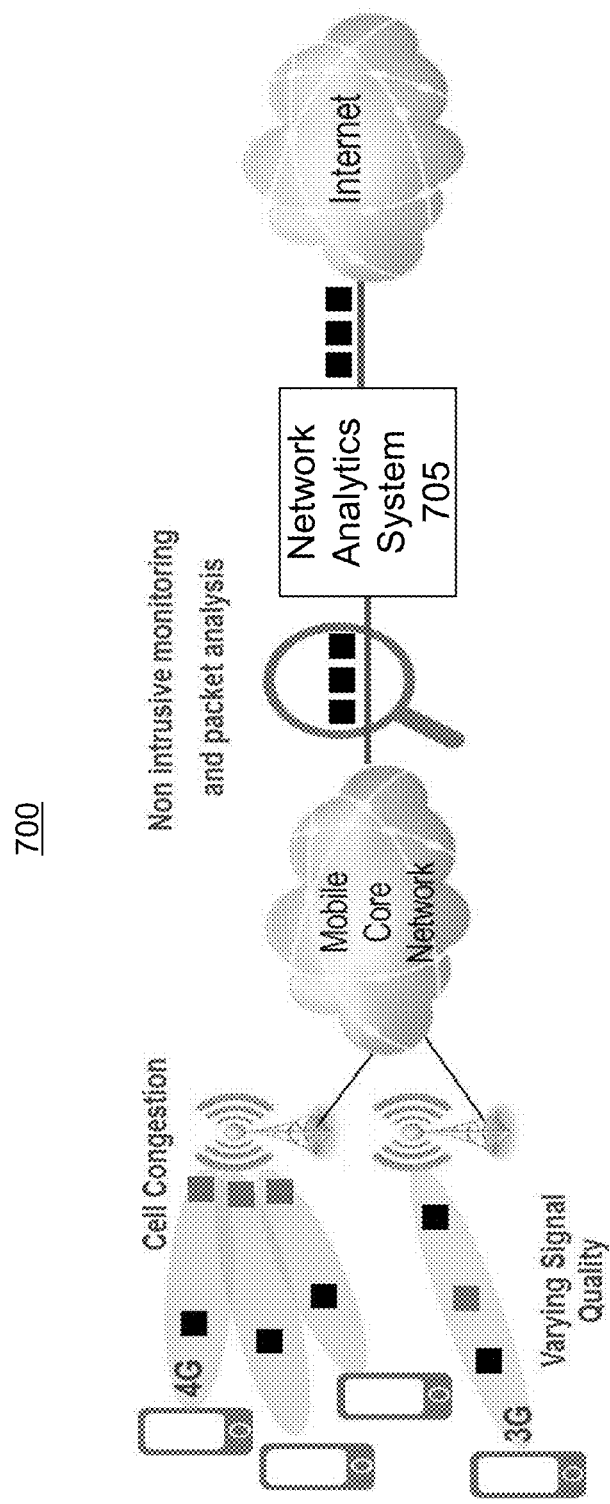
FIG. 5 is a block diagram of an embodiment of a mobile wireless computing environment.

Now referring to FIG. 5, a diagram of an embodiment of a mobile wireless computing environment 700 is shown. The network path in the computing environment 700 flows from right to left, and includes a network analytics system 705. The degraded performance of TCP connection in the computing environment 700 is primarily caused by the last hop—namely the radio access link. Whether this is due to poor signal conditions (data corruption) or network load (bottleneck), both phenomena are expressed as an increase in round trip time (RTT). However, to optimize the performance of TCP on such networks it is cardinal to distinguish between these two phenomena. The solutions of the present disclosure primarily focus on the last hop of the depicted network path, which is between the antenna and the mobile UE shown on the left-hand side of FIG. 5. Particularly, this disclosure concerns the way the base station transmits data to the UE.

Figure 6:
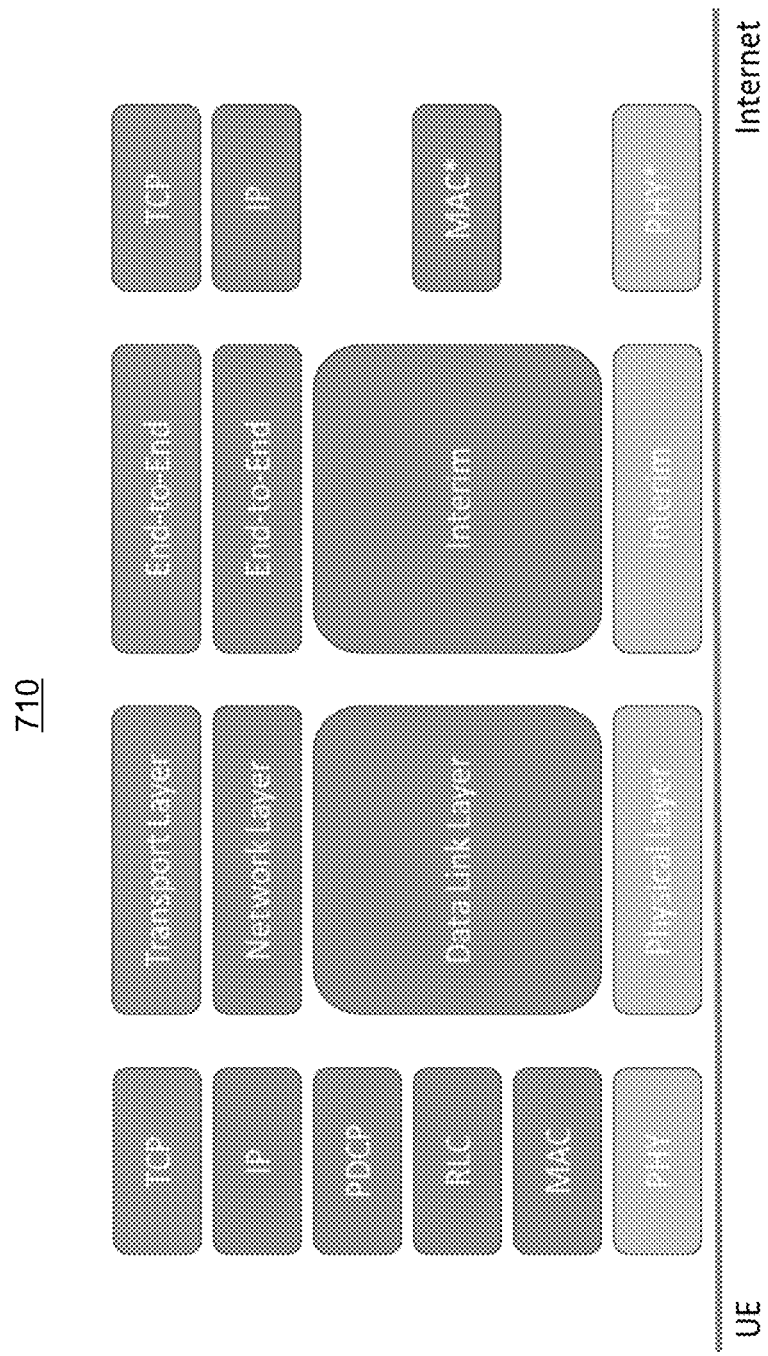
FIG. 6 depicts a wireless protocol stack for LTE and WCDMA.
Figure 7A:
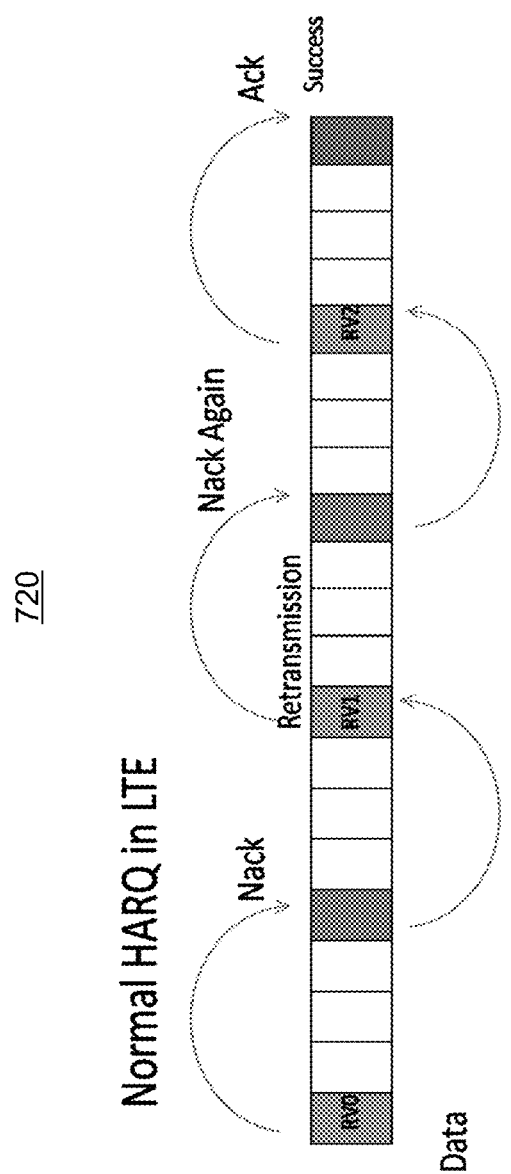
FIG. 7A depicts an example process that illustrates the HARQ mechanism.

Referring now to FIG. 6, the wireless protocol stack 710 for LTE and WCDMA pertinent to the user plane is shown. The wireless protocol stack 710 illustrates the protocols that span the entire path between the mobile UE and the internet and those that do not (marked with asterisk "*" in FIG. 6). Among these protocols, the MAC and RLC in Data Link Layer are of particular interest for this disclosure, because these two protocols implement error detection and recovery techniques for the transmitted user data. The data recovery is achieved by means of retransmission. The processes that implement this functionality in RLC and MAC layers are ARQ and HARQ, respectively. FIG. 7A depicts an example process 720 that illustrates the HARQ mechanism in case of LTE. Whenever a corrupted data packet is received, a series of retransmissions occur resulting in delays that are relayed to the TCP layer above. Each retransmission takes a specified time to complete, which is defined by the protocol standard. The nature of this type of delays is sporadic, random, and spiky.

Figure 7B:
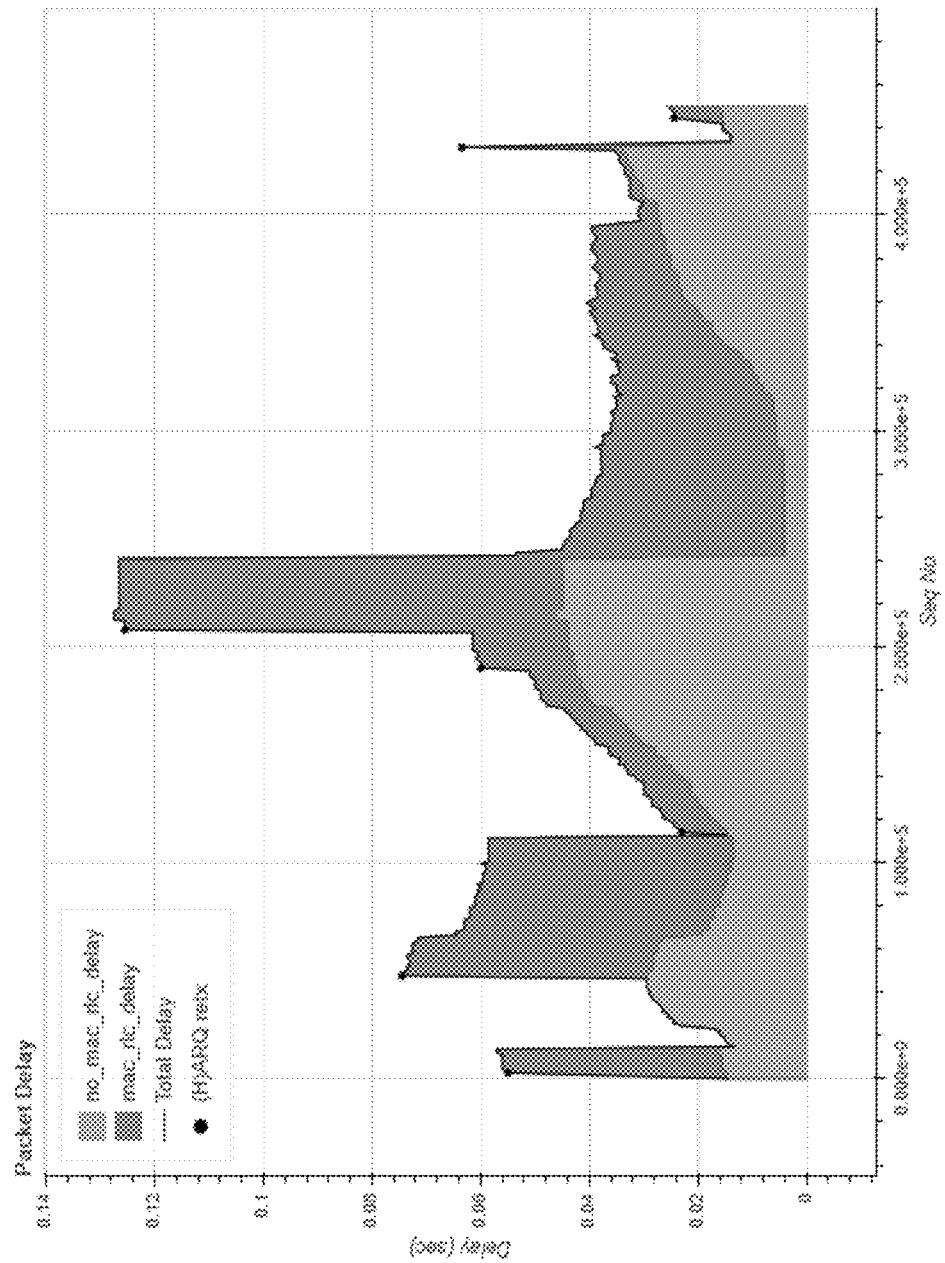
FIG. 7B depicts a plot 730 showing the packet delays in a TCP connection.
Figure 7C:
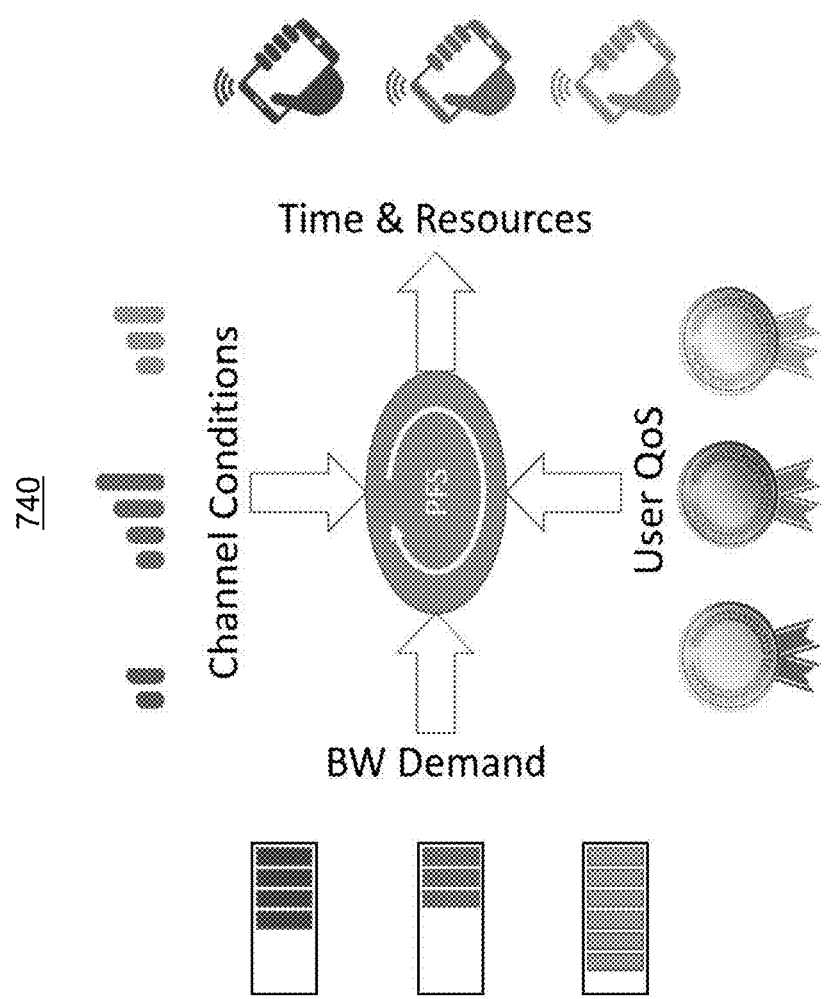
FIG. 7C depicts an example Proportional Fair Scheduler.

FIG. 7B depicts a plot 730 showing the packet delays in a TCP connection. In the plot 730 there are a few pronounced spikes in packet delay (marked with dots), which are a result of (H)ARQ retransmissions. The area in the plot 730 colored in red is the estimated effect of these wireless retransmissions, while the area colored in green is the estimated effect of congestion. Congestion is the result of service and queuing delays introduced by the Proportional Fair Scheduling (PFS) algorithm when the requested resources (bandwidth) exceed the available shared link capacity. The nature of this type of delay is small, constant, and increasing. An example Proportional Fair Scheduler 740 is shown in FIG. 7C.

Advanced PFS algorithms assign resources to the mobile UEs every Transmission Time Interval (TTI). The resource allocation is done dynamically taking into account the overall subscribers' demand and the network conditions experienced by each of them. The value of TTI is part of the protocol's specification, which is set to 1 ms for LTE and 2 ms for WCDMA. Each time the PFS algorithm decides not to schedule a particular subscriber, the packets of that specific subscriber are queued and the delay is increased one TTI. In other words, the temporal distance of consecutive packets, namely inter-sending/arrival interval, increases one TTI.

Figure 7D:
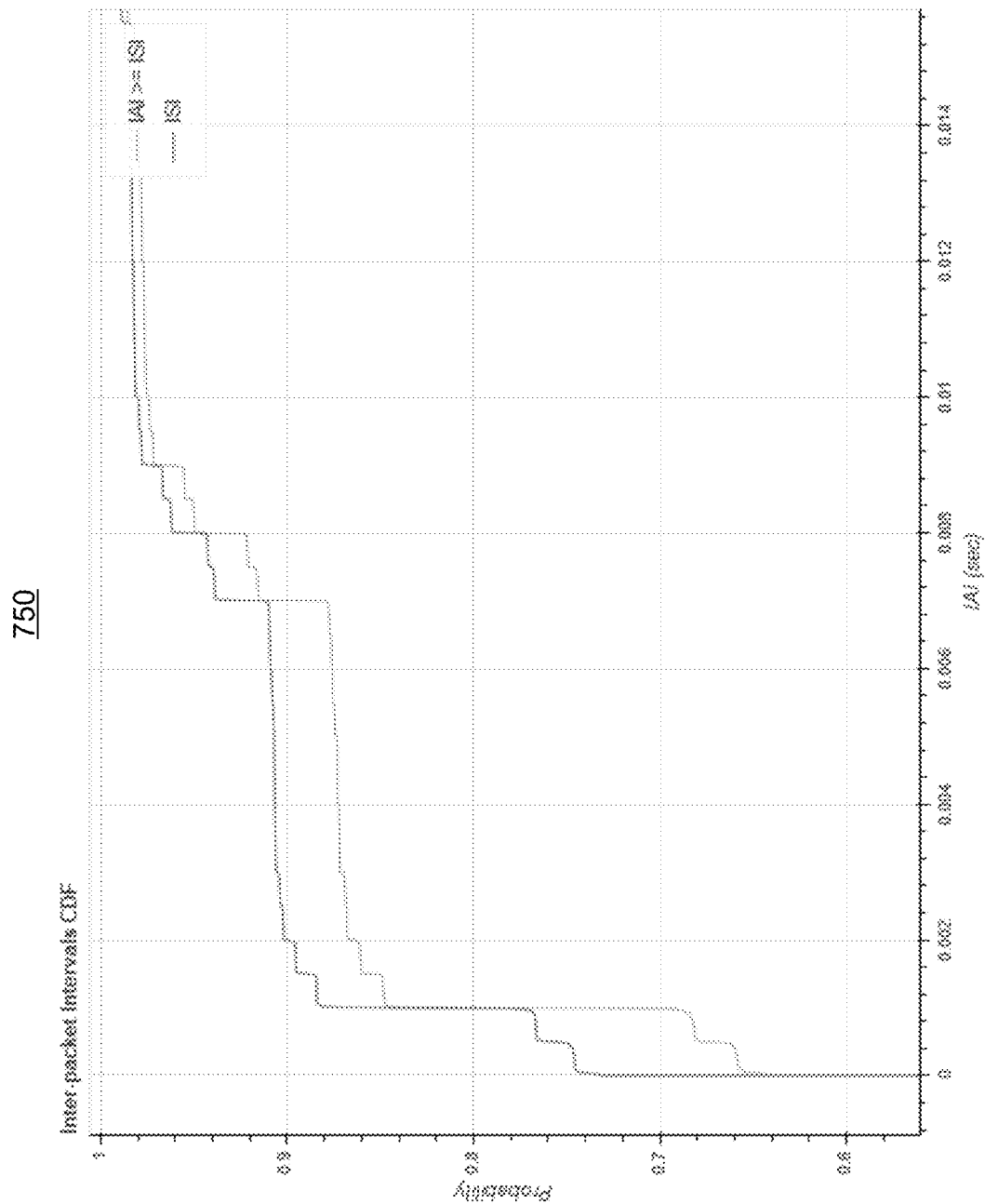
FIG. 7D depicts a plot showing the cumulative distribution function (CDF) of inter-arrival/sending intervals of packets for a LTE connection.
Figure 7E:
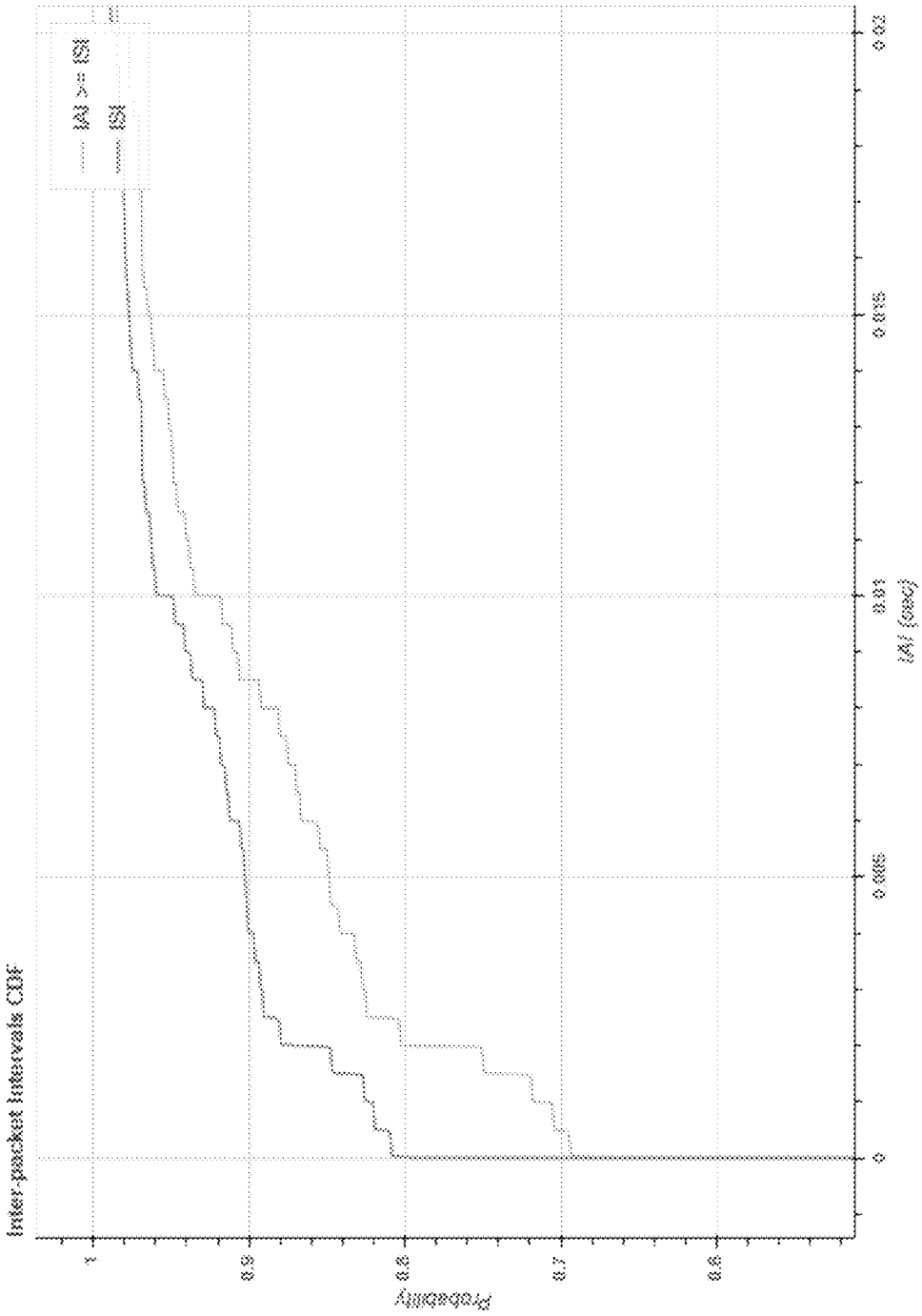
FIG. 7E depicts a plot showing the cumulative distribution function (CDF) of inter-arrival/sending intervals of packets for a WCDMA connection

FIG. 7D depicts a plot 750 showing the cumulative distribution function (CDF) of inter-arrival/sending intervals of packets for a LTE connection. In this example, a relatively large amount of packets (almost 20%) having an inter-arrival interval of 1 ms are shown, as is another group of packets having an inter-arrival interval of 7 ms. The latter is exhibited when HARQ retransmissions occur. The observed inter-arrival interval of 7 ms is in-line with the theoretical time of a HARQ retransmission. FIG. 7E depicts a plot 760 showing the respective CDF of a WCDMA connection. In this example, the first spike is located at 2 ms inter-arrival interval, which is the TTI of WCDMA, and the second spike is located at 10 ms, which is the time of a HARQ retransmission in WCDMA.

The systems and methods of this disclosure exploit the fact that TCP captures the peculiarities of the underlying protocols to infer the network type and estimate the network conditions. More specifically, a high percentage of TCP packets with 1 ms inter-arrival intervals provides strong evidence that the underlying wireless network is LTE. Similarly, a high percentage of TCP packets with 2 ms inter-arrival intervals is a strong indication that the underlying network is WCDMA. On the other hand, because the (H)ARQ retransmissions introduce a minimum delay, which is several times bigger (e.g., more than 7 ms) than the protocol's TTI, congestion can be distinguished from bad signal quality. The high-level description of the protocols' intervals discussed above can be leveraged to produce elaborate insights for the network under consideration, as discussed further below.

Figure 8A:
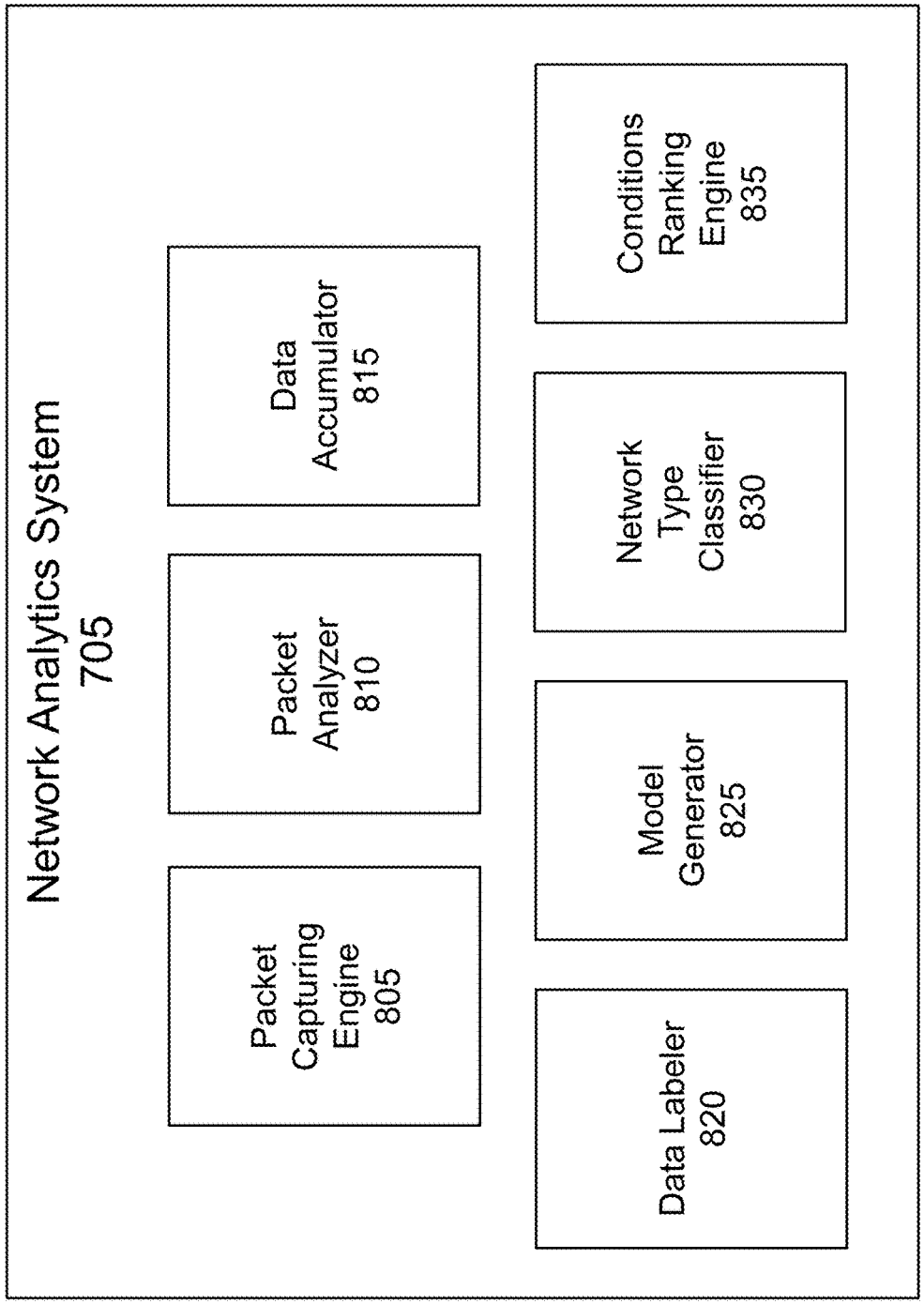
FIG. 8A is a block diagram of the network analytics system shown in FIG. 5.

FIG. 8A is a block diagram of the network analytics system 705 shown in FIG. 5. In some embodiments, the network analytics system 705 can be used to classify TCP connections in terms of network type and to estimate network conditions for TCP connections. The system 705 includes a packet capturing engine 805, a packet analyzer 810, a data accumulator 815, a data labeler 820, a model generator 825, a network type classifier 830, and a conditions ranking engine 835. Together, these components can collect and analyze network packets from TCP connections, and can provide insights into the types of those TCP connections and the network conditions experienced by users associated with the TCP connections. In some embodiments, the system 705 can be implemented as the appliance 200 shown in FIGS. 1A-1D, which can be an application delivery controller (ADC), for example. The system 705 can be used to implement the methods 850, 870, 880, and 890 shown in FIGS. 8B, 8E, 8F, and 8G, respectively. Thus, the functionality of the system 705 is described further below in connection with these methods.

Figure 8B:
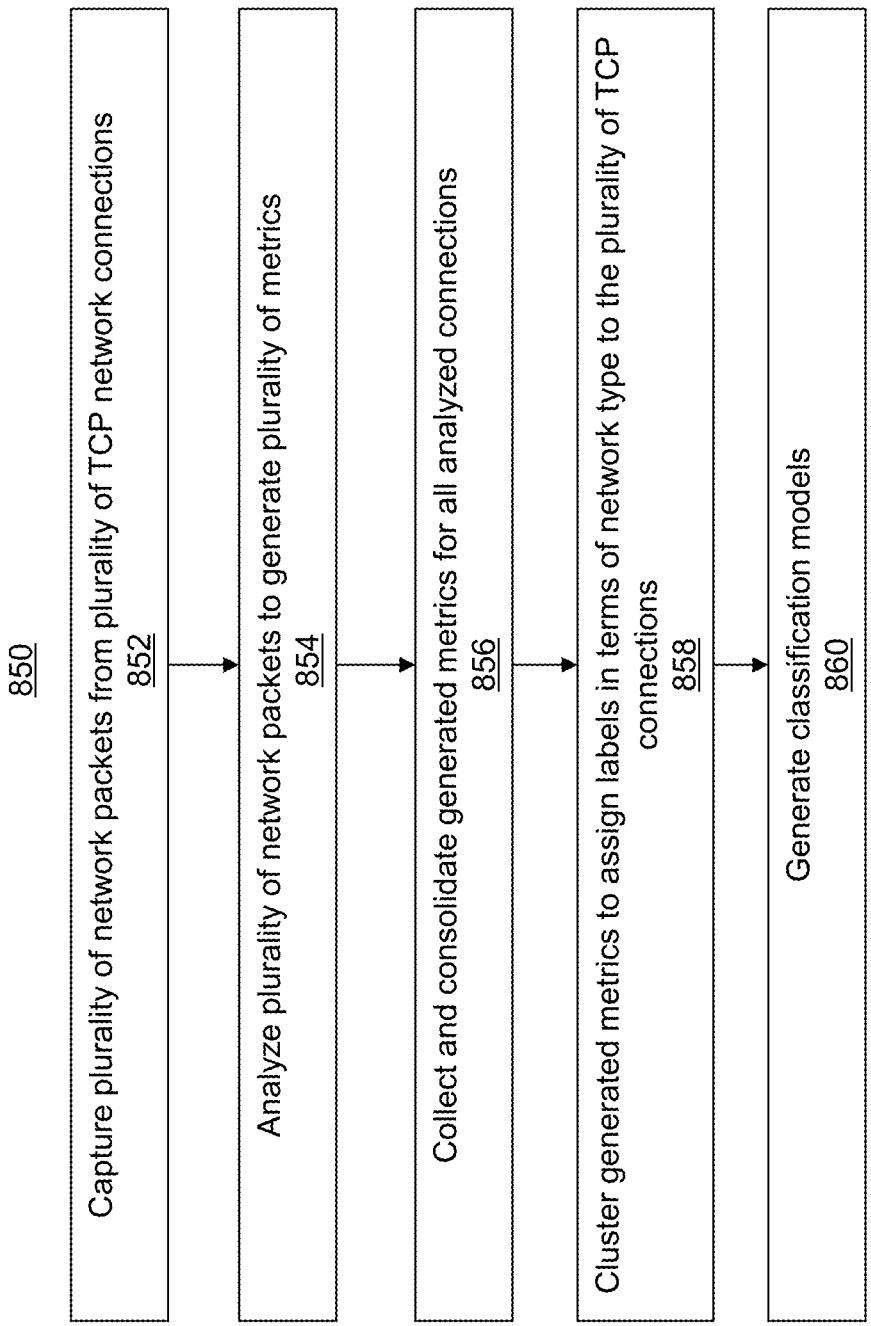
FIG. 8B is a flowchart of an example method for generating classification models.

Referring now to FIG. 8B, an example method 850 for generating classification models is shown. In brief overview, the method 850 includes capturing a plurality of network packets from a plurality of TCP network connections (step 852), analyzing the plurality of network packets to generate a plurality of metrics (step 854), collecting and consolidating the generated metrics for all analyzed TCP network connections (step 856), clustering the generated metrics to assign labels in terms of network type to the plurality of TCP connections (step 858), and generating classification models (step 860).

Referring again to FIG. 8B, the method 850 includes capturing a plurality of network packets from a plurality of TCP network connections (step 852). In some embodiments, this can be performed by the packet capturing engine 805. For example, the packet capturing engine 805 can be configured to receive a plurality of packets associated with a plurality of TCP connections or streams. Each stream or connection may be associated with a different mobile device. For each packet, the packet capturing engine 805 can generate and retain a copy of the packet, while also forwarding the received packet on to its intended destination. In some embodiments, the packet capturing engine 805 also can determine a particular TCP connection associated with each packet. For example, the packet capturing engine 805 can determine such information by examining a header included in each packet. Thus, the packet capturing engine 805 can identify all of the packets that are received in connection with a given TCP connection, even if multiple TCP connections are established within the system 705.

The method 850 also includes analyzing the plurality of network packets to generate a plurality of metrics (step 854). In some embodiments, this step can be performed by the packet analyzer 810 shown in FIG. 8A. The metrics generated in this step can be associated with a respective TCP stream or connection. Thus, the packet analyzer 810 can be configured to generate a set of metrics for each TCP stream or connection for which packets are captured by the packet capturing engine 805. In some embodiments, for each TCP stream of connection, the packet analyzer 810 can generate metrics related to any combination of average instantaneous throughput, minimum, maximum and average RTT, average inter-sending intervals of TCP packets, average inter-arrival intervals of TCP packets, probability of 1 ms inter-arrival interval, probability of 2 ms inter-arrival interval, average inter-arrival intervals in range (0-7 ms), average inter-arrival intervals in range (7 ms-inf), average load delay, and average noise delay. In some embodiments, the packet analyzer 810 can be configured to generate these metrics using a variety of algorithms, some of which are described further below in connection with FIGS. 9A-9C.

The method 850 also includes collecting and consolidating the generated metrics for all analyzed TCP network connections (step 856). In some embodiments, this step can be performed by the data accumulator 815 shown in FIG. 8A. Generally, the data accumulator 815 can be configured to collect all of the metrics for each TCP connection. For example, the data accumulator 815 can store information relating to each of the generated metrics in a data structure that is associated with a respective TCP connection, so that the metrics and their corresponding TCP connections can be retrieved for further processing.

The method 850 also includes clustering the generated metrics to assign labels to the plurality of TCP connections (step 858). This step can be performed, for example, by the data labeler 820 shown in FIG. 8A. In some embodiments, the data labeler 820 can leverage clustering methods in order to overcome the obstacle of not having labeled training data. The data labeler 820 can generate such labeled data, which can be used later by the network type classifier 830.

Figure 8C:
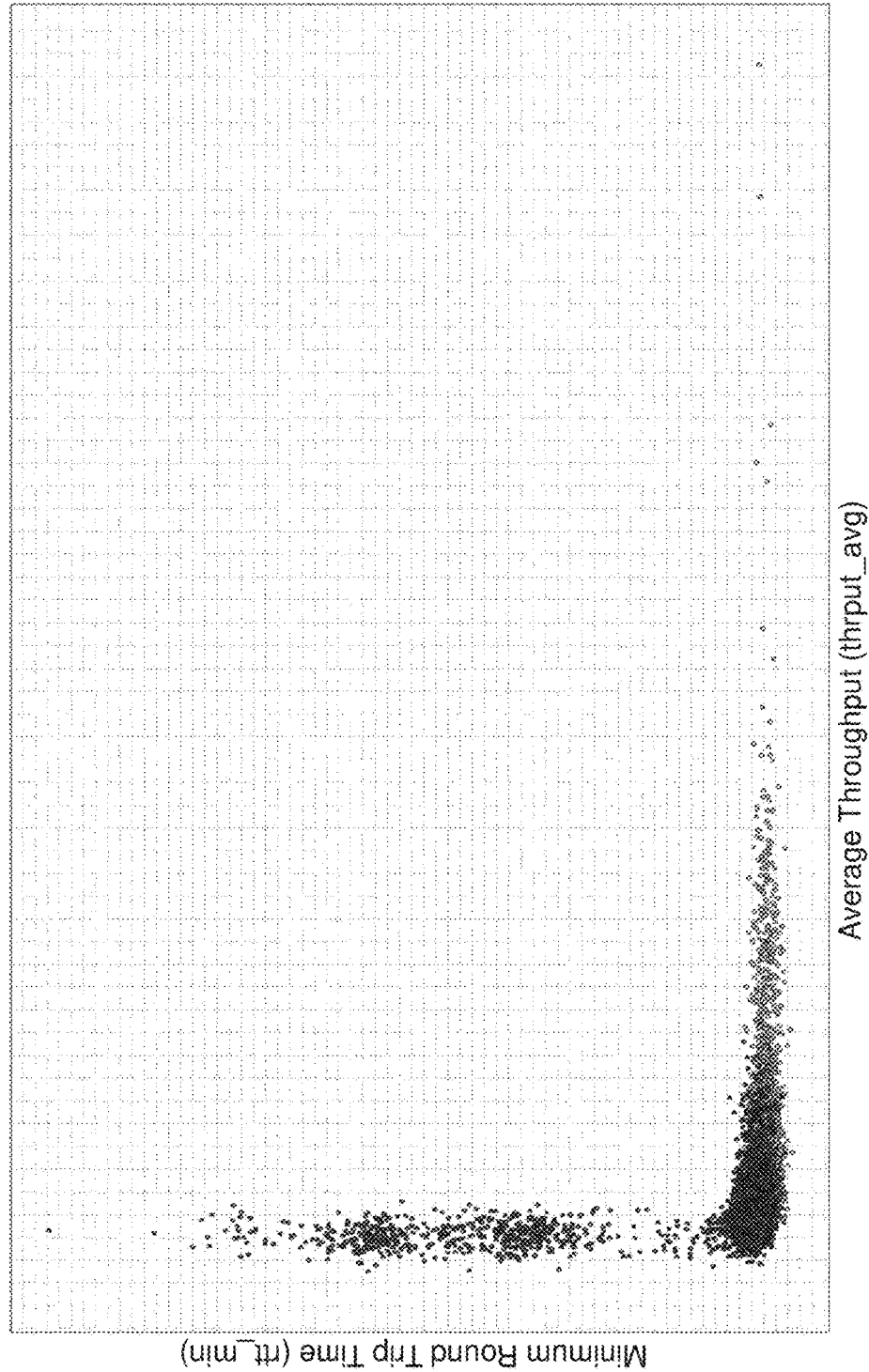
FIG. 8C depicts a chart showing clusters of TCP connections by network type.
Figure 8D:
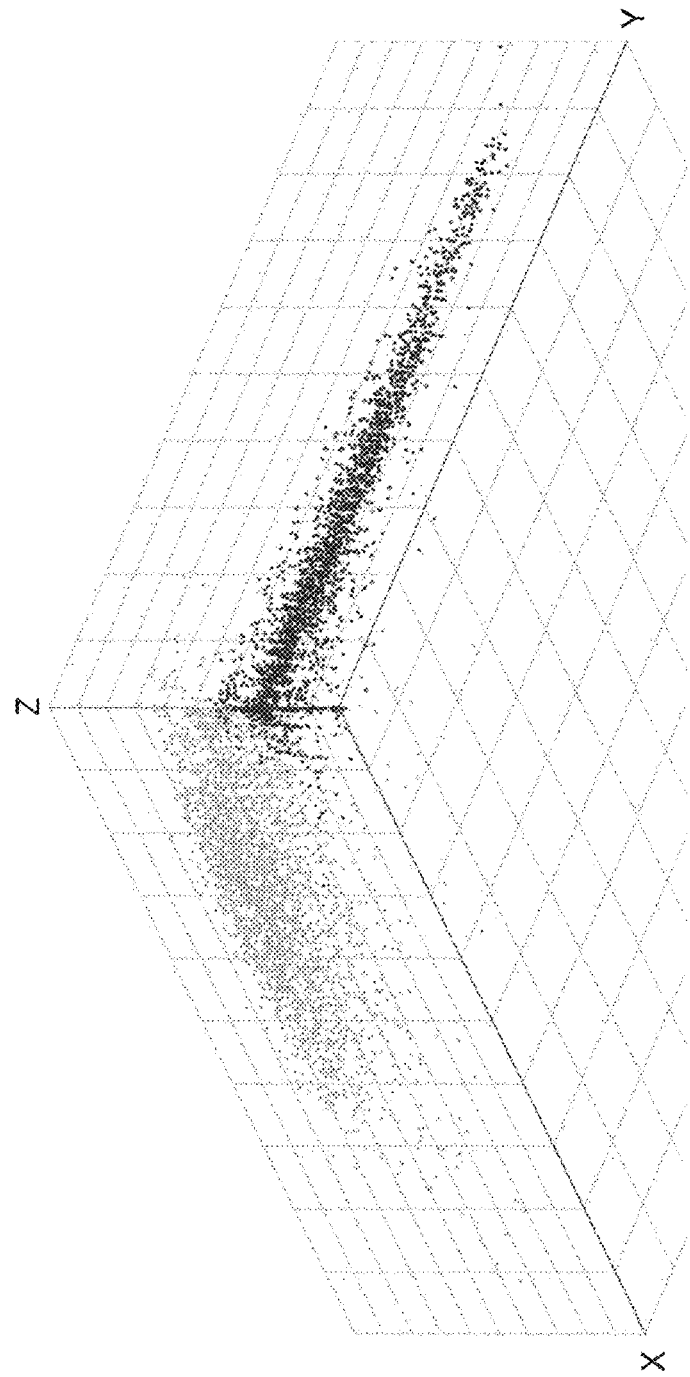
FIG. 8D depicts a chart showing how connections of different network types are separated and identified by a data labeler.

FIG. 8C depicts a chart 863 showing the 2G connections clustered in red and the 3G and 4G connections in blue and green respectively. The data labeler 820 can assign the "2G" label to the connections belonging in the group with the highest average min RTT and label "Other" to the second group, as illustrated in FIG. 8C. In some embodiments, the data labeler 820 can label the 2G connections with accuracy of about 99%. Subsequently, the data labeler 820 can implement data filtering functionality in which all connections marked as "2G" are filtered out and the group containing the 3G and 4G connections is kept. Then, the data labeler 820 can repeat the same procedure in order to distinguish the 3G connections from the 4G connections. In some embodiments, the data labeler 820 can distinguish between 3G connections and 4G connections by using spectral clustering with the following attributes: average instantaneous throughput, minimum/maximum and average RTT, average inter-arrival intervals, average inter-sending intervals, probability of 1 ms inter-arrival interval, probability of 2 ms inter-arrival interval, average inter-arrival intervals in range (0-7 ms), average inter-arrival intervals in range (7 md-inf). FIG. 8D depicts a chart 865 showing how the 3G and 4G connections are separated and identified by the data labeler 820 using only three metrics: average instantaneous throughput and probability of 1 ms inter-arrival interval, probability of 2 ms inter-arrival interval. In accordance with the description above, the data labeler 820 can assign the "3G" label to the connections with the highest average min RTT and the "4G" label to the other group. In some embodiments, the accuracy of this functionality can be about 98% on average.

The method 850 also includes generating classification models (step 860). In some embodiments, this step can be performed by the model generator 825 shown in FIG. 8A. In some embodiments, the model generator 825 can generate a model by first training and testing a logistic regression model, in which the dependent variable is the network type inferred in the previous step. In general, this step can be implemented as a multiclass classification problem in which the connections are classified into two (or more) classes that can correspond to network types, such as "2G," "3G," "4G," etc. The multiclass classification problem can be transformed into a set of binary classification problems, which may easier for the model generator 825 to solve and may facilitate the adoption of additional classes in the future, such as "5G" and WiFi. Thus, this step can include identifying all of the TCP connections that correspond to a first network type based on the generated metrics, and determining those TCP connections as corresponding to the first network type. For example, if the TCP connections include 2G, 3G, and 4G connections, this step can form two groups of connections: a first group containing 2G connections, and a second group containing non-2G connections (i.e., 3G and 4G connections together). In some embodiments, the model generator 825 can implement this step using a K-Means algorithm with two metrics, including average instantaneous throughput and minimum RTT. The logistic model can be used to predict the type of a connection between "2G" or "Other." Then, the model generator 825 can perform training and testing of a logistic regression model to predict the type of a connection between "3G" and "4G." This functionality can be repeated as many times as needed, depending on the number of different network types. Thus, the model generator 825 can produce models for distinguishing between all of the network types corresponding to the network packets received by the system 705.

FIG. 8E shows an example method 870 for inferring a network type, network conditions, and signal quality. As discussed above, in some embodiments, the method 870 also can be performed by the system 705 shown in FIG. 8A. In brief overview, the method 870 includes capturing a plurality of network packets from a plurality of TCP network connections (step 872), analyzing the plurality of network packets to generate a plurality of metrics (step 874), inferring network types of the plurality of TCP connections based on the plurality of metrics and at least one classification model (step 876), and estimating a level of network congestion and signal quality for each TCP connection based on the plurality of metrics and the network types (step 878).

Referring again to FIG. 8E, the method 870 includes capturing a plurality of network packets from a plurality of TCP network connections (step 872) and analyzing the plurality of network packets to generate a plurality of metrics (step 874). It should be understood that these steps are substantially the same as steps 852 and 854 of the method 850 shown in FIG. 8B and described above. Thus, these steps can be performed by the packet capturing engine 805 and the packet analyzer 810, respectively, shown in FIG. 8A.

The method 870 also includes inferring network types of the plurality of TCP connections based on the plurality of metrics and at least one classification model (step 876). In some embodiments, this can be performed by the network type classifier 830 shown in FIG. 8A. In some embodiments, the network type classifier 830 can take as input the metrics generated in the previous step, as well as the classification models derived by the model generator 825 as part of the method 850 shown in FIG. 8B. From this information, the network type classifier 830 can infer the network type of each connection represented in the packet data received by the packet capturing engine 805. In some embodiments, the network type classifier 830 determines a network type only for TCP connections that have not been used to generate a model. Thus, training data for the models can be separated from data that is used to infer network types based on the models.

The method 870 also includes estimating a level of network congestion and signal quality for each TCP connection based on the plurality of metrics and the network types (step 878). In some embodiments, this step can be performed by the conditions ranking engine 835 shown in FIG. 8A. The conditions ranking engine 835 can take as input the metrics and the classification decision from the previous two steps and can estimate the level of congestion and signal quality for the connection based on these inputs. In some embodiments, the conditions ranking engine 835 can estimate load and noise delays, normalize the load and noise delays, and can generate signal quality and congestion rankings based on the normalized load and noise delays.

Figure 8F:
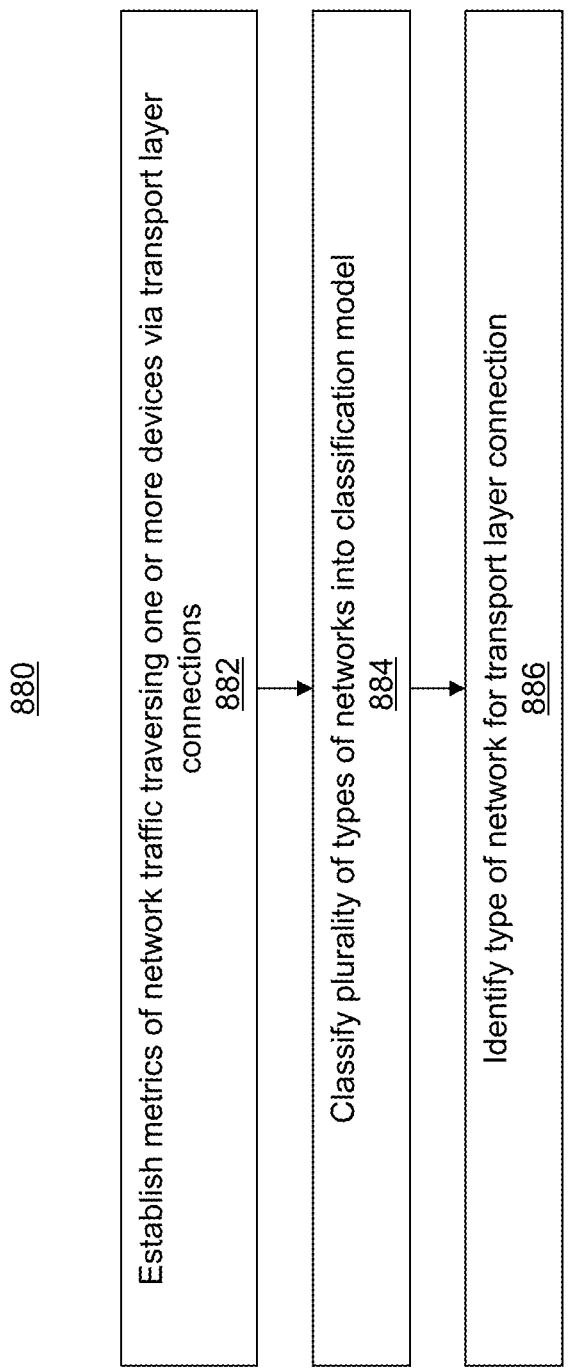
FIG. 8F is a flowchart of an example method for identifying a type of network of a transport layer connection.

FIG. 8F is a flowchart of an example method 880 for identifying a type of network of a transport layer connection. As discussed above, in some embodiments, the method 880 also can be performed by the system 705 shown in FIG. 8A. In brief overview, the method 880 includes establishing metrics of network traffic traversing one or more devices via a plurality of transport layer connections (step 882). The method 880 includes classifying, by a network classifier, the plurality of types of networks into a classification model (step 884). The method 880 includes identifying, by the network classifier responsive to a device receiving one or more packets for a transport layer connection, a type of network of the plurality of types of networks for the transport layer connection (step 886).

Referring again to FIG. 8F, the method 880 includes establishing metrics of network traffic traversing one or more devices via a plurality of transport layer connections (step 882). In some embodiments, this step can be performed by any of the a packet capturing engine 805, a packet analyzer 810, a data accumulator 815, a data labeler 820, a model generator 825, a network type classifier 830, and a conditions ranking engine 835 of the network analytics system 705. The plurality of transport layer connections can provide communications with a plurality of different types of networks. For example, the plurality of types of networks can include mobile networks or fixed networks. In some embodiments, a mobile network can be a 2G, 3G, 4G or 5G network. If at least one of the networks includes a mobile network, the transport layer connection associated with the mobile network can be established with a mobile device, such as a cellular phone or tablet computing device. In some embodiments, the metrics can be established by capturing packets from the network traffic of the plurality of transport layer connections traversing the one or more devices. For example, network packets may be captured by the packet capturing engine 805 of the network analytics system 705.

The metrics established in step 882 can include any metrics relating to the network traffic, such as average throughput, average instantaneous throughput, average inter-arrival intervals, average inter-sending interval, maximum round trip time, minimum round trip time, average round trip time, average load delay and average noise delay. In some embodiments, the metrics can include a percentage of packets of the network traffic within a predetermined inter-arrival interval and a probability of a packet having the predetermined inter-arrival interval.

The method 880 includes classifying, by a network classifier such as the network type classifier 830 of FIG. 8A, the plurality of types of networks into a classification model (step 884). In some embodiments, the classification model can be a model derived by the model generator 825 as part of the method 850 shown in FIG. 8B. In some embodiments, the network classifier can generate or establish a classification model using the metrics of the plurality of types of networks. The network classifier can classify different networks into at least of a plurality of network types using the classification model. In some embodiments, a logistic regression model can be trained and tested, as described above. In some embodiments, the dependent variable for such a regression can be the network type. Producing the model can be thought of as a multiclass classification problem in which the connections are classified into two (or more) classes that can correspond to network types, such as "2G," "3G," "4G," etc. The multiclass classification problem can be transformed into a set of binary classification problems. For example, if the TCP connections include 2G, 3G, and 4G connections, generating the model can include forming two groups of connections: a first group containing 2G connections, and a second group containing non-2G connections (i.e., 3G and 4G connections together). In some embodiments, the network classifier 830 or the model generator 825 can implement this step using a K-Means algorithm with two metrics, including average instantaneous throughput and minimum RTT.

The method 880 also includes identifying, by the network classifier responsive to a device receiving one or more packets for or via a transport layer connection, a type of network of the plurality of types of networks for the transport layer connection (step 886). In some embodiments, the device can be a network analytics system such as the network analytics system 705. In some embodiments, a component such as the network type classifier can infer the type of network for the transport layer connection by comparing the metrics of the one or more packets to the classification model established by the network classifier for the plurality of types of networks in step 884. In some embodiments, the network classifier can also distinguish between different types of networks based on the various metrics established in step 882, such as the inter-arrival intervals of the network packets or the average minimum round trip times of the network packets.

Figure 8G:
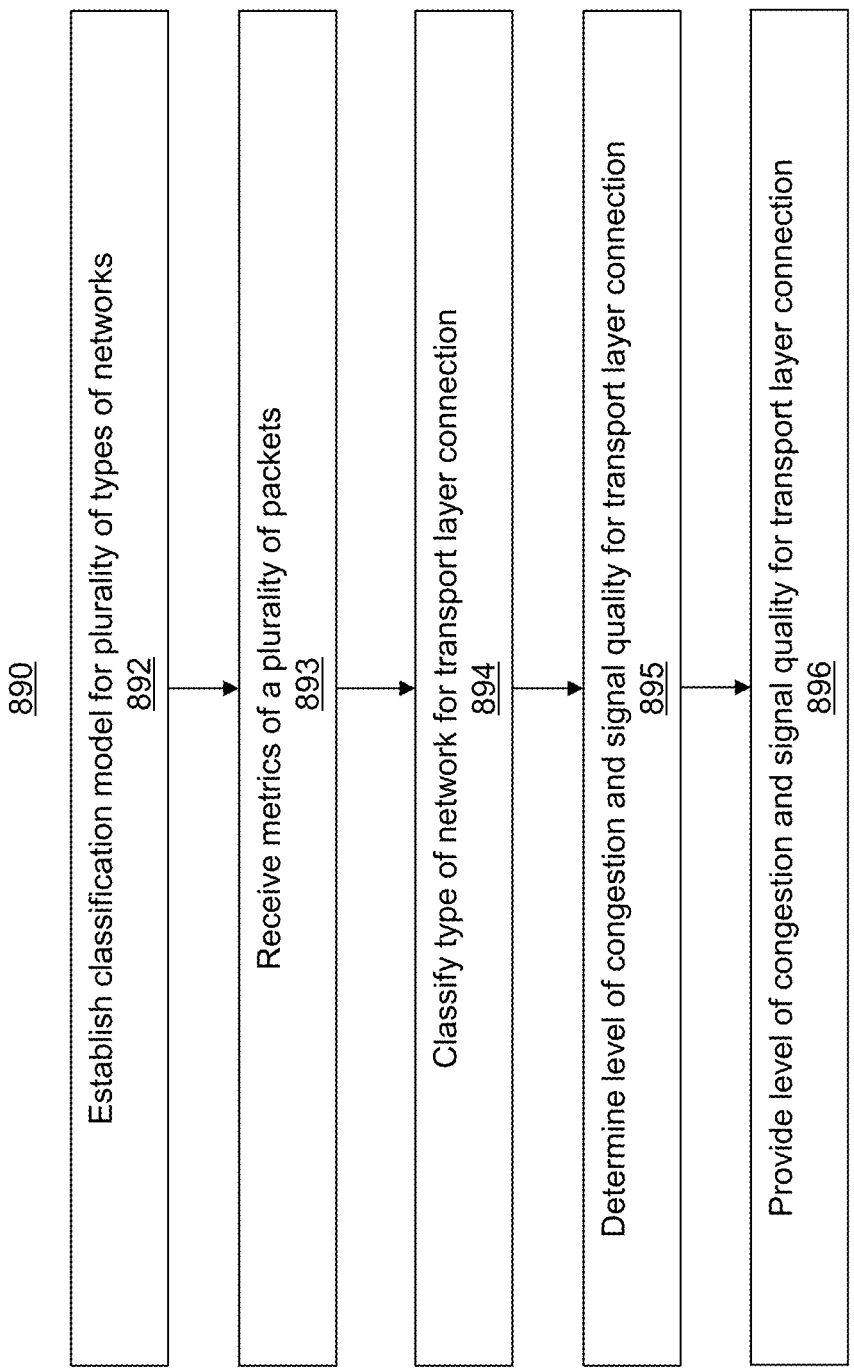
FIG. 8G is a flowchart of an example method for determining network congestion and signal quality for a transport layer connection.

FIG. 8G is a flowchart of an example method 890 for determining network congestion and signal quality for a transport layer connection. As discussed above, in some embodiments, the method 890 also can be performed by the system 705 shown in FIG. 8A. In brief overview, the method 890 includes establishing a classification model for a plurality of types of networks (step 892). The method 890 includes receiving metrics of a plurality of packets (step 893). The method 890 includes classifying a type of network for a transport layer connection (step 894). The method includes determining a level of congestion and a signal quality for the transport layer connection (step 895). The method 890 also includes providing the level of congestion and the signal quality for the transport layer connection (step 896).

Referring again to FIG. 8G, the method 890 includes establishing a classification model for a plurality of types of networks (step 892). In some embodiments, this step can be performed by the network type classifier 830 of the system 705. The network type classifier 830 can establish the model based on metrics of network traffic traversing one or more devices (which may include the system 705) for a plurality of transport layer connections providing communications with a plurality of types of networks. In some embodiments, packets included in the network traffic can be captured, for example, by the packet capturing engine 805. The classification model established in step 892 can be one of the models generated by the model generator 825. In some embodiments, the plurality of types of networks can include a type of a mobile network or a type of a fixed network. For example, a mobile network type may include a 2G, 3G, 4G, or 5G network.

The method 890 includes receiving metrics of a plurality of packets (step 893). In some embodiments, the packets can be included in a transport layer connection that facilitates transmittal of the network traffic. The metrics can be received, for example, by the network type classifier 830. After the metrics have been received, the method 890 includes classifying a type of network for a transport layer connection (step 894). This step can also be performed by the network type classifier 830. In some embodiments, the network type classifier 830 can classify the type of network based on the metrics received in step 893. In some embodiments, classifying the network type can include inferring the type of network by comparing the results of the one or more classification models generated by the model generator 825, or by analyzing any other suitable metrics of the network traffic.

The method 890 includes determining a level of congestion and a signal quality for the transport layer connection (step 895). In some embodiments, this step can be performed by the conditions ranking engine 835. For example, the conditions ranking engine can determine the congestion and signal quality based on the metrics and the classification of the network type. In some embodiments, the other information can also be determined based on the metrics. For example, a load and noise delay per packet of the plurality of packets can be determined based on the metrics. In some embodiments, the method can include determining an average load delay and average noise delay for the transport layer connection. For example, the average load delay and average noise delay can be determined by the packet analyzer 810. In addition, the packet analyzer 810 may also determine a relative average load delay and a relative average noise delay with respect to an average connection delay for the transport layer connection.

In still other embodiments, the method 890 can include determining, by the packet analyzer 810, an ideal throughput metric based on a number of bytes transferred and excluding network congestion and noise. In some embodiments, the packet analyzer 810 can determine a degradation percentage for the transport layer connection based on a function of the ideal throughput metric and an average throughput of the transport layer connection. In some embodiments, the packet analyzer 810 can determine the level of congestion for the transport layer connection based on a function of the ideal throughput metric and the load delay. In some embodiments, the packet analyzer 810 can determine the signal quality for the transport layer connection based on a function of the ideal throughput metric and the noise delay.

The method 890 also includes providing the level of congestion and the signal quality for the transport layer connection (step 896). In some embodiments, the level of congestion and the signal quality can be provided for display via a user interface, such as the user interface 123 shown in FIG. 1C.

Figure 9A:
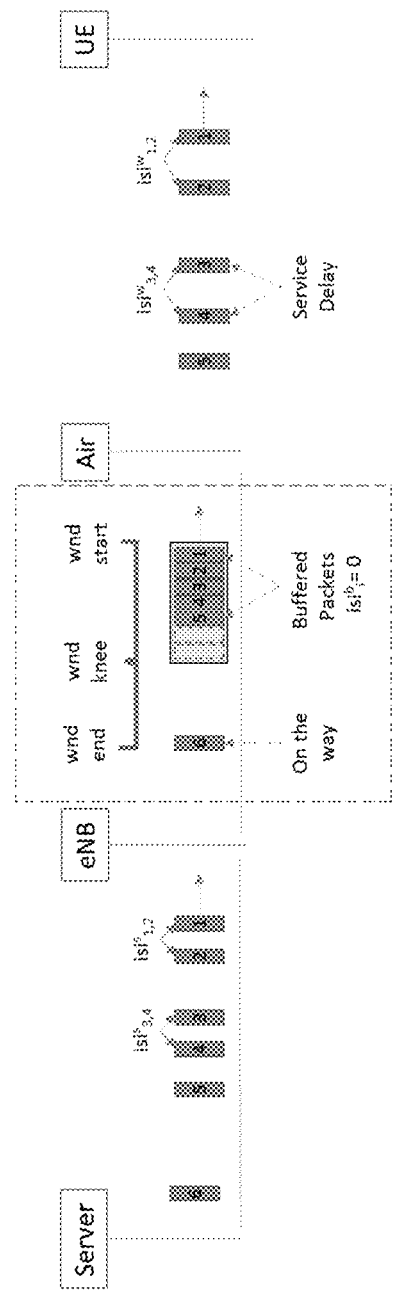
FIGS. 9A-9C illustrate algorithms that can be used to estimate load and noise delays.
Figure 9B:
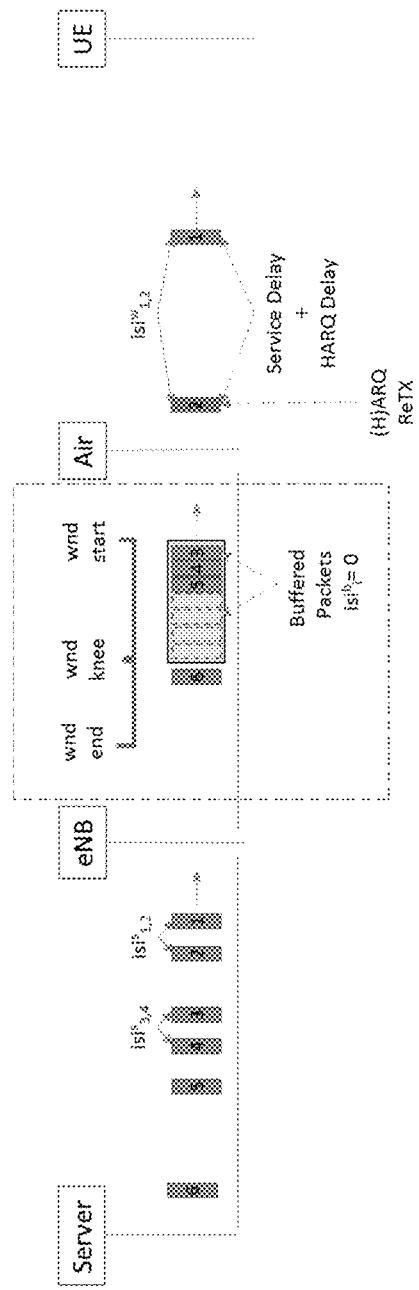
Figure 9C:
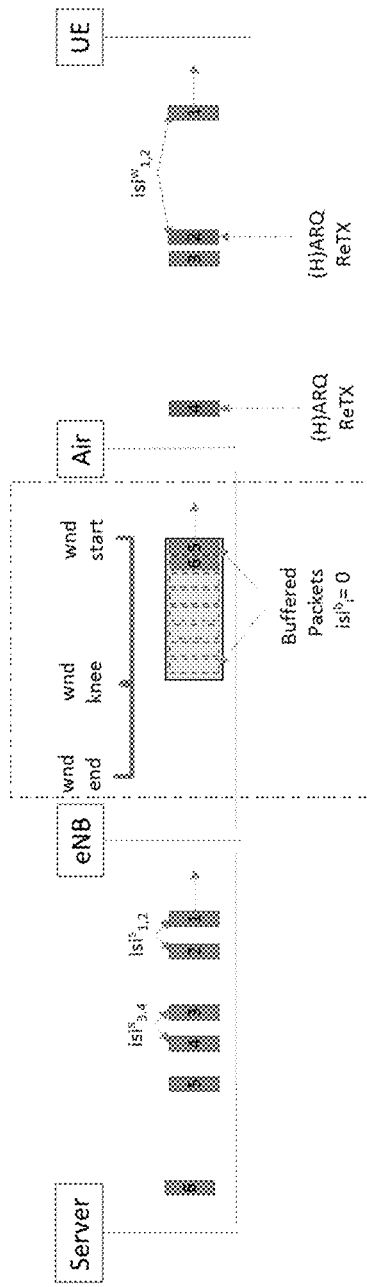

FIGS. 9A-9C illustrate algorithms that can be used to estimate load and noise delays as part of the packet analysis steps 854 and 874 of the methods 850 and 870, respectively, which are described above. On algorithm for estimating these two delays can begin by defining variables as follows:

net_rtt:corresponding minimum rtt for 3G and 4G
ist(n):packet's n sent time
iat(n):packet's n arrival time
iai(n+1)=iat(n+1)−iat(n)
isi(n+1)=ist(n+1)−ist(n)
delay(n+1)=delay(n)+iai(n+1)−isi(n+1)
For n=0, delay(0)=rtt−net_rtt Next, buffer delays can zero out inter-sending intervals, and time window of timing compressed packets can be formed, as illustrated in the diagram 900 of FIG. 9A with reference to the variables defined above. Referring to the diagram 910 FIG. 9B, functionality for initializing the window referred to above is illustrated. In general, the following variables can be defined in connection with this functionality:

wnd_start=ist(n), n is a radio retransmitted packet
wnd_knee=wnd_start+load_delay(n)
wnd_end=wnd_knee+harq_delay(n)

The window can then be updated according to the following functionality, which is illustrated in the diagram 920 of FIG. 9C:

if ist(m)<wnd_knee, m is another radio retransmitted packet
wnd_knee+=load_delay(m)
wnd_end+=harq_delay(m)

Next, packet delay splitting can be achieved according to the following steps:

$$delay(n+1) = delay(n) + iai(n+1) - isi(n+1)$$

$$delay(n+1) = harq\_delay(n+1) + load\_delay(n+1)$$

$$harq\_delay(n+1) \mathrel{+}= \begin{cases} iai(n+1) - isi(n+1), & \text{if } \geq \text{HARQ\_THRESHOLD} \\ \delta(n+1), & \text{otherwise} \end{cases}$$

$$load\_delay(n+1) \mathrel{+}= \begin{cases} 0, & \text{if } \geq \text{HARQ\_THRESHOLD} \\ delay(n+1) - \delta(n+1), & \text{otherwise} \end{cases}$$

$$\delta(n) = \begin{cases} 0, & ist(n) \geq wnd\_end \\ wnd\_end - wnd\_knee, & ist(n) < wnd\_knee \\ wnd\_end - ist(n), & ist(n) \geq wnd\_knee \end{cases}$$

HARQ_THRESHOLD= 0.007 sec // default value

Finally, relative packet delay estimation can be achieved by the following functionality:

load_delay_pct=avg(load_delay)/avg(delay)
noise_delay_pct=avg(harq_delay)/avg(delay)

The above algorithm estimates the absolute congestion and noise delays per packet, as well as the percentage of average delays for the entire connection. To enable the comparison between connections of different size in terms of congestion and noise, a normalization process can be used. This process can take into account the bytes transferred in order to estimate the maximum possible throughput that the connection could achieve if the network conditions were ideal (i.e., if there were no congestion and no noise). That metric can be referred to as ideal throughput.

Figure 10A:
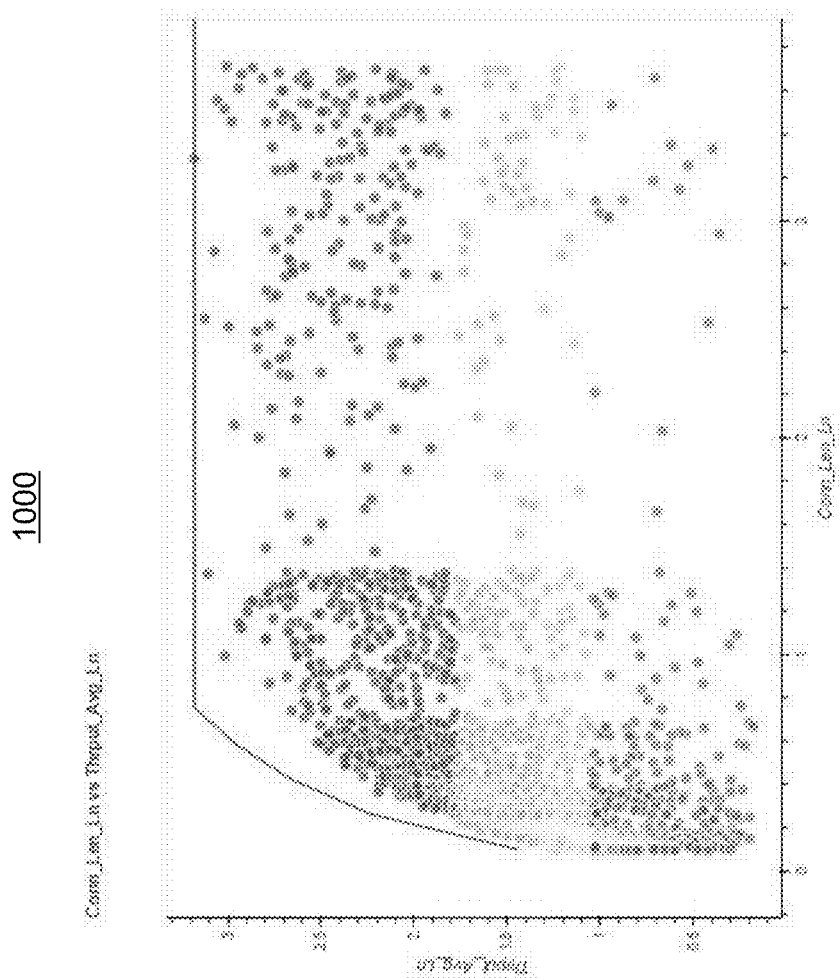
FIG. 10A depicts a plot showing fitted curve line over a number of connections.

To estimate the ideal throughput, a nonlinear regression model can be used to approximate the maximum possible throughput on a particular channel (3G or 4G), given the transferred bytes. The plot 1000 shown in FIG. 10A depicts the fitted curve line over a number of connections. The curve line of the plot 1000 has the form y=min(a*log(b*(x+c))+d, e), where "x" is the independent variable representing the transferred bytes and "e" represents the channels bandwidth.

Figure 10B:
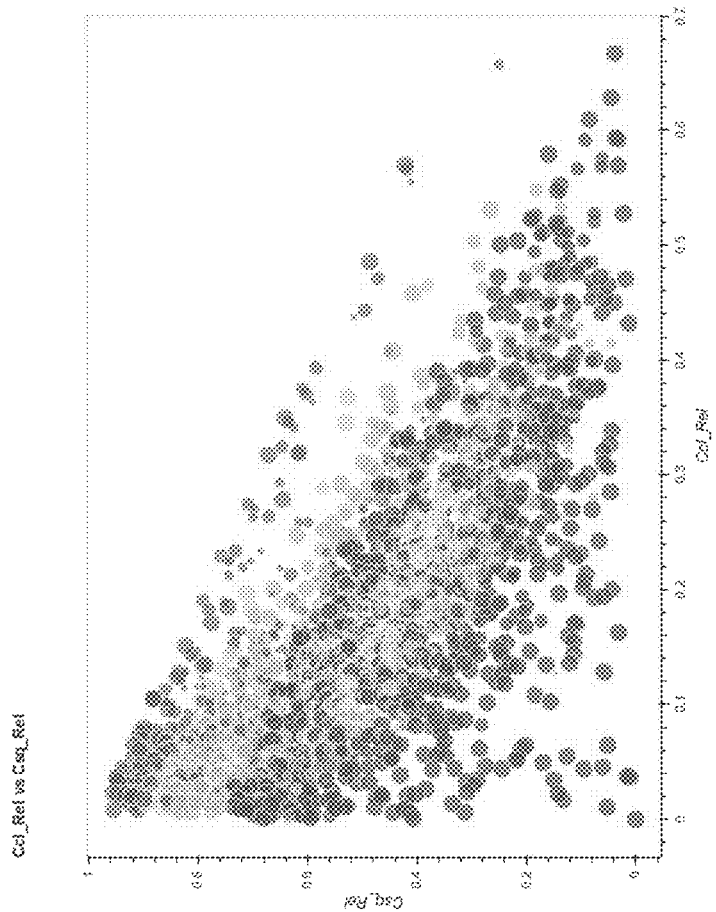
FIG. 10B shows a plot depicting a model representing the way in which congestion and noise affects performance of TCP connections with varying lengths.

The ideal throughput can be used to calculate the total degradation percentage of throughput due to the network conditions. In this way, percentages (i.e., normalized values) can be used rather than absolute values, which can complicate the comparison of connections with different sizes. By combining the findings in the last two steps, the user perceives congestion and signal quality as follows:

Connection Degradation Percentage: CDP=(ideal_throughput−avg(throughput))/ideal_throughput Connection Congestion Level: CCL=CDP*load_delay_pct Connection Signal Quality: CSQ=CDP*harq_delay_pct The resulted model, depicted in the plot 1010 of FIG. 10B, shows how congestion and noise affects the connections' performance. In the plot 1010, the x-axis represents the congestion level (CCL) and the y-axis represents the signal quality (CSQ). Each dot represents a file download over a single TCP connection. The dots are colored based on the achieved average throughput while the size of each dot represents the total bytes transferred (i.e., the connection length). Using the plot 1010, any connection can be compared, no matter what the number of transferred bytes was.

Thus, the present disclosure describes techniques to extract advanced and detailed insight, in terms of the network conditions experienced by a mobile subscriber, for the purpose of enabling the operator to analyze the overall behavior of their network (network analytics), but also to automatically adapt the traffic management actions of an application delivery controller (ADC) to these conditions. As a by-product, the systems and methods of the disclosure will extend the TCP-level statistics captured by the ADC. This can allow entities to utilize detailed TCP-level information to make routing/policy based decisions.

Based on the above, this disclosure can enable two main use cases. First, the overall behavior of the network can be analyzed, in terms of the conditions experienced by mobile subscribers. An important assumption is that the capability will be deployed as close as possible to the mobile network. However, this doesn't preclude a deployment on the content delivery network (CDN) or content provider side, but the inference models may become sensitive to issues elsewhere in the path. In the context of this use case, entities can leverage this feature for network analysis to leverage analytics for forward planning, as well as for market analysis to track success in user adoption or churn for users with different devices and network types.

In a second use case enabled by this disclosure, the technology can allow entities to adapt the TCP profile, independently for each subscriber and in near-real time, based on their current network conditions. In the context of this use case, entities can leverage this feature for: improving user experience by detecting wireless network type and radio characteristics for configuring the optimal TCP profile per user device. Entities can also use policy driven actions, which can allow service and content providers to make decisions based on user experience (e.g., smaller files for more constrained users).

The techniques described in this disclosure can provide a variety of functionality in connection with mobile networks using TCP connections. For example, the systems and methods of the disclosure can enable the ability to measure for both optimized proxied and non-proxied traffic. The systems and methods of the disclosure also can enable simultaneous identification on a per-subscriber basis of the following connection states:

a. Congestion Level (either yes/no, or no, low, high).
b. Network Speed (slow, medium, fast)
c. Quality of Connection (good/poor)

The systems and methods of the disclosure also can enable UDP/TCP traffic to be utilized for measurements to support reporting and driving optimization decisions (including proxying of traffic). In some embodiments, such measurements do not interfere (or at least minimally interfere) with TCP/UDP performance.

However, there may be instances in which the functionality of the systems and methods of the disclosure deviate from that described above. For example, since this technology processes traffic at L4, this disclosure assumes the use of at least a "TCP" virtual server (vserver), which implies that only proxied traffic will be processed. In some embodiments, both ENDPOINT & TRANSPARENT modes are supported.

For the case of network speed, radio access types can be identified with good accuracy. Instead of slow, medium, and fast, the systems and methods of this disclosure can detect 2G, 3G, 4G; but the embodiments are flexible enough to identify fixed (ADSL/VDSL, DOCSIS), WiFi, Satellite, 5G, etc. bearers in the future.

For the case of congestion level, the systems and methods of this disclosure can characterize it using four classes, namely None, Low, Medium, and High.

For the case of signal quality of connection, the systems and methods of this disclosure can characterize it using four classes as well, namely Excellent, Good, Fair, Poor.

Taking into account deviations above, the functionality of the systems and methods of this disclosure can be adapted as follows. The systems and methods of this disclosure can provide the ability to measure for traffic processed at Layer 4 (TCP), either in ENDPOINT or TRANSPARENT mode. The systems and methods of this disclosure can allow simultaneous identification on a per-subscriber basis of the following connection states:

Network Speed (2G, 3G, 4G)
Congestion Level (None, Low, Medium, High)
Quality of Connection (Excellent, Good, Fair, Poor)

The systems and methods of this disclosure can utilize all TCP traffic for measurements. Such measurements can be used for reporting and for driving optimization decisions.

The models and algorithms for generating the inference results can make use of the introduction of new input fields to the L4 transactional records generated by an ADC. Of particular interest are intervals of TCP sessions where there is an active transmission of data, in the direction from the ADC to the end-user (mobile terminal).

At a high level, the systems and methods of this disclosure can identify intervals when there is active data transfer and reports the below fields for the most significant of them (actually separately for each direction):

NSIPFIX_BURST_DURATION_MSEC_{RX|TX}
   The duration (in msec) of the data transfer
NSIPFIX_BURST_OCTET_COUNT_{RX|TX}
   The total number of octets (bytes) transmitted
NSIPFIX_BURST_RETRANS_OCTET_COUNT_{RX|TX}
   The number of retransmitted octets (bytes)

The above fields are generated upon the end of the TCP session. They correspond to the largest burst of the TCP session. Only bursts large enough are meaningful.

The list of TCP metrics that can be exported in L4 transactional records is below. Export of these values can take place, for example, every 60 secs, or when the byte counter overflows.

| TCP information | Remarks |
| --- | --- |
| 4-tuple of the connection | exported for both rx and tx side |
| Packet count for the interval (i.e., delta value) on the connection | exported for both rx and tx side |
| Byte count in the interval on the connection | exported for both rx and tx side |
| TCP flags: OR value of the flags for the given connection | For RX-template, the flags received and for TX-template, the flags sent out will be indicated. |
| Connection chain ID and hop-count | exported for both rx and tx side |
| Number of zero-windows received in the interval for the connection | reported for rx side |
| Number of retransmissions that occurred in the interval on that connection | reported for tx side |
| No of fast retransmissions that occurred in the interval on the connection | reported for tx side |
| Number of times retransmission-timeout was hit in the interval on the connection | reported for tx side |
| RTT value for the interval on that connection | reported for tx side |
| SRTT value for the interval on that connection | reported for tx side |
| Jitter value | reported for tx side |

The templates that carry these information elements, and the respective fields, can be as follows:
   TCP ingress template for Rx side—
   NSIPFIX_SRC_IPV4_ADDR_RX
   NSIPFIX_DST_IPV4_ADDR_RX
   NSIPFIX_SRC_TRANSPORT_PORT_RX
   NSIPFIX_DST_TRANSPORT_PORT_RX
   NSIPFIX_PACKET_TOTAL_COUNT_RX
   NSIPFIX_OCTET_TOTAL_COUNT_RX
   NSIPFIX_TCP_FLAGS_RX
   NSIPFIX_CONN_CHAIN_ID
   NSIPFIX_CONNECTION_CHAIN_HOP_COUNT
   NSIPFIX_ZERO_WINDOW_COUNT
   TCP egress template for Tx side—
   NSIPFIX_SRC_IPV4_ADDR_TX
   NSIPFIX_DST_IPV4_ADDR_TX
   NSIPFIX_SRC_TRANSPORT_PORT_TX
   NSIPFIX_DST_TRANSPORT_PORT_TX
   NSIPFIX_PACKET_TOTAL_COUNT_TX
   NSIPFIX_OCTET_TOTAL_COUNT_TX
   NSIPFIX_TCP_FLAGS_TX
   NSIPFIX_ROUND_TRIP_TIME
   NSIPFIX_SRTT
   NSIPFIX_FAST_RETX_COUNT
   NSIPFIX_CONN_CHAIN_ID
   NSIPFIX_CONNECTION_CHAIN_HOP_COUNT
   NSIPFIX_PACKET_RETRANSMIT_COUNT
   NSIPFIX_RTO_COUNT
   NSIPFIX_JITTER However, the specific fields are calculated for incremental time periods of TCP sessions, whereas this disclosure is primarily concerned with periods of active transmission.

In some embodiments, transactional records generated by an ADC in accordance with this disclosure as a result of processing TCP sessions can be extended with new info fields. In some embodiments, the new info fields are generated for periods of active TCP data transmission, specifically from the ADC platform towards the device (UE) of a mobile subscriber. In some embodiments, for decreasing the complexity of the embodiment and decreasing the amount of information that is generated, the new info fields are only be added to end of transaction (EOT) records, and only cover the most active period of data transfer. In some embodiments, the new info fields are transferred from the ADC to MAS over the LogStreaming transport. The maximum acceptable capacity impact can be about 10%. In some embodiments, for enabling the classification models and inference algorithms described herein, the raw metrics below can be included:
   rtt_min, rtt_avg: Minimum and Average RTT
   bif_avg: Average bytes-in-flight
   thrput_avg: Average throughput
   isi_avg: Average packet inter-sending interval
   iai_avg: Average packet inter-arrival interval
   iai_1ms: Percentage of packets with inter-arrival interval 1 ms±10 μs
   iai_2ms: Percentage of packets with inter-arrival interval 2 ms±10 μs
   harq_delay: Delay of packets that suffered from RLC retransmissions
   load_delay: Delay of packets that suffered from network congestion
   rwnd_min, rwnd_avg: Minimum and Average Receive Window
   ack_cnt: Number of ACKs In terms of metadata, the following field can be added:
   tcp_profile: Name or identifier of TCP profile In some embodiments, the following composite metrics can be included:
   net_cls: The network type resulting from applying network type classification
   ccl, ccl_cls: The Connection Congestion Level (CCL) estimated by the relevant inference algorithm, as well as the respective class (None, Low, Medium, High)
   csq, csq_cls: The Connection Signal Quality (CSQ) estimated by the relevant inference algorithm, as well as the respective class (Excellent, Good, Fair, Poor)

In some embodiments, calculating the above composite metrics requires the input parameters below, which can be a result of training the classification models and inference algorithms:
   Classification model coefficients: Separately for 2G vs rest and for 3G vs 4G
   net_rtt, harq_threshold: Separately for 3G and 4G (empirically determined)
   Ranking boundaries: Separately for 3G and 4G and for CCL and CSQ scores In some embodiments, the following raw metrics can be included:
   rtt_max: Maximum RTT
   bif_max: Maximum bytes-in-flight
   packet_cnt/retx_packet_cnt: Total packets transmitted/retransmitted ooo_packet_cnt/ooo_octet_cnt: Total out-of-order packets/bytes bdp_avg: Average bandwidth-delay product The term Bandwidth as used in this disclosure defines the net bit rate (i.e., the peak bit rate, information rate, or physical layer useful bit rate), channel capacity, or the maximum throughput of a logical or physical communication path in a digital communication system.

Bandwidth in bit/s may occasionally refer to consumed bandwidth, corresponding to achieved Throughput or "Goodput", i.e., the average rate of successful data transfer through a communication path.

Channel bandwidth may be confused with useful data throughput (or goodput). By definition, useful/effective throughput is less than or equal to the actual channel capacity plus embodiment overhead. A network element depending on passive measurements can calculate throughput, but it can only infer/estimate bandwidth.

Network speed as referred to in this disclosure denotes the bandwidth that a network technology is able to deliver. Network speed is typically inversely correlated to network latency, i.e. networks that offer high speed are characterized by low latency, and vice-versa. Intuitively, network speed depends on latency, but not as it may increase as a result of high congestion or poor connection. Similarly, network speed depends on throughput, but not as it may degrade as a result of network congestion or poor signal quality. In that sense, network speed levels will have a rough correlation to radio access types.

Network congestion is the situation in which an increase in data transmission results in a proportionately smaller increase, or even a reduction, in throughput. Network congestion occurs when a link or node is carrying so much data that its quality of service deteriorates. Typical effects include queueing delay, packet loss or the blocking of new connections. A consequence of the latter two effects is that an incremental increase in offered load leads either only to a small increase in network throughput, or to an actual reduction in network throughput. Intuitively, network congestion can be associated to an increase in latency (RTT), but one that is considered to have adverse effects in QoE. Also, highly correlated packet loss can be an indication of network congestion, but only if it perseveres.

Connection quality as referred to in this disclosure denotes the condition of the layer 1 connection between user equipment (UE) and the associated radio cell(s). This is influenced by many factors, such as cellular network coverage, distance/path between the UE and the antenna(s), radio interference, signal/noise levels, power/RRC state promotions/demotions, handovers between cells, indoors vs outdoors, etc. Intuitively, connection quality is associated to random packet loss and momentary increases of network delay. In that sense, it can be desirable to discriminate between the reduction of network throughput that is caused by high network congestion from the one that is caused from bad connection quality. Similarly, connection quality is disassociated from network speed, as defined herein (which refers to potential bandwidth), and is measured separately for each RAT.

In some embodiments, the systems and methods of this disclosure can implement a classification model that discriminates between different network speeds. The model can classify mobile subscriber sessions into three classes (2G, 3G, 4G), corresponding roughly to the respective radio access types.

Given that different mobile network technologies implement different underlying radio access types, the above class labels can correspond to:
2G: GSM (GRPS/EDGE), CDMA, 1xRTT
3G: WCDMA (UMTS, HSDPA, HSPA, HSPA+), CDMA2000 (EVDO, eHRPD)
4G: LTE, LTE-Advanced Having said the above, the feature embodiment can be flexible to identify fixed (ADSL/VDSL, DOCSIS), WiFi, Satellite, 5G, etc. bearers in the future.

In some embodiments, subscriber sessions can be characterized further in terms of the congestion level of the network path between the ADC platform and the device. This characterization can involve the calculation of a congestion level score, and subsequently the segmenting of this score into four (4) rankings, namely None, Low, Medium, and High.

In some embodiments, subscriber sessions can be additionally characterized in terms of the signal quality of the physical (radio) link between the base station and the device. This characterization can involve the calculation of a signal quality score, and therefore the segmenting of this score into four (4) rankings, namely Excellent, Good, Fair, Poor.

In some embodiments, the congestion level and signal quality scores and rankings are required only for data sessions that have been classified as 3G or 4G network type. In some embodiments, only data segments transferred in the downstream direction may be relevant for the above classification and characterization, and only ones that use TCP as the transport layer protocol. This is due to the fact the models and algorithms depend on the presence of acknowledgments (TCP ACK packets). In some embodiments, the generation of the input fields described above and inference results described above only take place when an ADC processes traffic at Layer 4 (TCP), and specifically in ENDPOINT mode. This restriction stems from the fact the input fields can be more easily generated when TCP sessions are handled by ADC congestion handlers. In some embodiments, the generation of these input fields and inference results can also take place when the ADC processes traffic at Layer 4 (TCP) in TRANSPARENT mode, but this is probably not in the scope of the initial embodiment.

Figure 11A:
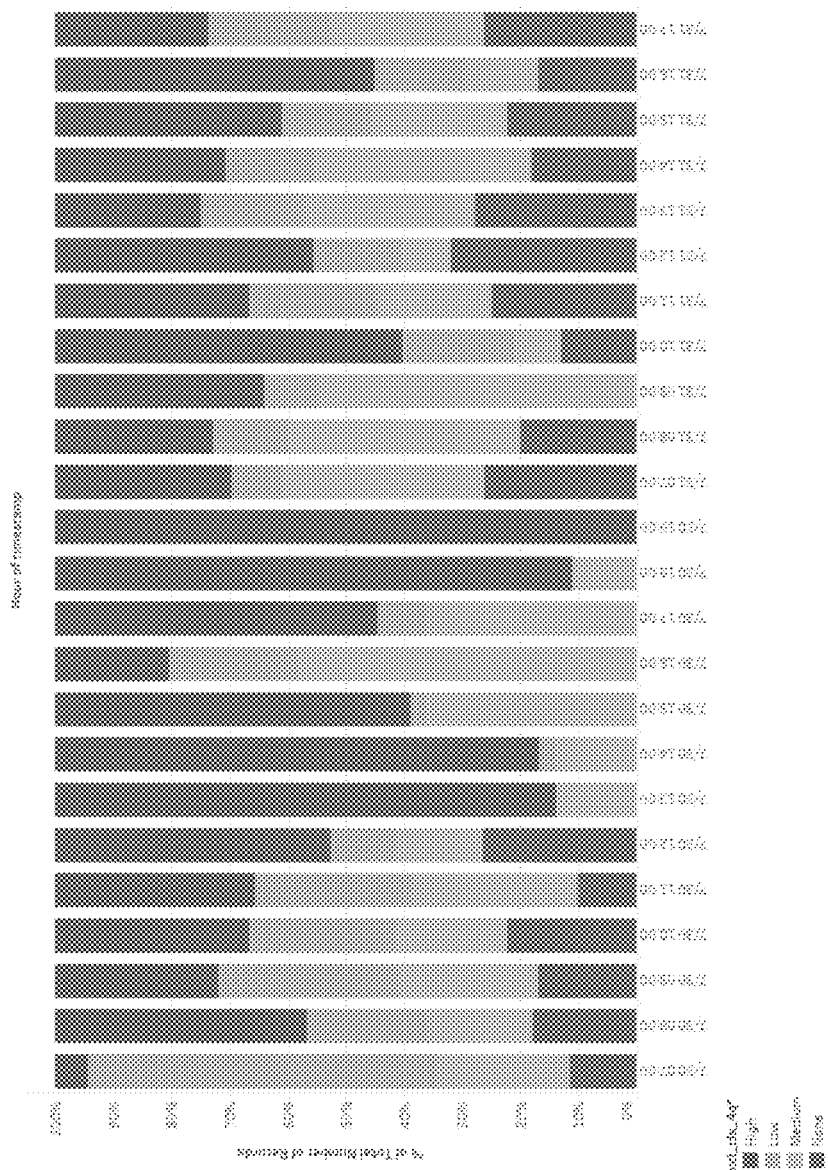
FIGS. 11A-11D depict a sample collection of analytics reports.
Figure 11B:
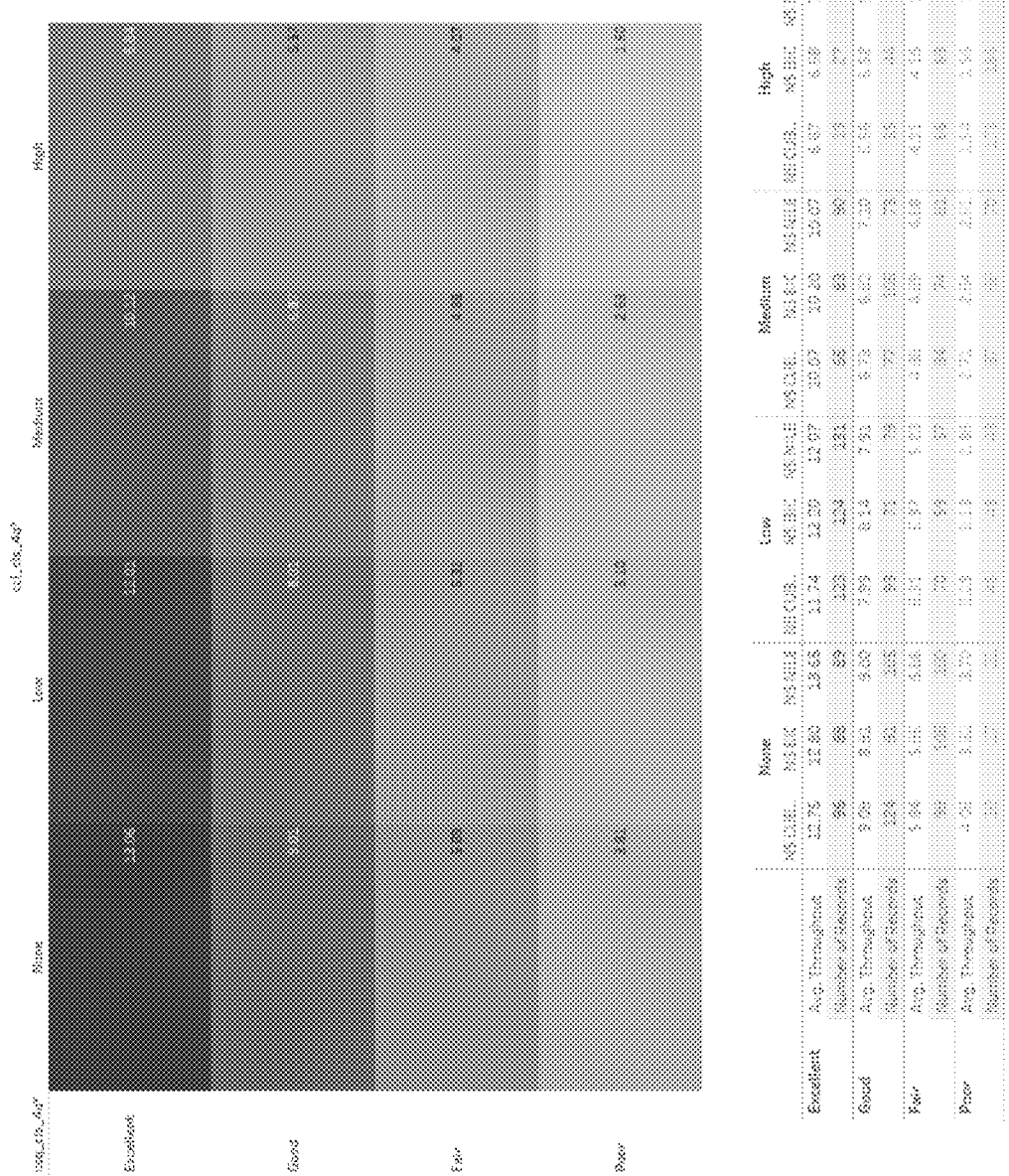

One goal of generating the input fields and inference results described above is to enable a new set of MAS Analytics reports that can convey a picture of network-wide conditions to an entity (mobile service provider or mobile network operator). FIGS. 11A-11D provide a sample collection of such reports. In some embodiments, the reports can provide a time-based (hourly) & aggregate (daily) measurement of the percentage of sessions or downloads, as characterized by congestion level and signal quality rankings, and separately for 3G and 4G. FIG. 11A represents those as 100% stacked bar charts, colored by the congestion level/signal quality ranks. In some embodiments, the reports can provide a representation of how user experience varies, depending on the congestion level and signal quality, separately for 3G and 4G. User experience metrics can include "Goodput", but may also include Latency, Buffer-bloat and Packet-loss (FIG. 11B represents those as a 4×4 heat-map, each cell corresponding to a congestion level/signal quality ranking combination, colored and labeled per the user experience metric of interest).

Figure 11C:
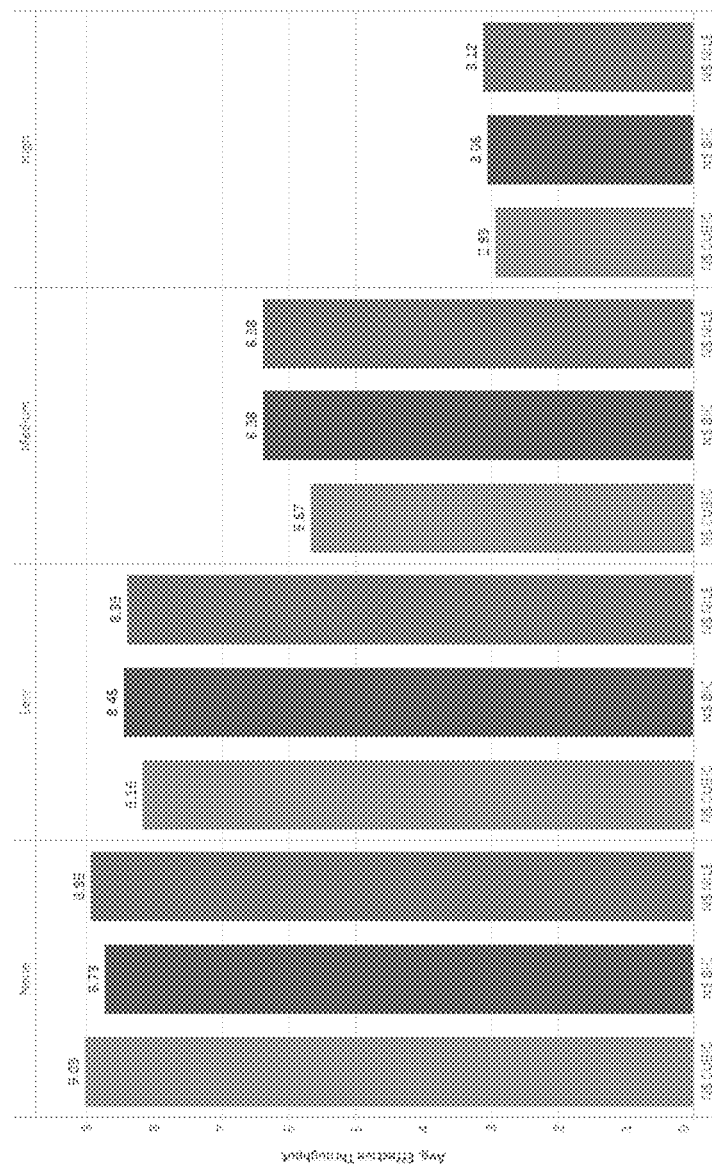
Figure 11D:
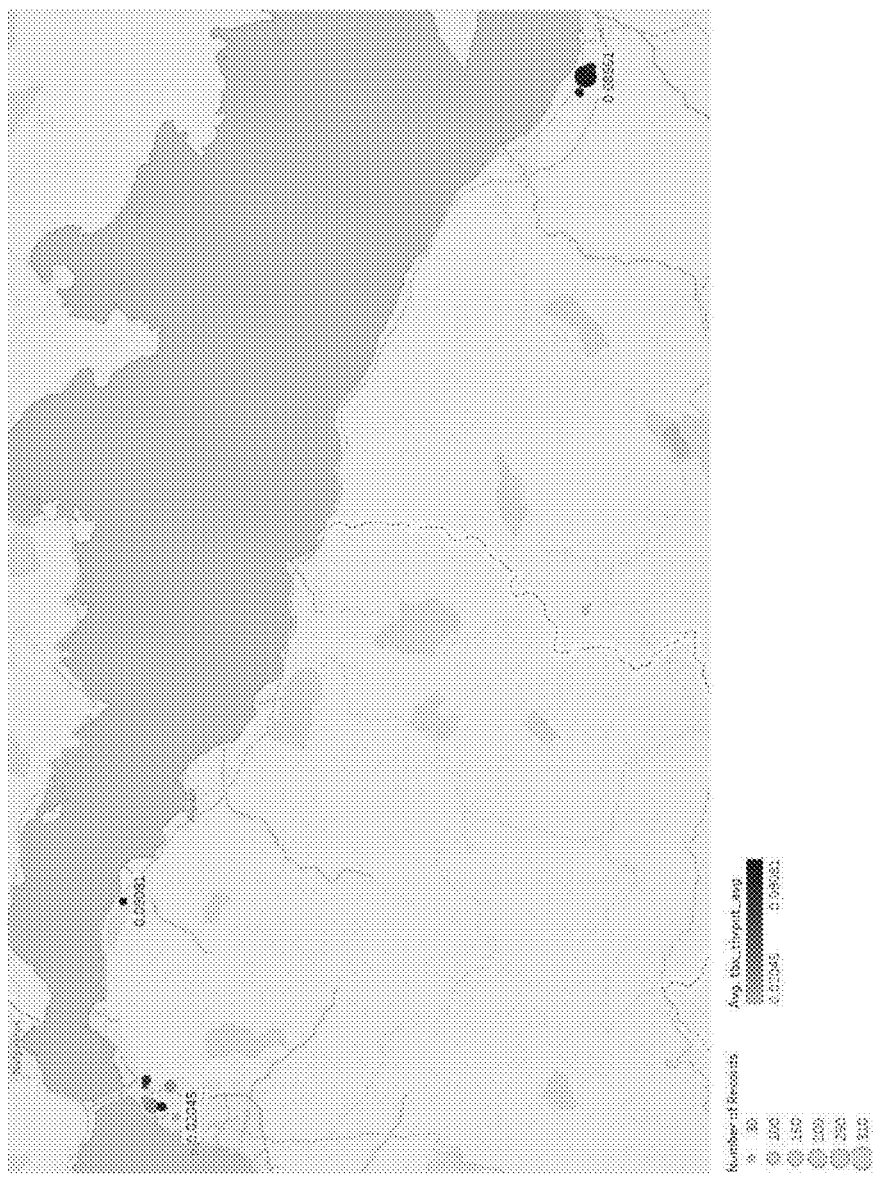

In some embodiments, to facilitate comparative evaluation of different TCP configurations, user experience metrics can be further analyzed on a per TCP profile name basis, but only for TCP profiles that are configured globally/per vserver, or via AppQoE policies. FIG. 11C represents those as bar charts. In some embodiments, these metrics could also be represented as crosstabs accompanying a heatmap such as the heatmap shown in FIG. 11B). In some embodiments, deeper analysis of per TCP profile performance can be achieved through introducing advanced TCP statistics reports, namely:

Line Graphs
1) Minimum/Average/Maximum RTT over Time
2) Bandwidth-Delay-Product and Average/Maximum Bytes-in-Flight over Time
3) Packet Loss Rate and Packet Retransmission Rate over Time
4) Buffer Delay Percentage over Time Histograms
1) Minimum RTT by Count
2) Average RTT by Count
3) Maximum RTT by Count
4) Average BDP by Count
5) Average BIF by Count
6) Maximum BIF by Count
7) TCP Efficiency Percentage In some embodiments, if location information is available, either through control-plane interfaces (Diameter/Gx or RADIUS) or through Geo-IP database lookups (which in some embodiments may not be very relevant to the mobile operator use case), maps that provide per-location view of the above metrics and inference results can be provided. FIG. 11D provides a sample showing average throughput. In some embodiments, a similar map could be generated to show Congestion Level Score or Signal Quality Score by Location.

Another goal of classifying the network type and generating the inference results described above is to automate the configuration and tuning of the TCP profiles of an ADC. This aims to remove the burden of having to manually accomplish this, every time the customer needs to prepare for the next trial, tuning, or benchmarking exercise.

Moreover, this aims to produce better TCP optimization results, given that there is really not a single TCP profile that is optimal for the entire range of network types, congestion levels and signal qualities. By automatically selecting or adapting the TCP profile per the classified network type and characterized network conditions, the resulting overall TCP optimization performance will be better than setting a global TCP optimization profile.

In some embodiments, the outcome of network type classification can be available as an ADC policy condition, for selecting or tuning the TCP optimization profile.

In some embodiments, congestion level and signal quality ranking can be available as ADC policy conditions, for selecting or tuning the TCP optimization profile.

In some embodiments, these new policy conditions can allow selecting from a pre-determined set of TCP profiles, which can be designed to cover a broad range of network performance and conditions.

In some embodiments, the pre-determined set of TCP profiles can utilize the internal parameters of TCP Nile.

In some embodiments, pre-determined TCP profile names can be stored as metadata, albeit those may not be exposed in reports.

In some embodiments, for immediate reaction to network conditions, TCP profile selection changes can be possible within the context of the same TCP connection. Alternatively, TCP profile switching can take place upon the next TCP connection.

In some embodiments, historical network type classification and congestion/signal rankings can be maintained on a per subscriber basis for a configurable amount of time. These will be used for the following reasons:

a) Extend policy decisions across different TCP connections and packet engine instances.

b) Limit frequency of policy actions and avoid "flapping" of TCP profile selections.

In some embodiments, subscriber identification may not assume unique identifiers. Historical classification/inference results can be stored at least on the basis of IP addresses, in which case TCP profile selection actions can apply across the connections of the same source IP address.

Figure 12A:
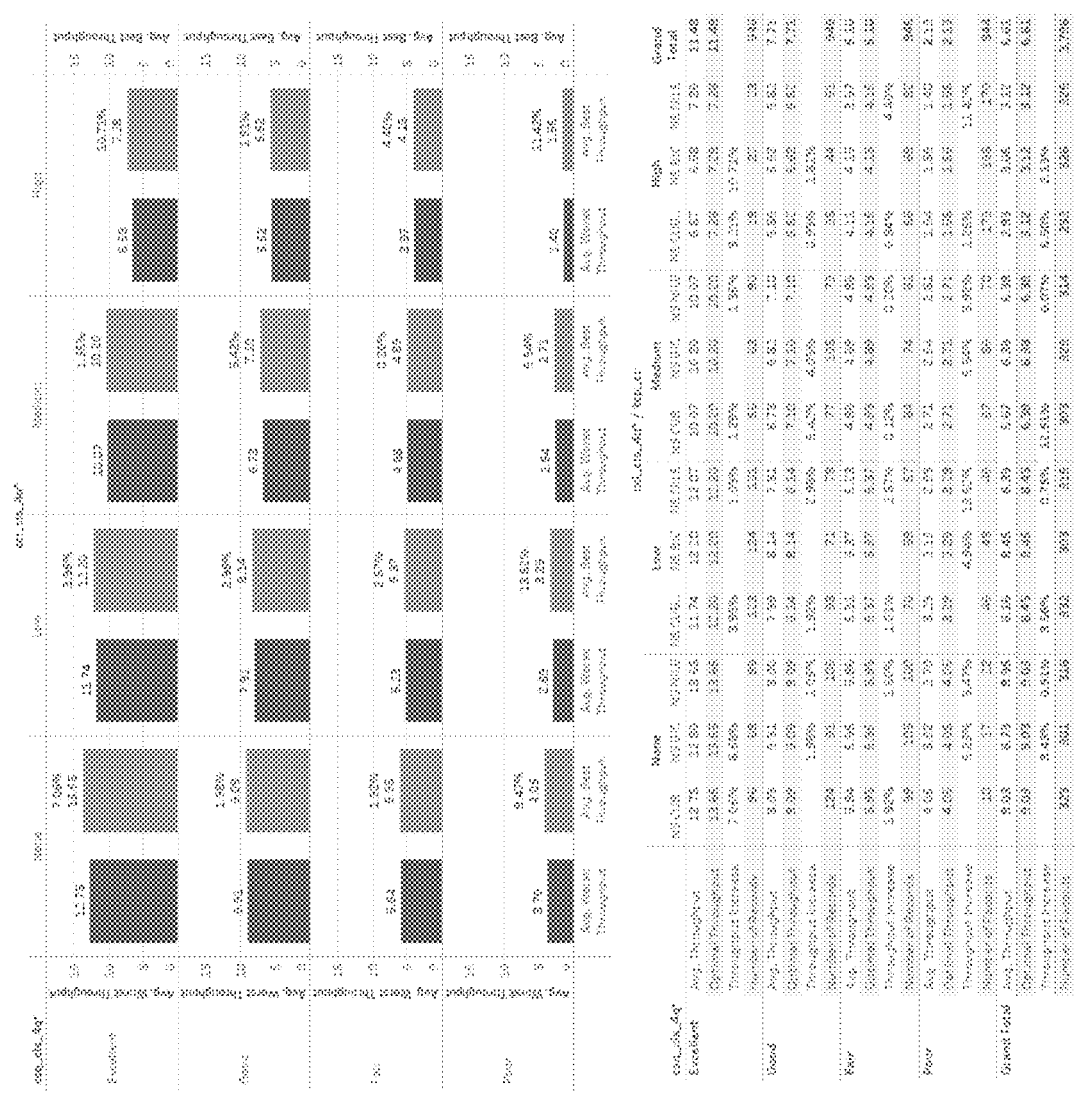
Figure 12B:
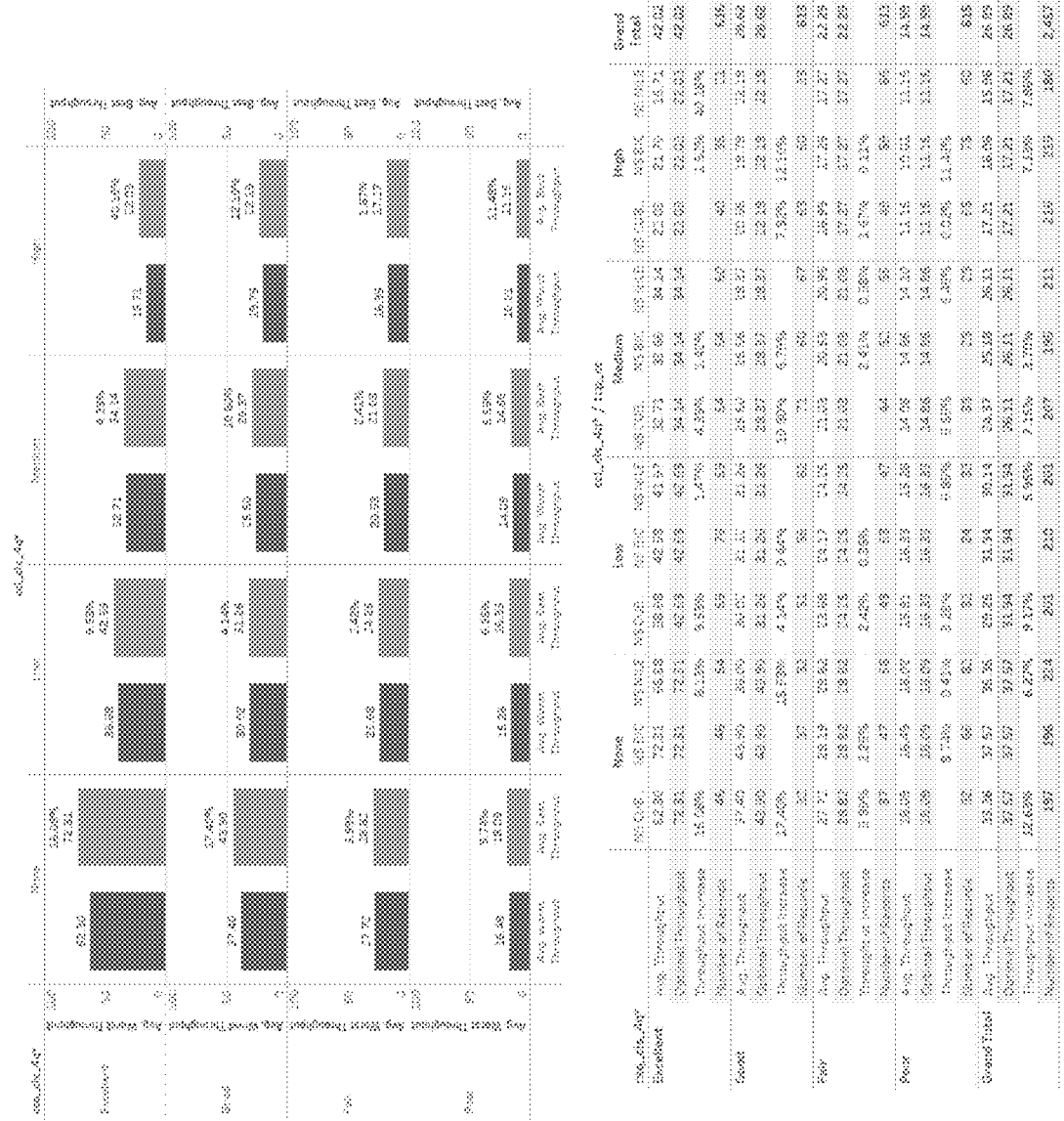

In some embodiments, performance evaluation reports can be made available that would estimate relative improvement versus the scenario a global TCP profile is used. FIGS. 12A and 12B provide sample reports.

Systems and methods of this disclosure can employ machine learning (ML) models that depend on the MAS Telemetry Cluster architecture. For example, MAS Advanced Analytics can be able to ingest and process transactional data (i.e. not only counters) carrying TCP information. In some embodiments, even though most of the models described herein can use the Python data analysis stack (NumPy, Pandas, SciKit-Learn, etc.), as datasets increase, the scalable data processing capabilities of Spark may also be leveraged.

In some embodiments, to bootstrap and re-train the machine learning models and algorithms, collections of observations can be accumulated, by extracting the required attributes from the transactional data source and storing them to a data store, where they can be easily accessed. Moreover, the models described herein can store state that will persist across training runs, most importantly the trained parameters and evaluation results.

In some embodiments, while datasets are being accumulated in the data store, a mechanism can be provided that will check on a recurring basis whether an adequate number of observations has been gathered and that will initiate the bootstrapping/re-training of the models.

This disclosure describes two alternative designs, in terms of applying the trained models. In a first design, the models and algorithms can be executed on the ADC itself. This does not utilize the real-time path of MAS Telemetry Cluster, and only involves sending updated model parameters back to the ADC, only when model re-training results into changes. In a second design, the real time (streaming) path of the MAS Telemetry Cluster can be used. This can involve introducing Spark Streaming. Given that the models act on transactional data, and it is desirable to limit the rate and size of messages that are be processed in that fashion, the ability to extract only the fields required can be useful. For efficiency reasons, this filtering should take place on the consumer side of LogStreaming. In that scenario, the models and algorithms will be executed on MAS-side, leveraging short-term per-subscriber history of messages. The outcome, including any changes to TCP configuration, will have to be provided, on a per-subscriber basis, back to the ADC.

It should be understood that this disclosure relates primarily to the first design described above. However, in some embodiments, regardless the approach chosen, MAS may communicate decisions or updated parameters back to the ADC. This may extend the Nitro-based APIs between MAS and the ADC. Moreover, this use case may not rely on a deployment of MAS that consists of more than one telemeter cluster nodes. In other words, the systems and methods of this disclosure are compatible with the single-node deployment of MAS Advanced Analytics.

Figure 13:
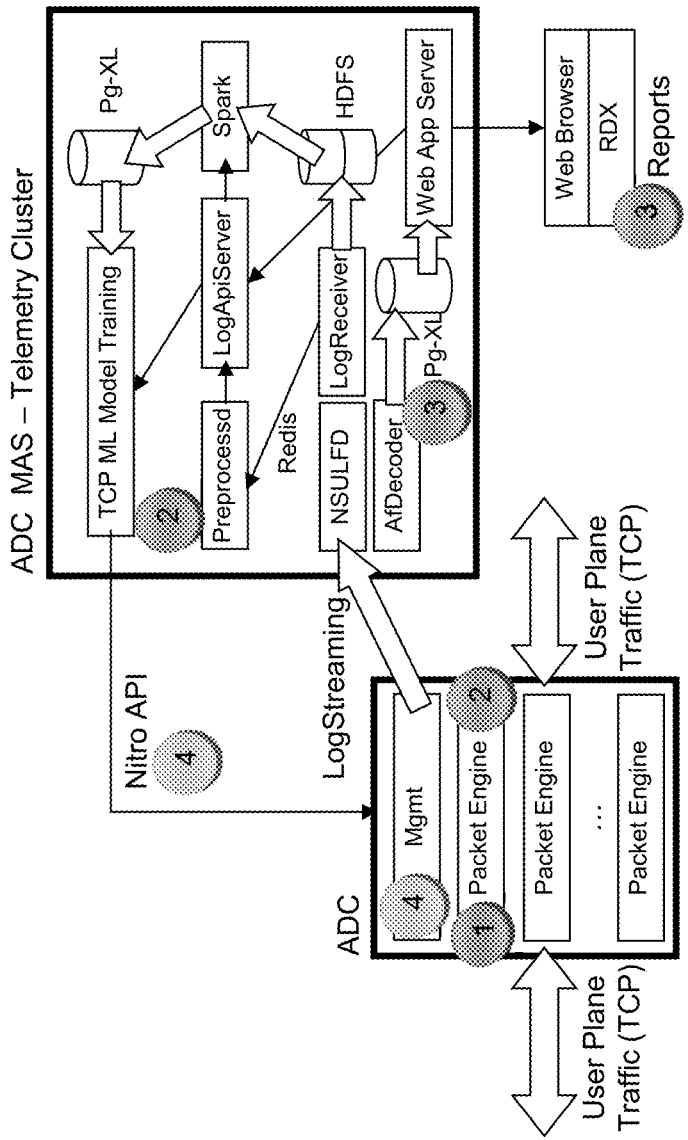
FIG. 13 is an example high-level architecture block diagram.

FIG. 13 is an example high-level architecture block diagram. The components that contribute to the feature are divided into four main areas (denoted on FIG. 13): The components in Area 1 relate to input data. Thus, these components implement the functionality described above, in terms of generating the Input Data required for the inference algorithms. In some embodiments, these components can reside entirely in the ADC packet engine. Area 2 relates to models and algorithms. As discussed above, the application of the ML models and implementation of the inference algorithms can reside in the packet engine, but the training of the models, utilizing accumulated data sets, can reside in the MAS Telemetry Cluster. Area 3 relates to analytics reports. In some embodiments, these components reside in MAS, divided between adding new metrics in an AfDecoder output towards a PgXL database schema and adding new reports in a MAS web-based UI. Area 4 relates to closing the loop. These components can implement passing the outcomes of training the ML models from MAS to the ADC, which can result in updating relevant configuration settings, and applying these changes, starting from new TCP connections.

At a high-level, the end-to-end data processing flow is as follows:

First, the packet engine processes TCP connections (using a layer 4 or above vserver). During the course of each TCP connection, it identifies periods of active data transfer, for which it calculates the input fields described above. More specifically, the raw metrics can be extracted. After the packet engine has received trained model parameters from MAS, as described below, additional composite metrics can also be calculated.

Next, at the end of each TCP connection, the packet engine generates a layer 4 transactional record that includes the input fields above and is transferred using the Log-Streaming transport interface from the packet engine to MAS.

The transactional records are made available (e.g., in shared memory) and the LogReceiver and AfDecoder consumers ingest them, each to fulfil a different purpose. LogReceiver can transmit the individual records to HDFS and AfDecoder can generate aggregate metrics to be stored in the PostgresXL database schema. It is worth noting that these two processing paths can be otherwise independent: Scale out can be implemented differently and local vs. centralized operation can also vary.

On the LogReceiver path, once a number of transactional records have been written to a file in the Hadoop Distributed File System (HDFS) (e.g., upon file rotation, or per five minutes), a Preprocessor will receive a notification (e.g., via the Redis message queue). The preprocessor can invoke a LogApiServer API, which can spawn a Spark job that will analyze the newly available transactional records. This Spark job can extract the subset of records and columns that provide meaningful input fields and accumulate them in a structured store, such as Pg-XL.

Also as invoked through a LogApiServer API, another process or job can periodically check the collection of observations that have been gathered so far, and decide whether to invoke the initial training or re-training of the ML models. This process or job can implement the pipeline of classification models. Once training is complete and if learning metrics are acceptable, the resulting model parameters will be sent to the ADC via a Nitro-API call, which will result into updating respective (hidden) configuration settings. These can apply to subsequent TCP sockets. On the AfDecoder path, the inference results can be extracted, and can be used for enriching the metrics stored in the PostgresXL database schema, with the detected network type, as well as the congestion level and signal quality scores. These can be used to create new analytics reports.

In some embodiments, accuracy higher than 90% can be achieved in detecting the mobile network type using simple machine learning models (small decision trees), and a limited subset of the features such as avg. throughput, avg. bytes-in-flight (BIF), min./avg. RTT, etc. However, in the context of generating the inference results, and especially to drive Adaptive TCP policy actions, higher accuracy is desirable to minimize the rate of "3G" observations that are misclassified as "4G." Also, the accuracy of classifying sessions that are too slow or too short as "2G" is also relatively crucial, since the proposition is that a very conservative "catch all" TCP profile can be applied in that scenario.

Based on the above, in some embodiments, "2G" connections can first be excluded from all the rest, ideally using a simple model such as a logistic regression model that uses only a few features, such as ones related to average throughput (or BIF) and/or average latency (RTT). To subsequently discriminate between "3G" and "4G", and given the scale of accuracy improvement that is desirable, specific characteristics of these two technologies can be exploited. Specifically, WCDMA and LTE technologies use different TTI. WCDMA uses 2 ms or much higher (10 ms), depending on whether it is HSDPA/HSPA/HSPA+ or plain old UMTS, whereas LTE uses 1 ms. Thus, the distributions of (ACK) packet inter-arrival intervals of WCDMA and LTE downloads are different, in terms of the distinct peaks they exhibit, coinciding with multiples of the TTI of each.

Figure 14:
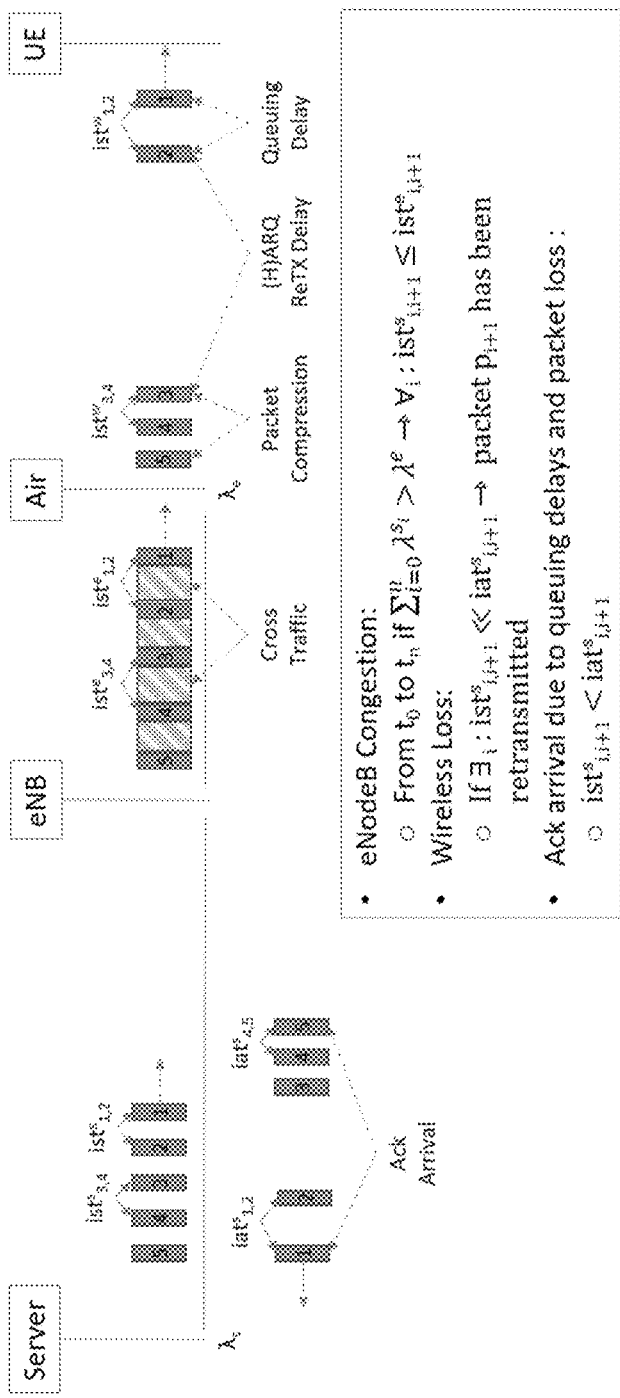
FIG. 14 is an example mobile network for illustrating network congestion and signal quality.
Figure 15:
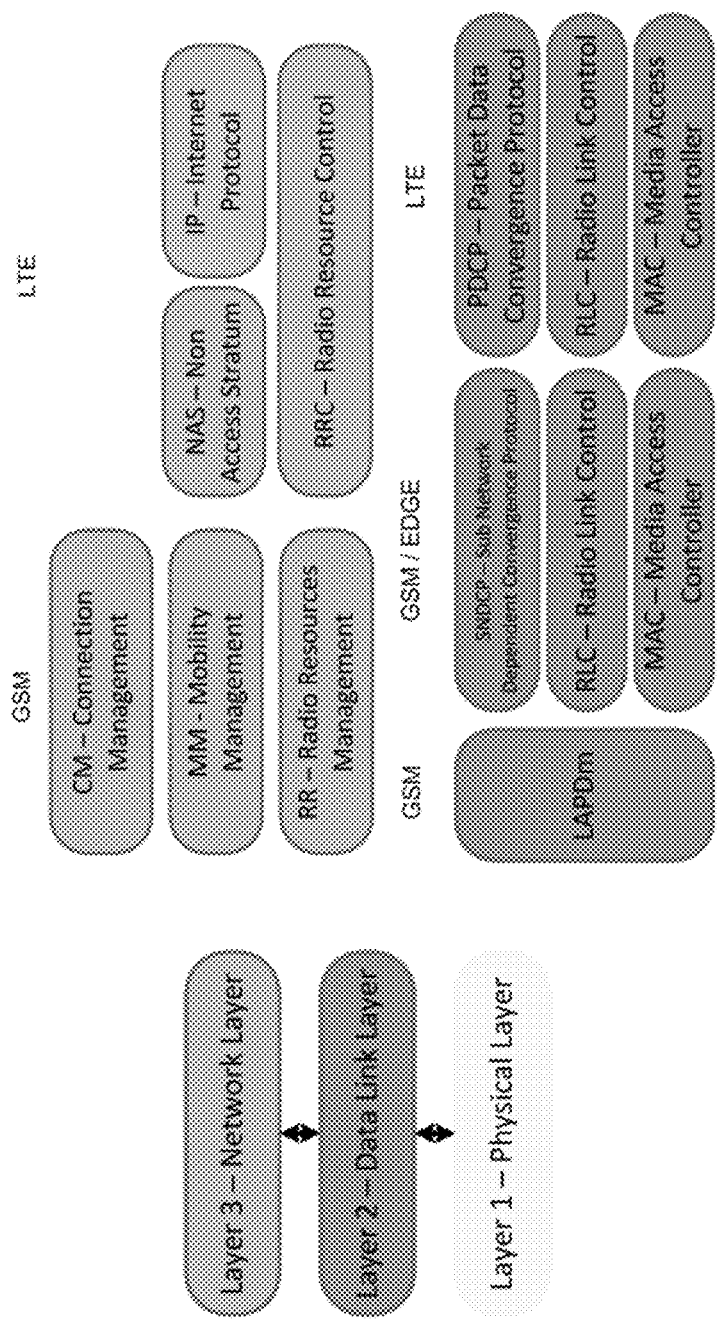
FIG. 15 illustrates network layers in various mobile network technologies.

The principles of characterizing data transfers that take place in mobile networks, in terms of the underlying network congestion and signal quality, are described further below. As depicted in FIG. 14, packets flowing between the ADC and the mobile terminal (UE) experience the combined effects of network congestion (occasionally not only at the eNodeB, as depicted) and wireless loss on the air interface, which may relate to bad reception. Consequently, before characterizing network congestion and wireless loss, it can be helpful to separate them out, which can be challenging. Network congestion is exhibited as packet delivery delay, due to network queue build-up and competition with cross-traffic. However, due to the (H)ARQ retransmission implemented by 3G and, wireless losses also translate to delays. This is illustrated in FIG. 15, as well as in FIG. 7A described above.

Figure 16:
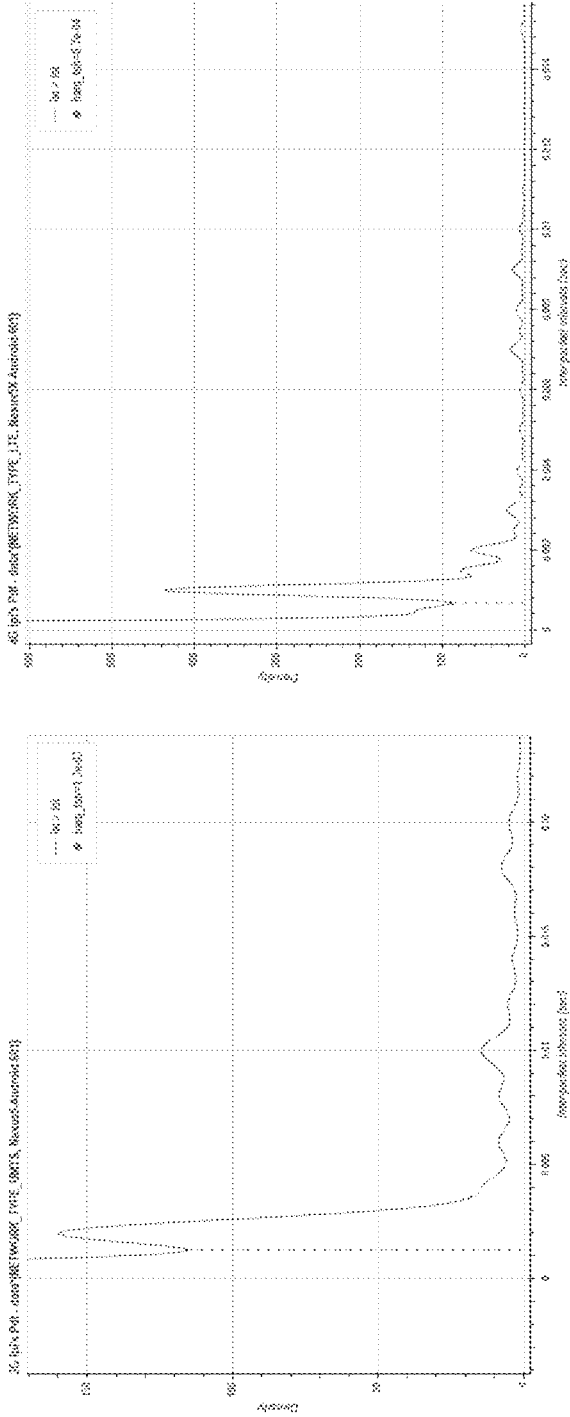
FIG. 16 illustrates retransmission interval thresholds for 3G and 4G networks.

One key insight is that delay increases gradually for the case of congestion, while it increases sharply for the case of wireless loss. Consequently, it can be helpful to differentiate between abrupt delays, which correlate with the (H)ARQ retransmission time interval, and other types of delays. However, the (H)ARQ retransmission interval is bearer-specific (i.e., it depends on the TTI, which is different between UMTS/HSxPA/4G). Also, (H)ARQ parameters (e.g. maximum number of processes, maximum number of retries) are configurable by each operator. As a result, these thresholds can be adapted to each network, as illustrated in FIG. 16. The default delay threshold for detecting (H)ARQ retransmissions is set to 8 ms for 3G and 7 ms for 4G.

Figure 17:
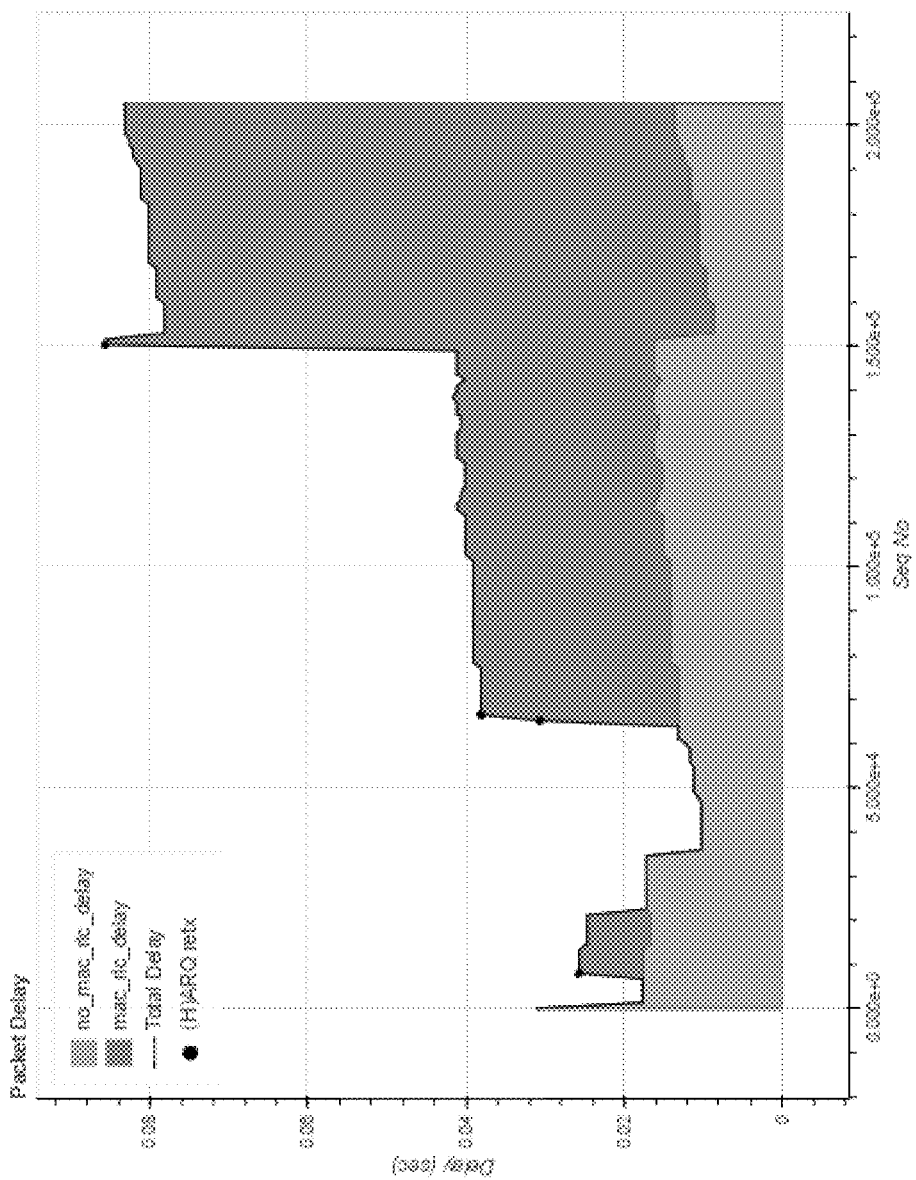
FIG. 17 is a plot showing delays caused by congestion and noise.

Once the above is achieved, the measured delay can be divided into two portions as illustrated in FIG. 17. In FIG. 17, the gradual delay caused by congestion is shown in green, while the abrupt delay that is caused by noise is shown in red.

This leads to the simplified CCL (Connection Congestion Level) and CSQ (Connection Signal Quality) formulas described further below. Generally, CSQ is measured as the average cumulative effect of delays caused by wireless retransmissions, and CCL is measured as the average cumulative effect of delays caused by network load (cross traffic and self-inflicted). Both metrics are calculated as a percentage of total packets delay. Since packet delay is strongly correlated to the number of transferred bytes, CCL and CSQ are multiplied by a factor proportional of the transferred bytes. This factor, referred to as CQR (Connection Quality Ranking), represents the percentage drop of the connection's throughput compared to the ideal throughput. The ideal throughput is achieved on a channel when there is negligible or no congestion and noise. Finally, once an adequate number of CCL and CSQ measurements are gathered, they can be divided into four (4) rankings.

Figure 18:
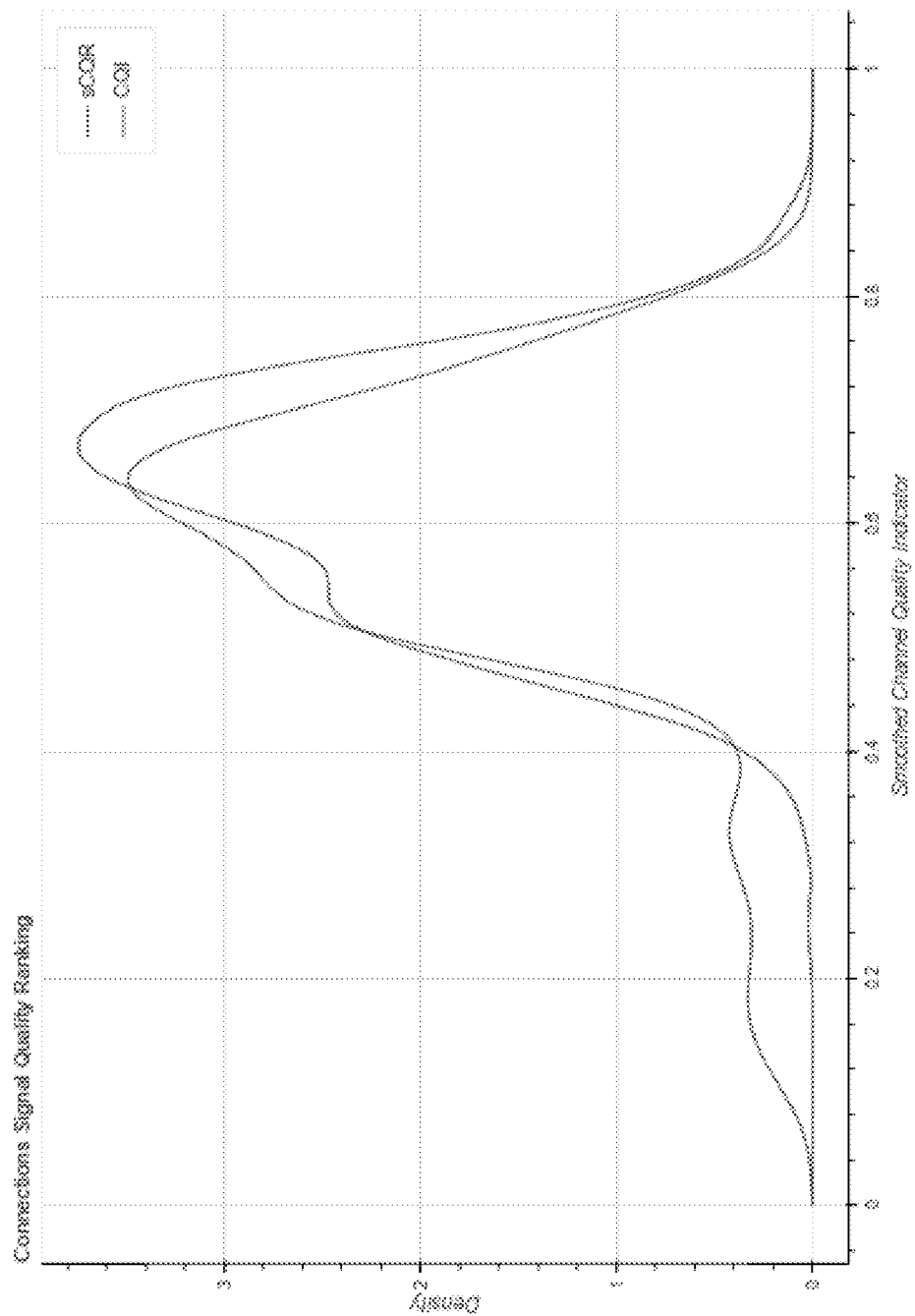
FIG. 18 is a plot showing classes resulting from a mapping of CQI efficiency index and CQR.

In some embodiments, the boundaries can be selected simply to correspond to the respective CQI scale of each network type. The decision can be based on experimental analysis, which suggests that CQR distribution roughly approximates the CQI distribution, as illustrated in FIG. 18.

CQI is an indicator carrying information on how good or bad the communication channel quality is. CQI is the information that UE sends to the network, and practically it implies that current CQI has a particular value, and that the UE requests to get the data with a specified transport block size, which in turn can be directly converted into throughput. While the systems and methods of this disclosure generally do not measure packet delivery times directly, they are assumed to be correlated to ACK generation times. In other words, packet delivery delays can be sensed by comparing inter-sending intervals of packets with inter-arrival intervals of corresponding ACKs. It should also be understood that TCP is self-clocking. As a result, the ACK rate depends on the segment rate, and vice versa. ISI's and IAI's are equal when TCP is in stable operation.

In some embodiments, feature selection can be initiated by analyzing a standard set of TCP-related attributes, including the following:

rtt_min, rtt_avg, rtt_max: Minimum, Average, Maximum RTT bif_avg, bif_max: Average, Maximum bytes-in-flight (BIF)

thrput_avg: Average throughput packet_cnt/retxpacket_cnt, ack_cnt: Total packets transmitted/retransmitted, number of ACKs rwnd_min, rwnd_max, rwnd_avg: Receive window summary statistics However, the above features may not be adequate to achieve high levels of accuracy. Thus, the following additional features can also be included:

isi_avg: Average packet inter-sending interval iai_avg: Average packet inter-arrival interval iai_1ms: Percentage of packets with inter-arrival interval 1 ms±200 µs iai_2ms: Percentage of packets with inter-arrival interval 2 ms±200 µs load1_iai_avg: Average packet inter-arrival time in range [0, HARQ_THRESHOLD_3G)

noise1_iai_avg: Average packet inter-arrival time in range [HARQ_THRESHOLD_3G, inf)

load2_iai_avg: Average packet inter-arrival time in range [0, HARQ_THRESHOLD_4G)

noise2_iai_avg: Average packet inter-arrival time in range [HARQ_THRESHOLD_4G, inf)

In some embodiments, the list of features used for the network type detection can be dynamic, and it is possible to include any metric.

The definition of how the info fields can be generated can be provided in the form of a package of scripts. In general, the scripts can perform the following tasks:

1. Read the packets one-by-one in ascending order of packet number
2. For each downstream packet, append a tuple (seg_seq, seg_end, ts, retx, acked_bytes) in a queue.
   a. seg_seq: sequence number
   b. seg_end: sequence number+packet length
   c. ts: timestamp sent (high resolution)
   d. retx: Boolean flag whether it is a TCP retransmission or not
   e. acked_bytes: how many bytes have been acknowledged
   f. Function: parseflow( )
3. For each upstream-packet (ACK)
   a. Extract the ACK and if applicable the S-ACKs
   b. Search in the queue and if there are packets with pkt['seg_end']<ack && pkt['acked_bytes']<pkt['seg_end']-pkt['seg_seq'] acknowledge the packets and keep track of the total acked_bytes
   c. If there is a packet with pkt['seg_end']>=ack && pkt['acked_bytes']<pkt['seg_end']-pkt['seg_seq'] and pkt['retx'] is false, then store the arrival time of that ACK, the RTT and the BIF at the time the packet was sent. If pkt['retx'] is true, no information need be kept, apart from the loss reason, which by default is set to "congestion"
   d. All ACK'ed packets in the queue are removed if the ACK advances the window
   e. Function: calc_attrs( )
4. For each ACK which has acknowledged a not retransmitted packet, calculate:
   a. The total acked bytes
   b. The inter-arrival and inter-sending intervals
   c. Total packet delay, mac/rlc delay (due to radio retransmissions) and no-mac/rlc delay (due to congestion)
   d. The compressed packet window (compressed_pkt_wnd_start, compressed_pkt_wnd_knee, compressed_pkt_wnd_end)
      compressed_pkt_wnd_start: The timestamp of the last radio retransmitted packet
      compressed_pkt_wnd_knee: The timestamp at which the effect of the radio retransmission(s) starts reducing
      compressed_pkt_wnd_end: The timestamp at which the effect of the radio retransmission(s) ends
      Functions: update_compressed_pkt_wnd( ) and is_compressed_pkt( )
   e. The mac/rlc retransmission status (True/False) and the mac/rlc retransmission delay
      i. Delay=pkt_n['seg_rtt']−pkt_m['seg_rtt'], for n>m
      ii. Function: is_mac_rlc_retx( )
   f. Performs loss discrimination if the previous ACK(s) were for retransmitted packet(s)
      i. Function: packet_loss_discrimination( )
      ii. If the packet preceding the retransmitted ones has mac rlc delay higher than no_mac_rlc_delay the loss reason is set to "corruption"
   g. Function: store_packets_attrs( )
5. For each ACK which has acknowledged a retransmitted packet is also kept the retransmission group number.

At this point, the downstream and upstream packets have been matched and the RTT, BIF, ISI, IAI, MAC_RLC_DELAY, NO_MAC_RLC_DELAY, and LOSS_DISCRIMINTION have been calculated, taking into account retransmissions and stretch-ACKs. Even though stretch-ACKs may be of little consequence, in some embodiments, only the delayed ACKs may be processed to avoid inaccuracies in the calculation of IAI and ISI. In some embodiments, downstream and upstream matching does not constitute a hard requirement and thus can be omitted if performance considerations rise.

The next step is the calculation of aggregates. In some embodiments, the calculation of the averages can be done using the simple formula Sum(x1, x2, . . . xN)/N, though it may be desirable to use the cumulative moving average to improve space efficiency.

As described above, input data (existing and new) can be transferred from the ADC to MAS using the LogStreaming transport. In some embodiments, carrying the new fields in end-of-transaction records can be sufficient. On the MAS side, ingestion will be done normally by LogStreaming transport and the LogReceiver consumer, which writes output to RDFS.

A batch data processing path of the Telemetry Cluster can be used to generate data sets that will be used for training the machine learning models and algorithms. As described above, info fields extracted from the transactional records (e.g., "observations") can be accumulated in Pg-XL, until an adequate number is gathered. In some embodiments, around 10,000 observations can be sufficient.

Once the above condition is met, one or more Spark jobs can be initiated via the job scheduler (i.e. not triggered by a Telemetry API call) to (re-)train the models and/or algorithms. The outcome of this will be the model coefficients, as well as training evaluation results.

Figure 19A:
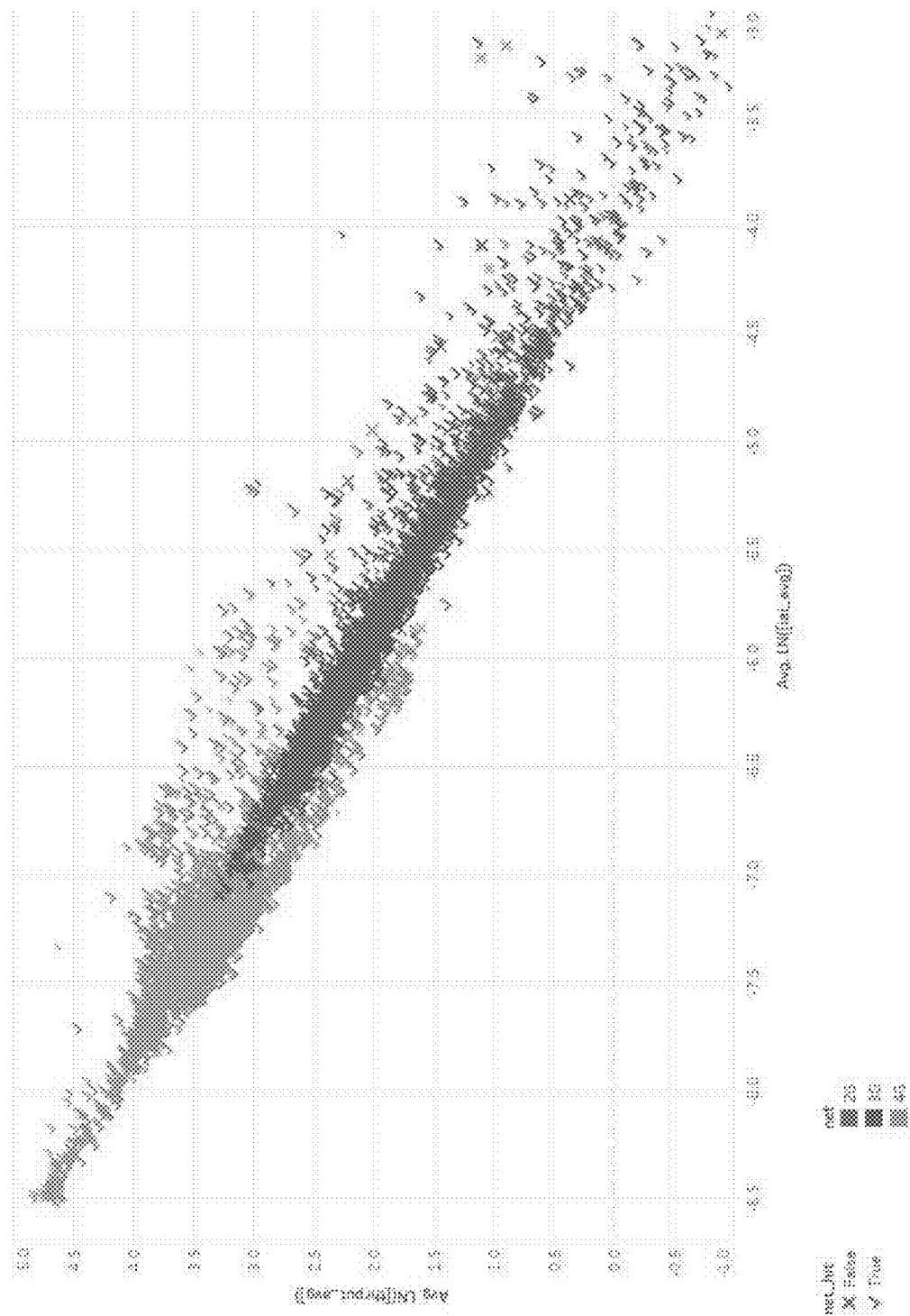
FIGS. 19A and 19B are graphs showing the discrimination levels for models using different parameters.
Figure 19B:
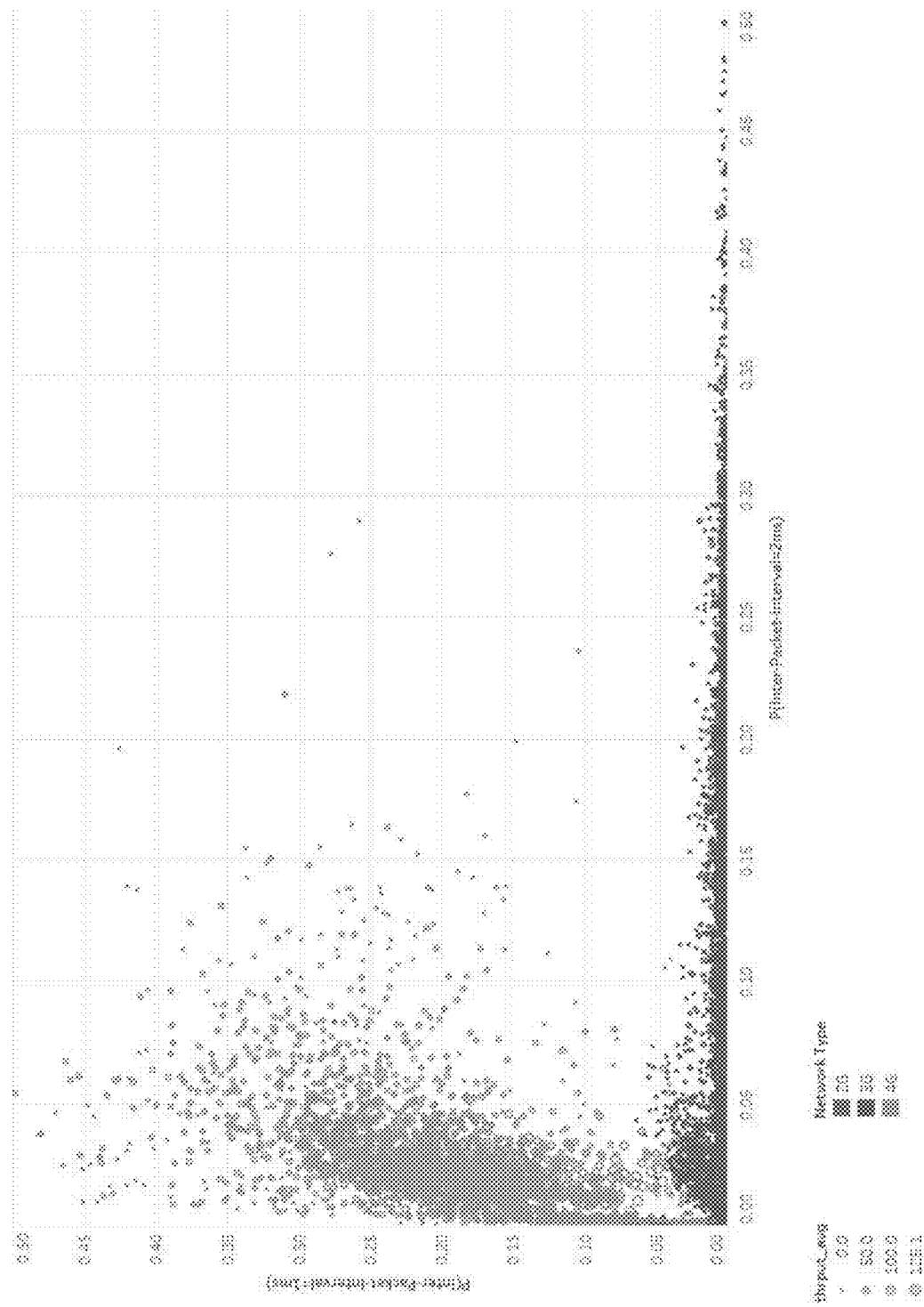

The machine learning pipeline mentioned above can include the following phases:
1) Network type detection (multi-class classification)
    a) Classify 2G transactions (binary classification)
 Model: Combination of unsupervised model (clustering) with a supervised model (logistic regression)
    b) Classify 3G vs 4G transactions (binary classification)
 Model: Combination of unsupervised model (clustering) with a supervised model (logistic regression)
2) Congestion level and signal quality ranking
    a) Calculate CCL and CSQ scores
 Only for the subset of 3G and 4G observations.
 Formula parameters differ between 3G and 4G
    b) Specify the ranking boundaries
 Boundaries determined based on the 4 quartiles In some embodiments, the combination of features having the strongest results in terms of discriminating between different network types (2G, 3G, 4G), can be the average throughput (thrput_avg) and the average inter-arrival interval (iai_avg). Due to the Poisson-like distribution of iai_avg, the resulting classification model can be non-linear, but also can be translated to a linear model by calculating the logarithm of the features, as shown in FIG. 19A. In some embodiments, adding additional observations to the data set can increase their variability, and can decrease classification accuracy. However, using the iai_1ms and iai_2ms features described above, an improved separation between the network classes can be achieved, as shown in FIG. 19B. Based on the distribution shown in FIG. 19B, the discrimination between 3G and 4G network types is about 99.5%.

The confusion matrix for the techniques described above can be represented as follows:

| net_cls | net 3G | 4G |
|---|---|---|
| 3G | 3,795 | 20 |
| 4G | 14 | 2,463 |

However, this can be approached as a non-supervised model, because the network type labels may be initially unknown when first deployed. The high-level steps of changing this to a non-supervised model are as follows:

1. Apply clustering algorithm, using attributes mentioned above (e.g. thrput_avg, iai_1ms, iai_2ms, load_iai_avg, noise_iai_avg, rtt_min, rtt_max, rtt_avg, iai_avg, isi_avg). Based on our comparison between k-Means and Spectral clustering, the latter produces better validation results for the case of 3G versus 4G, while the former is applied for the case of 2G versus Non2G case.

2. The outcome of step 1 produces clusters equal to the number of network types to be classified (maximum three). Labels can be assigned depending on the average thrput_avg across the observations of the cluster (always under the assumption that "4G" is faster than "3G").

3. The dataset can then be split into training and testing sets, for example using a 70%-30% ratio. Then Logistic Regression can be applied to the training dataset, employing 10-fold cross-validation. The set of attributes used can be the same as in step 1 above.

The resulting linear classifiers use #attributes coefficients plus the intercept, which can be stored on MAS and provided back to the ADC for applying the network type detection model. Apart from the coefficients, the cut off threshold can also be provided to the ADC.

Figure 20A:
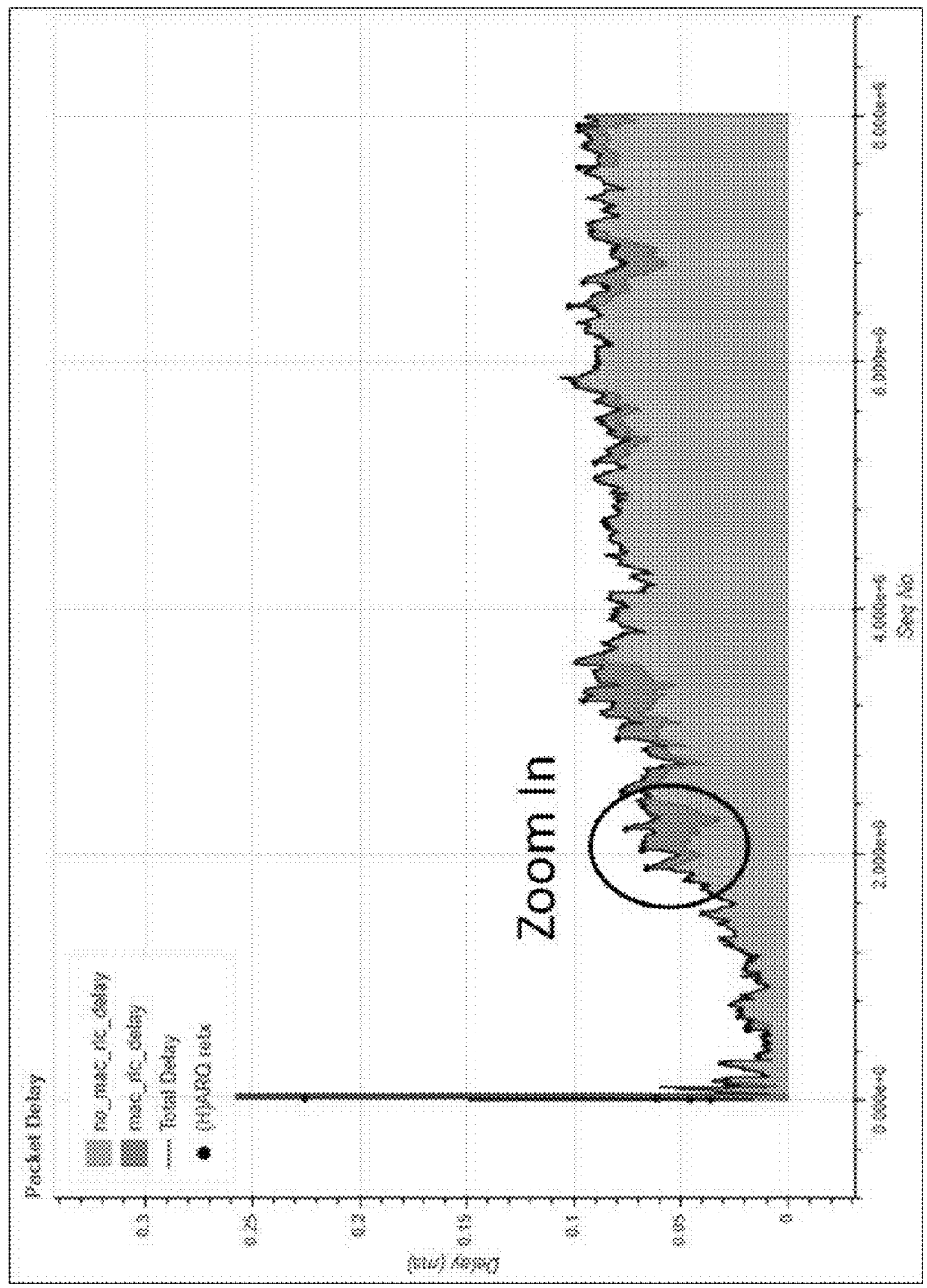
FIGS. 20A and 20B show experimental results for various models that are pertinent to network conditions.
Figure 20B:
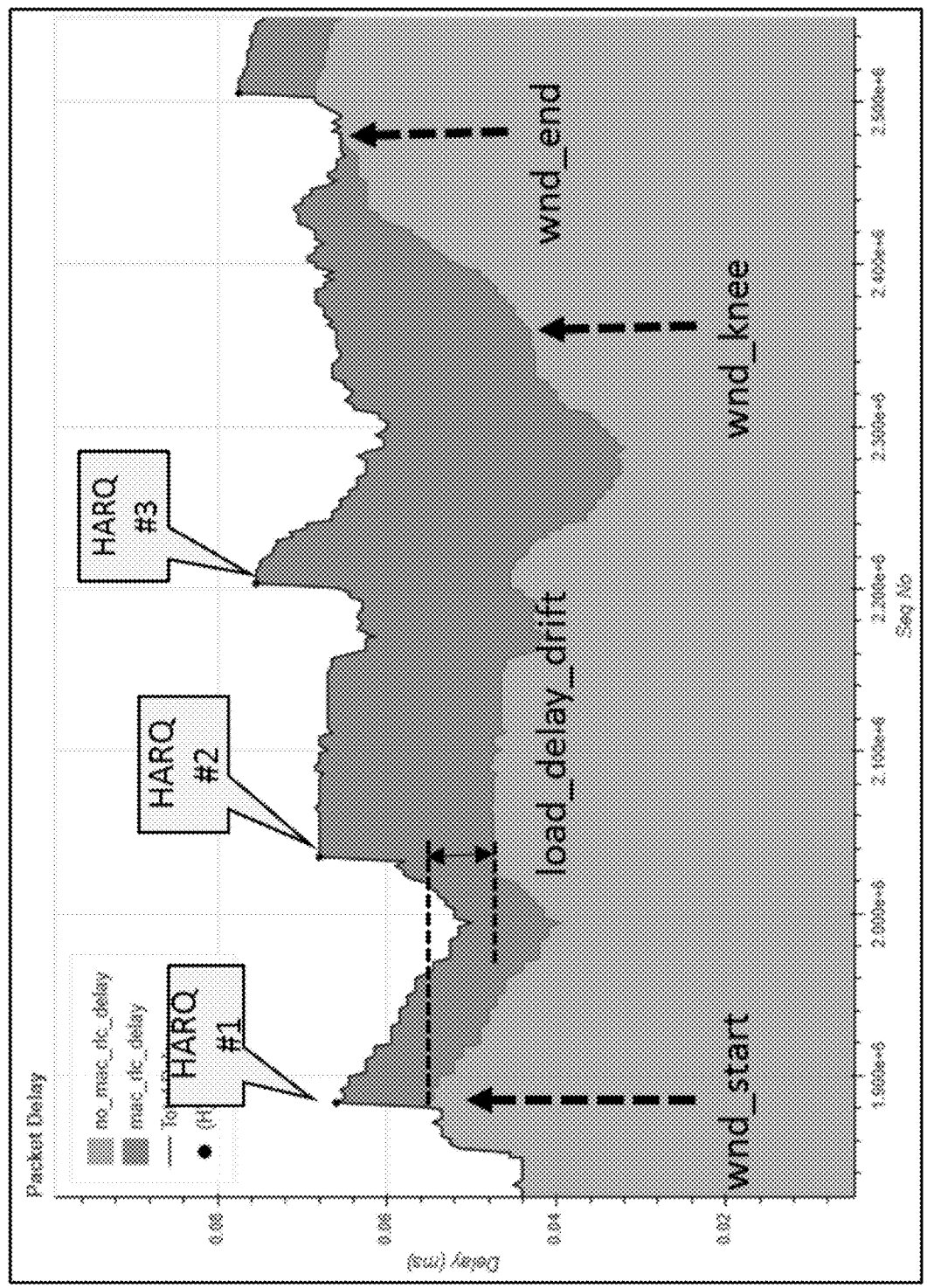

FIGS. 20A and 20B show experimental results for the model described above.

Estimating relative congestion and noise delays can be achieved through the following calculations:
 load_delay_pct=avg(load_delay)/avg(delay)
 noise_delay_pct=avg(harq_delay)/avg(delay)

Figure 21:
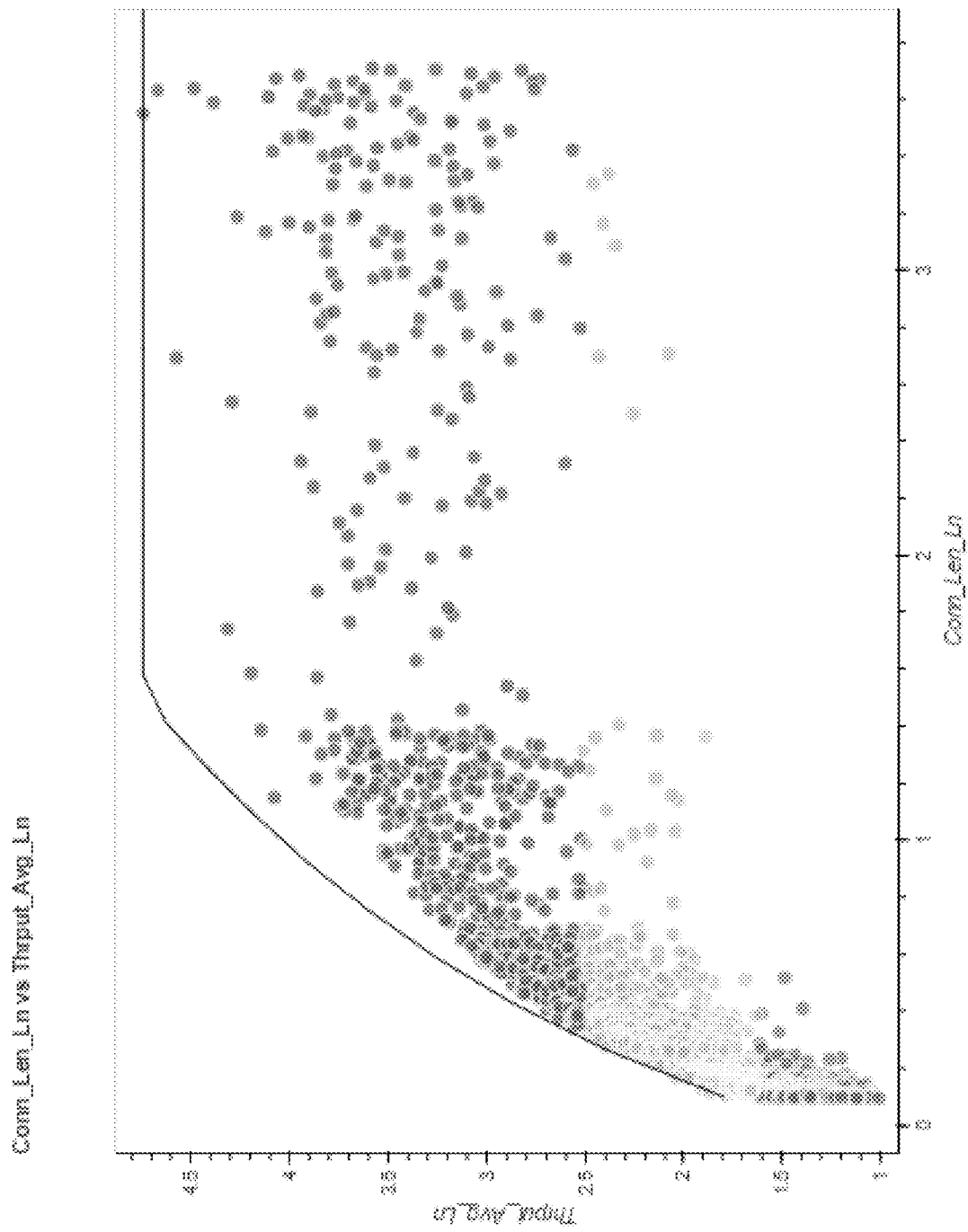
FIG. 21 shows a plot estimating the maximum theoretical throughput of a connection for one example computing environment.

FIG. 21 shows a plot estimating the maximum theoretical throughput of a connection for one example computing environment. The reference line (black curve in the plot of FIG. 21) is approximated by a bounded logarithmic function, which has the following form:
 est_thrput=min(a*loglp(b*(transferred_bytes+c))+d, e)
 Estimating the CCL and CSQ:
 CQR=(max(est_thrput, thrput)−thrput)/est_thrput
 CCL=CQR*load_delay_pct
 CSQ=CQR*noise_delay_pct The parameters of the logarithmic function can be calculated as follows:

```
def get_ref_connections(conn_df):
    a = 1       #a in (0, 1]
    thrput_avg_prev = .0
    ref_conn_df = [ ]
```

```
        base_net_rtt = conn_df.rtt_min.quantile(q = .1)
        max_net_thrput_avg = conn_df.thrput_avg.max( )
        for conn in conn_df.iterrows( ):
            if conn.thrput_avg >= a * conn.thrput_avg_prev:
                thrput_avg_prev = conn.thrput_avg
                conn.ideal_thrput_avg = min(conn.bif_avg * 8 / (1000000 * (base_net_rtt + 0.005)), max_net_thrput_avg)
                ref_conn_df.append(conn)
        return ref_conn_df
def log_func(x, a, b, c, d, e):
    return min(a * log1p(b * (x + c)) + d, e)
x = log1p(ref_conn_df.conn_len)
y = log1p(ref_conn_df.ideal_thrput_avg)
popt, = curve_fit(log_func, x, y)
```

In some embodiments, the CCL and CSQ classes conform to the CQI efficiency index of the respective network type. The following table shows the scale of CQI efficiency index for LTE. There is a similar table for WCDMA with the difference that there are 30 classes.

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Figure 22:
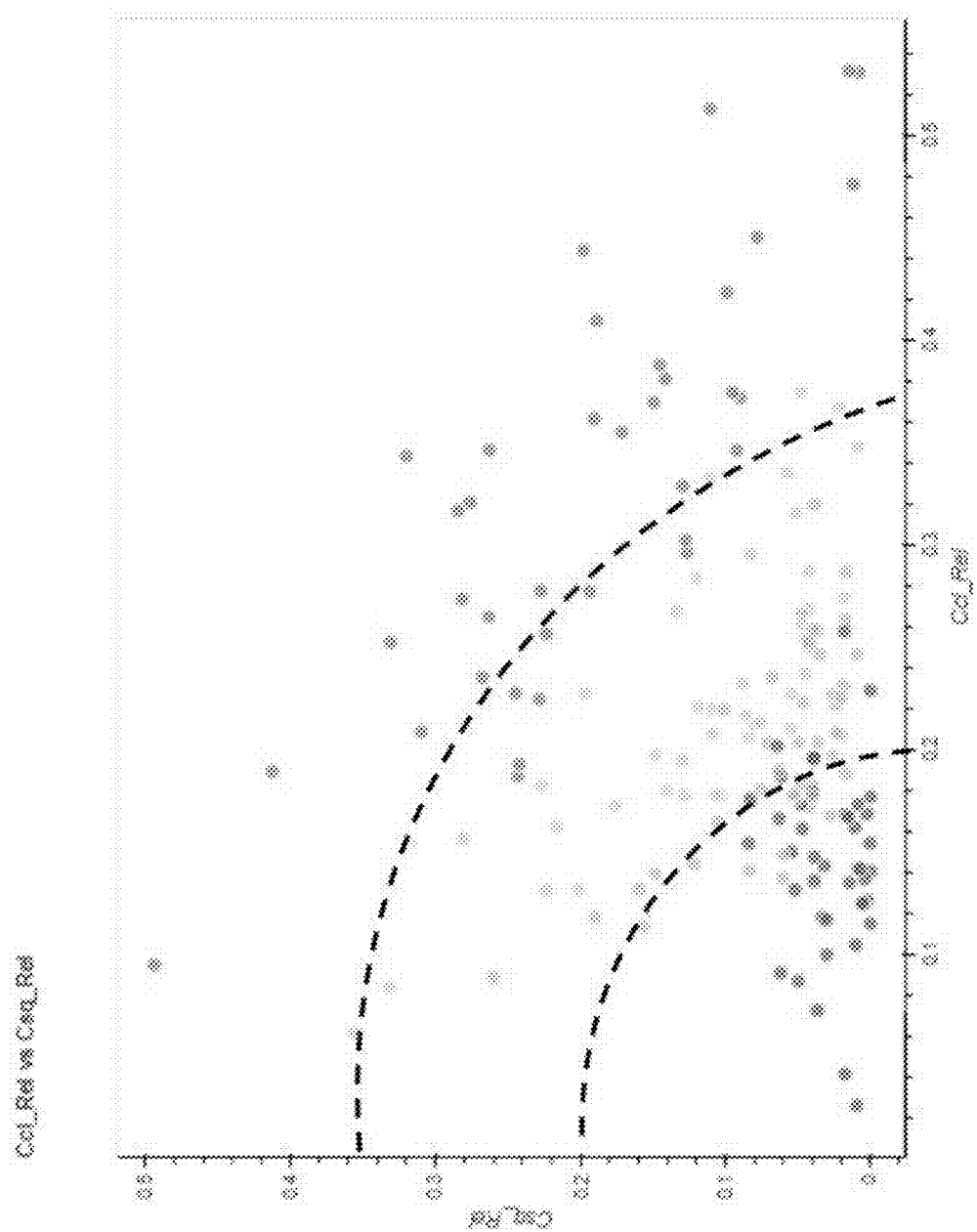
FIG. 22 shows a plot depicting a model representing the way in which congestion and noise affects performance of TCP connections with the same connection lengths.

For facilitating the mapping between CQI efficiency index and CQR, the former can be rescaled in the [0, 1] range having 0 to correspond to the best quality and 1 to the worst. The resulted classes will have an arc-shaped form, as depicted in FIG. 22. The proposed connection quality ranking implies that connections with negligible (H)ARQ retransmissions can be classified as having 'Good', or 'Fair' signal conditions because of the interference caused when the cell is congested. In such cases, the bad signal conditions are witnessed by low throughputs due to decreased MCS.

Figure 23A:
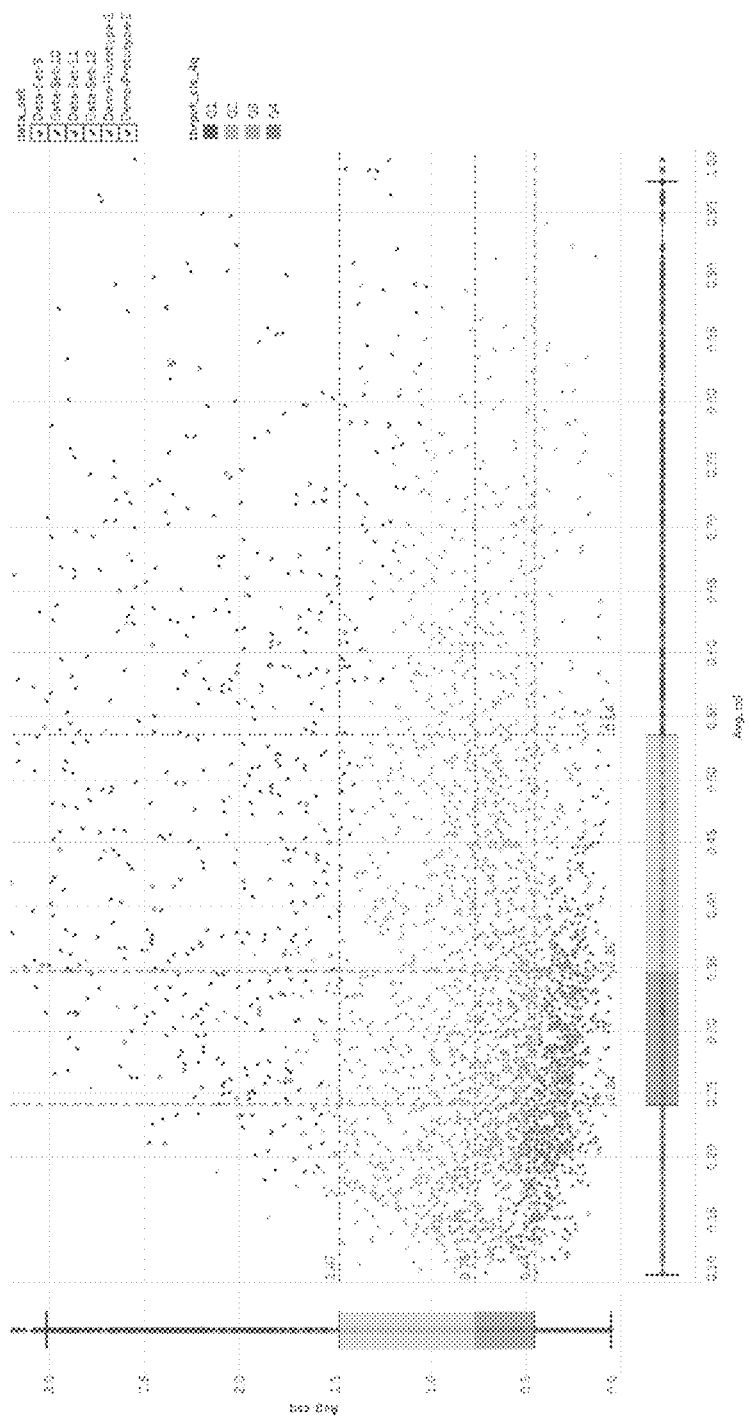
FIGS. 23A and 23B show the results of implementing the above CCL/CSQ algorithms for 3G and 4G network types.
Figure 23B:
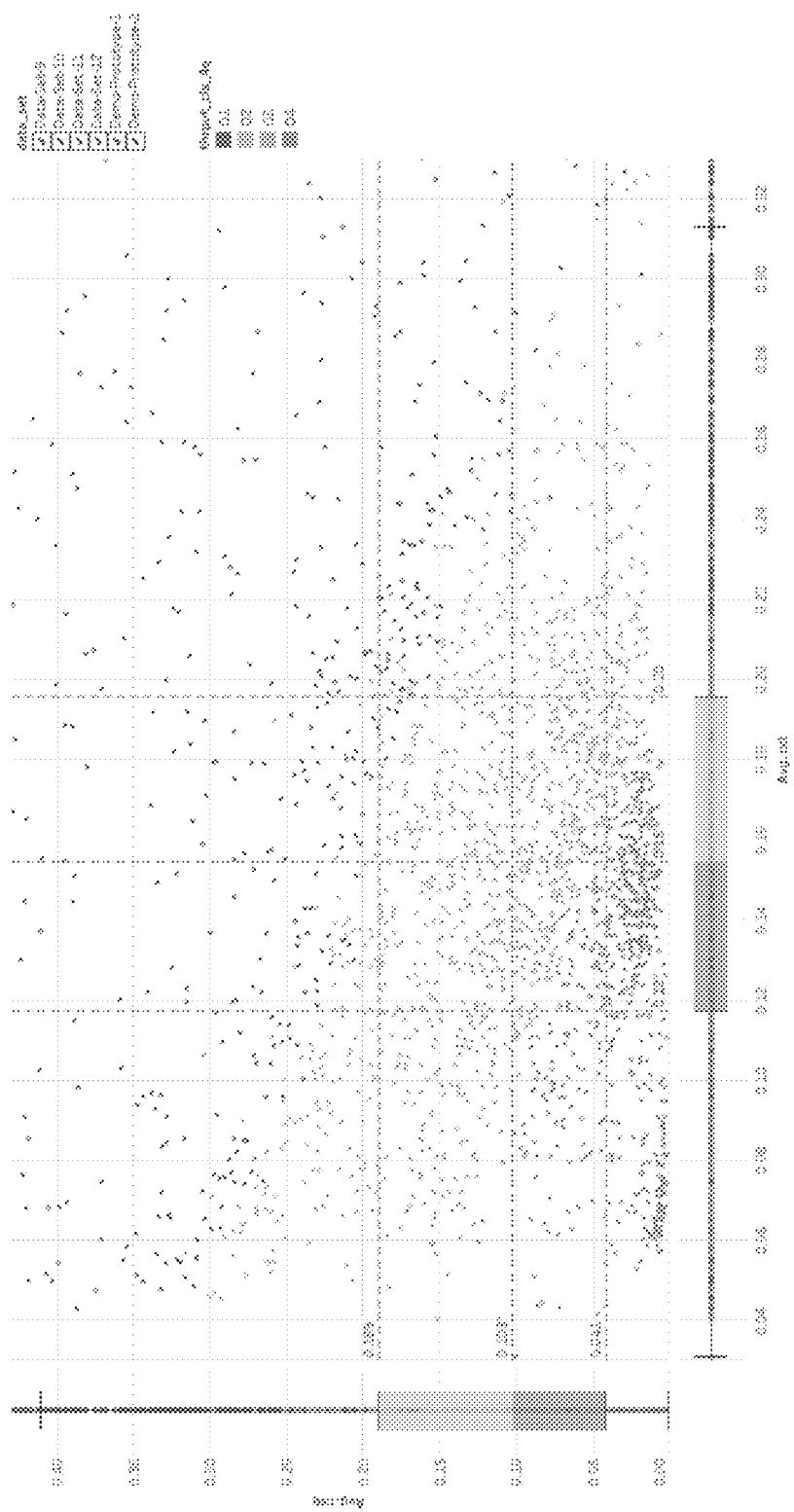

FIGS. 23A and 23B show the results of implementing the above CCL/CSQ algorithms on the datasets at hand, separately for observations classified as 3G and 4G, respectively.

In some embodiments, in addition to the reports that can be made available to the end-user, the systems and methods of this disclosure can also generate internal reports to validate that the inference algorithms produce reasonable results.

Parameters of the ML models and inference algorithms can include any of the following:
    Linear classifier (logistic regression) coefficients
    HARQ threshold: Empirically set to ~8 ms for 3G and ~7 ms for 4G
    Per network type base RTT: net_rtt parameter
    The ranking boundaries of CCL and CSQ per network type These parameters can be passed from MAS back to the ADC each time there is a need to update them, for example following the initial bootstrapping or potential retraining of the ML models. For reasons of robustness, the parameters can be verified, by comparing against thresholds, before the outcome of training is communicated to the ADC for applying the models. In some embodiments, this MAS-ADC integration will leverage Nitro API, extending existing interfaces, or leveraging stylebooks. To facilitate applying changes by hand, for example as part of advanced configuration, testing, or troubleshooting, the same parameters can be made available as hidden CLI arguments.

As described above, some input fields, including the detected network type and CCL/CSQ classes, can be included in LogStreaming records transferred from the ADC to MAS over LogStreaming transport. Consistently with the other MAS analytics reports, the afdecoder extension of LogStreaming can be extended to ingest those fields and implement summarization/aggregation, before storing in a relational database of MAS. In some embodiments, this can facilitate the embodiment of the analytics reports described above.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

We claim:

1. A method comprising:
    using, by a device, a percentage of inter-arrival intervals of network packets within one or more first thresholds or a probability of a network packet having an inter-arrival interval within one or more second thresholds to distinguish between a plurality of types of networks;
    determining, by the device, inter-arrival intervals of one or more packets of a transport layer connection; and
    identifying, by the device, a type of network for the transport layer connection based on at least the inter-arrival intervals of one or more packets.

2. The method of claim 1, wherein the plurality of types of networks comprises one of a mobile network or a fixed network.

3. The method of claim 1, wherein the plurality of types of networks comprise one of a 2G, 3G, 4G or 5G network.

4. The method of claim 1, further comprising using, by the device, a classification model to distinguish between different types of networks based at least on using the inter-arrival intervals of one or more network packets as inputs to the classification model.

5. The method of claim 1, further comprising receiving the one or more packets of the transport layer connection and determining the inter-arrival intervals from receipt of the one or more packets.

6. The method of claim 1, further comprising receiving, by the device, the one or more packets of the transport layer connection, and wherein determining the inter-arrival intervals of the one or more packets comprises determining the inter-arrival intervals from the received one or more packets.

7. The method of claim 1, further comprising:
   selecting, by the device, a transport control protocol ("TCP") profile from a set of predetermined TCP profiles for configuring the transport layer connection;
   modifying, by the device, the selected TCP profile based on the identified type of network for the transport layer connection; and
   applying, by the device, the modified TCP profile to the transport layer connection to optimize network performance for the transport layer connection.

8. A system comprising:
   one or more processors, coupled to memory and configured to:
   use a percentage of inter-arrival intervals of network packets within one or more first thresholds or a probability of a network packet having an inter-arrival interval within the one or more second thresholds to distinguish between a plurality of types of networks;
   determine inter-arrival intervals of one or more packets of a transport layer connection; and
   identify a type of network for the transport layer connection based on at least the inter-arrival intervals of one or more packets.

9. The system of claim 8, wherein the plurality of types of networks comprise one of a 2G, 3G, 4G or 5G network.

10. The system of claim 8, wherein the one or more processors are further configured to establish a classification model to distinguish between different types of networks based on using at least the inter-arrival intervals of one or more network packets as inputs to the classification model.

11. The system of claim 8, wherein the one or more processors are configured to receive the one or more packets of the transport layer connection and determine the inter-arrival intervals from receipt of the one or more packets.

12. The system of claim 8, wherein the plurality of types of networks comprises one of a mobile network or a fixed network.

13. The system of claim 8, wherein the one or more processors are further configured to receive the one or more packets of the transport layer connection, and wherein determining the inter-arrival intervals of the one or more packets comprises determining the inter-arrival intervals from the received one or more packets.

14. A system comprising:
   one or more processors, coupled to memory and configured to:
   use an average of round trip times of network packets within one or more thresholds to distinguish between a plurality of types of networks;
   determine round trip times of one or more packets of a transport layer connection; and
   identify a type of network for the transport layer connection based on at least the round trip times of one or more packets.

15. The system of claim 14, wherein the one or more processors are further configured to use one of a maximum round trip or a minimum round trip time to distinguish between the plurality of types of networks.

16. The system of claim 14, wherein the plurality of types of networks comprises one of a mobile network or a fixed network.

17. The system of claim 14, wherein the plurality of types of networks comprises one of a 2G, 3G, 4G or 5G network.

18. The system of claim 14, wherein the one or more processors are further configured to establish a classification model to distinguish between different types of networks based on using at least the round trip times of one or more network packets as inputs to the classification model.

19. The system of claim 14, wherein the one or more processors are further configured to receive the one or more packets of the transport layer connection, and wherein determining the round trip times of the one or more packets comprises determining the round trip times from the received one or more packets.

20. The system of claim 14, wherein the one or more processors are further configured to:
   select a TCP profile from a set of predetermined TCP profiles for configuring the transport layer connection;
   modify the selected TCP profile based on the identified type of network for the transport layer connection; and
   apply the modified TCP profile to the transport layer connection to optimize network performance for the transport layer connection.

* * * * *